United States Patent
Simar, Jr. et al.

(10) Patent No.: US 6,182,203 B1
(45) Date of Patent: Jan. 30, 2001

(54) MICROPROCESSOR

(75) Inventors: Laurence R. Simar, Jr., Richmond; Richard H. Scales; Natarajan Seshan, both of Houston, all of TX (US)

(73) Assignee: Texas Instruments Incorporated, Dallas, TX (US)

(*) Notice: Under 35 U.S.C. 154(b), the term of this patent shall be extended for 0 days.

(21) Appl. No.: 09/012,813

(22) Filed: Jan. 23, 1998

Related U.S. Application Data

(60) Provisional application No. 60/036,482, filed on Jan. 24, 1997.

(51) Int. Cl.[7] ....................................................... G06F 9/38
(52) U.S. Cl. ................................................ 712/22; 712/13
(58) Field of Search ..................................... 712/1, 22, 13

(56) References Cited

U.S. PATENT DOCUMENTS

| | | | |
|---|---|---|---|
| 5,222,229 | * 6/1993 | Fukuda | 709/400 |
| 5,361,367 | * 11/1994 | Fijany | 712/15 |
| 5,574,939 | * 11/1996 | Keckler | 712/24 |
| 5,848,286 | * 12/1998 | Schiffleger | 712/4 |
| 5,848,288 | 12/1998 | O'Connor | 712/24 |
| 5,895,501 | * 4/1999 | Smith | 711/207 |
| 5,996,083 | * 11/1999 | Gupta | 713/322 |

OTHER PUBLICATIONS

Siamak Arya, et al., "An Architecture for High Instruction Level Parallelism," Proceedings of the 28th Annual Hawaii International Conference on System Sciences, pp. 153–162, 1995.

"VLIW Architecture & Trace Scheduling Compilation—Technology Review" by Equator Technologies, Inc.

Paul K. Rodman, "High Performance FFTs for a VLIW Architecture," pp. 1–15.

Gerrit A. Slavenburg, et al., "The Trimedia TM–1 PCI VLIW Media Processor," 1996 (Eighth Hot Chips Symposium.

TriMedia TM1300 Preliminary Data Book, pp. 3–1—3–16.

* cited by examiner

*Primary Examiner*—Eric Coleman
(74) *Attorney, Agent, or Firm*—Gerald E. Laws; W. James Brady, III; Frederick J. Telecky, Jr.

(57) ABSTRACT

A microprocessor, comprising a first set of functional units capable of performing parallel data operations, a second set of functional units capable of performing parallel data operations, and a data interconnection path connecting the first and second functional units.

14 Claims, 56 Drawing Sheets

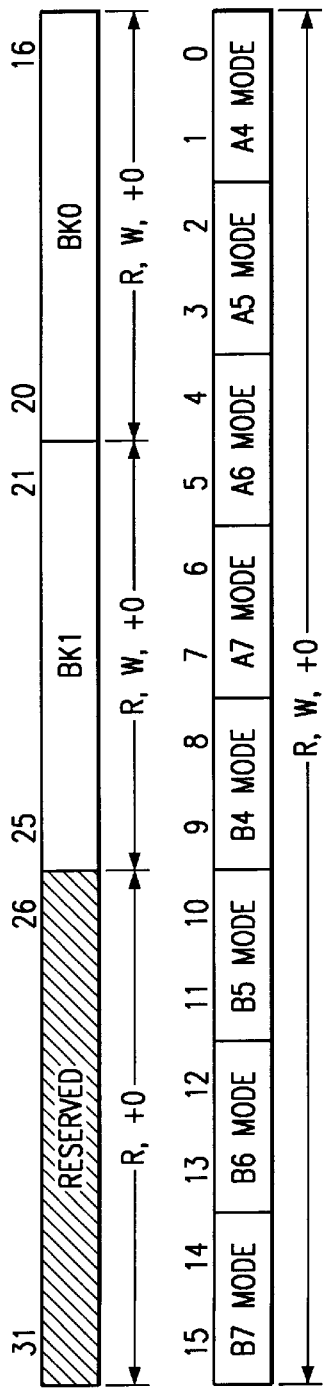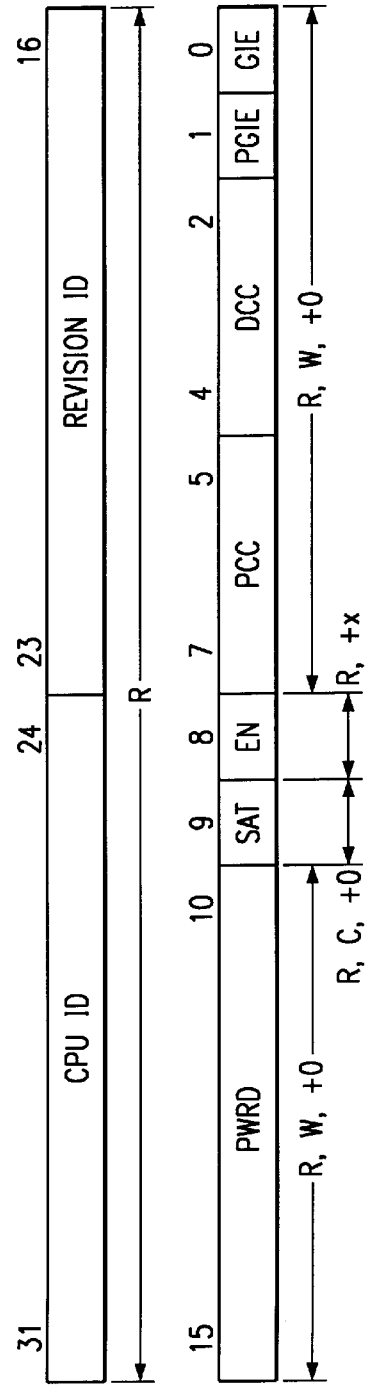

FIG. 8A

OPERATIONS ON THE .L UNIT

| 31 | 29 28 27 | 23 22 | 18 17 | 13 12 11 | 5 4 3 2 | 1 | 0 |
|---|---|---|---|---|---|---|---|
| CREG | Z | DST | SCR2 | SRC1/CST | X | OP | 1 1 0 | S | P |
| 3 | | 5 | 5 | 5 | | 7 | | |

FIG. 8B

OPERATIONS ON THE .M UNIT

| 31 | 29 28 27 | 23 22 | 18 17 | 13 12 11 | 7 6 5 4 3 2 | 1 | 0 |
|---|---|---|---|---|---|---|---|
| CREG | Z | DST | SCR2 | SRC1/CST | X | OP | 0 0 0 0 | S | P |
| 3 | | 5 | 5 | 5 | | 5 | | |

FIG. 8C

OPERATIONS ON THE .D UNIT

| 31 | 29 28 27 | 23 22 | 18 17 | 13 12 | 7 6 5 4 3 2 | 1 | 0 |
|---|---|---|---|---|---|---|---|
| CREG | Z | DST | SCR2 | SRC1/CST | OP | 1 0 0 0 | S | P |
| 3 | | 5 | 5 | 5 | 6 | | |

FIG. 8D

LOAD/STORE WITH 15-BIT OFFSET (ON THE .D UNIT)

| 31 | 29 28 27 | 23 22 | 8 7 6 | 4 3 2 | 1 | 0 |
|---|---|---|---|---|---|---|
| CREG | Z | DST/SRC | UCST15 | Y | LD/ST | 1 1 | S | P |
| 3 | | 5 | 15 | | 3 | | |

FIG. 8E

LOAD/STORE 'BASER' + 'OFFSETR/CST' ON THE .D UNIT

| 31 | 29 28 27 | 23 22 | 18 17 | 13 12 | 9 8 7 6 | 4 3 2 | 1 | 0 |
|---|---|---|---|---|---|---|---|---|
| CREG | Z | DST/SRC | BASE R | OFFSET R/UCST5 | MODE | R | Y | LD/ST | 0 1 | S | P |
| 3 | | 5 | 5 | 5 | 4 | | | 3 | | |

FIG. 8F

OPERATIONS ON THE .S UNIT

| 31 | 29 28 27 | 23 22 | 18 17 | 13 12 11 | 6 5 4 3 2 | 1 0 |
|---|---|---|---|---|---|---|
| CREG | Z | DST | SRC2 | SRC1/CST | x | OP | 1 0 0 0 | S | P |
| 3 | | 5 | 5 | 5 | 2 | 6 | | | |

FIG. 8G

ADDK ON THE .S UNIT

| 31 | 29 28 27 | 23 22 | | 7 6 5 4 3 2 | 1 0 |
|---|---|---|---|---|---|
| CREG | Z | DST | CST | 1 0 1 0 0 | S | P |
| 3 | | 5 | 16 | | | |

FIG. 8H

BITFIELD OPERATIONS (IMMEDIATE FORMS) ON THE .S UNIT

| 31 | 29 28 27 | 23 22 | 18 17 | 13 12 | 8 7 6 5 4 3 2 | 1 0 |
|---|---|---|---|---|---|---|
| CREG | Z | DST | SRC2 | CSTA | CSTB | OP | 0 0 1 0 | S | P |
| 3 | | 5 | 5 | 5 | 5 | 2 | | | |

FIG. 8I

MVK AND MVKH ON THE .S UNIT

| 31 | 29 28 27 | 23 22 | | 7 6 5 4 3 2 | 1 0 |
|---|---|---|---|---|---|
| CREG | Z | DST | CST | H | 1 0 1 0 | S | P |
| 3 | | 5 | 16 | | | |

FIG. 8J

BCOND DISP ON THE .S UNIT

| 31 | 29 28 27 | | 7 6 5 4 3 2 | 1 0 |
|---|---|---|---|---|
| CREG | Z | CST | 0 0 1 0 0 | S | P |
| 3 | | 21 | | | |

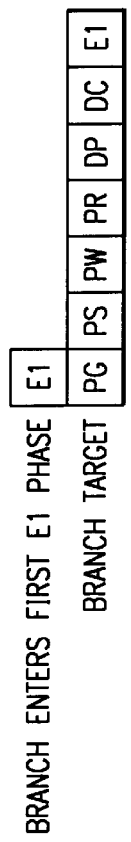
FIG. 11
FIG. 12
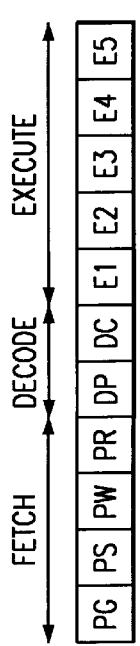
FIG. 13

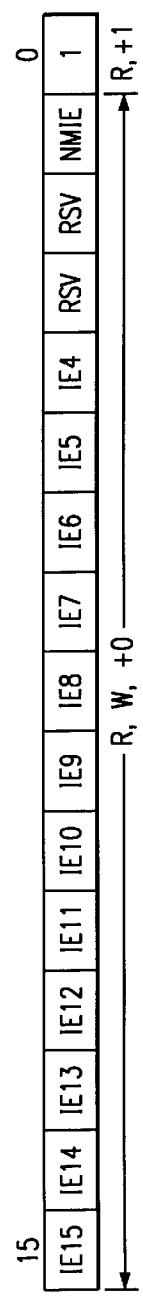
FIG. 14
FIG. 15

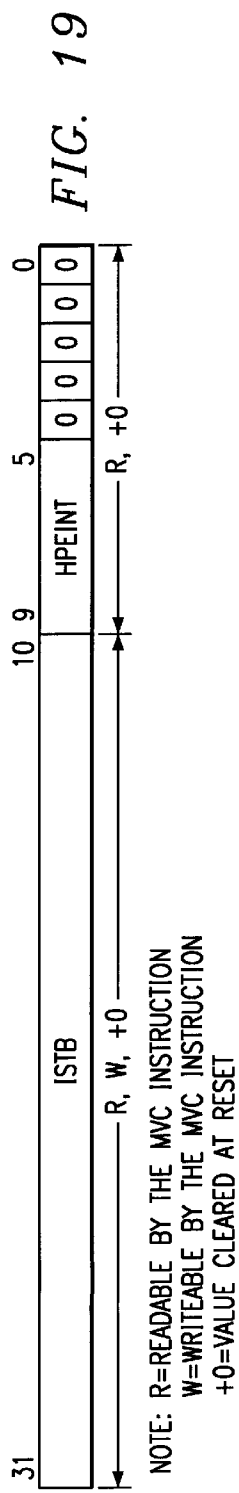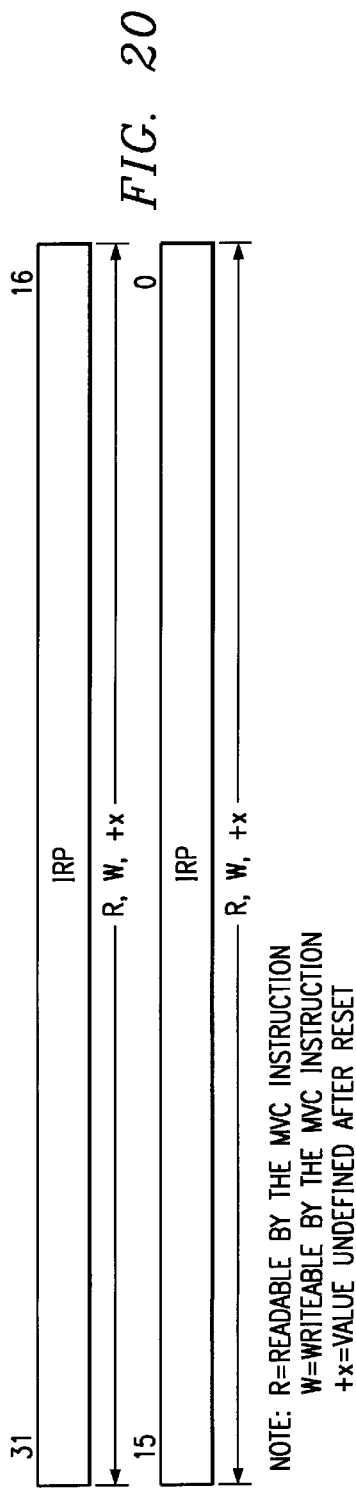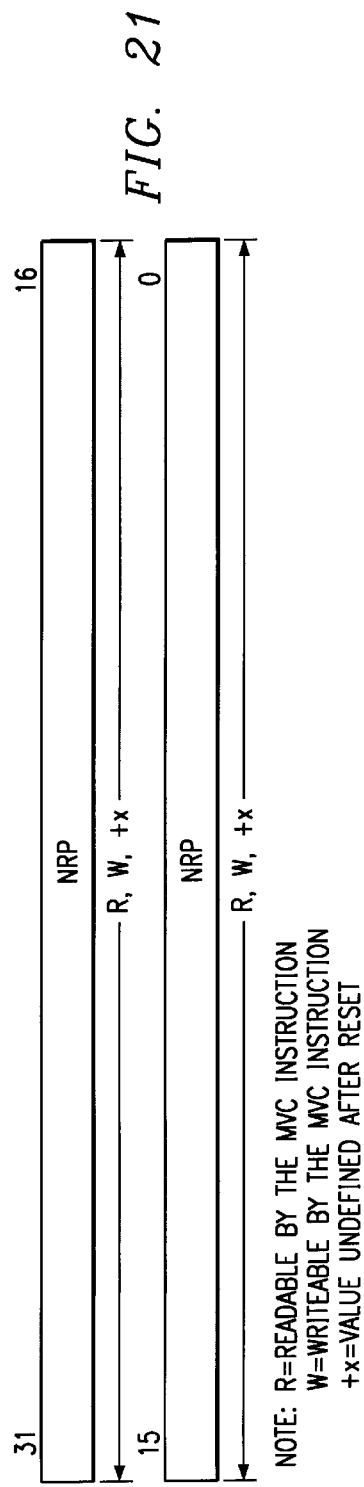

INTERNAL DATA MEMORY AS ADDRESSED BY THE CPU (LITTLE ENDIAN)

| 8000 0000 | 8000 0001 | 8000 0002 | 8000 0003 | 8000 0004 | 8000 0005 | 8000 0006 | 8000 0007 |
|---|---|---|---|---|---|---|---|
| 8000 0008 | 8000 0009 | 8000 000A | 8000 000B | 8000 000C | 8000 000D | 8000 000E | 8000 000F |
| ... | ... | ... | ... | ... | ... | ... | ... |
| 8000 FFF0 | 8000 FFF1 | 8000 FFF2 | 8000 FFF3 | 8000 FFF4 | 8000 FFF5 | 8000 FFF6 | 8000 FFF7 |
| 8000 FFF8 | 8000 FFF9 | 8000 FFFA | 8000 FFFB | 8000 FFFC | 8000 FFFD | 8000 FFFE | 8000 FFFF |

64 BYTES (BYTE ADDRESSABLE)

SAME INTERNAL DATA MEMORY AS ADDRESSED THROUGH THE HOST PORT INTERFACE (HPI)

| 0000 | 0001 | 0002 | 0003 |
|---|---|---|---|
| 0004 | 0005 | 0006 | 0007 |
| ... | ... | ... | ... |
| 7FF8 | 7FF9 | 7FFA | 7FFB |
| 7FFC | 7FFD | 7FFE | 7FFF |

32K HALF-WORDS (HALF-WORD ADDRESSABLE)

*FIG. 26*

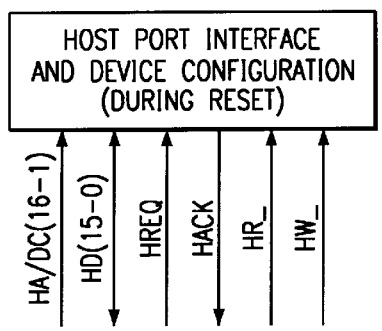
FIG. 54
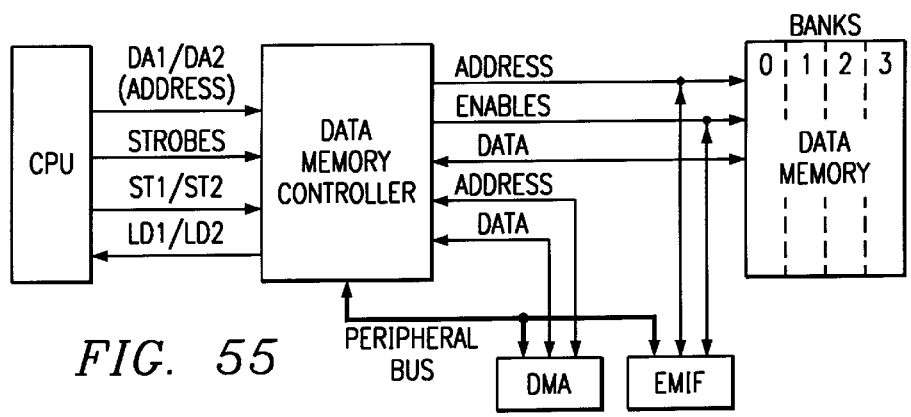
FIG. 55
| | LD1 AND ST1 | BYTE | | | | | | | | HALFWORD | | | | WORD | |
|---|---|---|---|---|---|---|---|---|---|---|---|---|---|---|---|
| LD2 AND ST2 | ADDR (2:0) | 000 | 001 | 010 | 011 | 100 | 101 | 110 | 111 | 000 | 010 | 100 | 110 | 000 | 100 |
| BYTE | 000 | ▨ | ▨ | | | | | | | ▨ | | | | ▨ | |
| | 001 | ▨ | | | | | | | | ▨ | | | | ▨ | |
| | 010 | | | ▨ | ▨ | | | | | ▨ | | | | ▨ | |
| | 011 | | | ▨ | | | | | | ▨ | | | | ▨ | |
| | 100 | | | | | ▨ | ▨ | | | | | ▨ | | | ▨ |
| | 101 | | | | | ▨ | | | | | | ▨ | | | ▨ |
| | 110 | | | | | | | ▨ | ▨ | | | | ▨ | | ▨ |
| | 111 | | | | | | | ▨ | | | | | ▨ | | ▨ |
| HALFWORD | 000 | ▨ | ▨ | | | | | | | ▨ | | | | ▨ | |
| | 010 | | | ▨ | ▨ | | | | | | ▨ | | | ▨ | |
| | 100 | | | | | ▨ | ▨ | | | | | ▨ | | | ▨ |
| | 110 | | | | | | | ▨ | ▨ | | | | ▨ | | ▨ |
| WORD | 000 | ▨ | ▨ | ▨ | ▨ | | | | | ▨ | ▨ | | | ▨ | |
| | 100 | | | | | ▨ | ▨ | ▨ | ▨ | | | ▨ | ▨ | | ▨ |
NOTE: BLACK AREAS INDICATE CONFLICTS
FIG. 56

| ACCESS TYPE | ED BITS | 31:24 | 23:16 | 15:8 | 7:0 |
|---|---|---|---|---|---|
| 8-BIT | 2 ADDRESS LSBs | 11b | 10b | 01b | 00b |
| | BE[3:0] | 0111 | 1011 | 1101 | 1110 |
| 16-BIT | 2 ADDRESS LSBs | 10b | | 00b | |
| | BE[3:0] | 0011b | | 1100b | |
| | 16-BIT BITS | 15:8 | 7:0 | 15:8 | 7:0 |
| 32-BIT | 2 ADDRESS LSBs | 00b | | | |
| | BE[3:0] | 0000b | | | |
| | 32-BIT BITS | 31:24 | 23:16 | 15:8 | 7:0 |

LSBs OF ADDRESS REFERS TO THE LOGICAL BYTE ADDRESS GENERATED BY THE CPU OR DMA. THE VALUES OF BE ARE SHOWN FOR A WRITE. FOR ANY READ ALL BE[3:0]=0000b (ALL ENABLED).

FIG. 59

| ACCESS TYPE | ED BITS | 31:24 | 23:16 | 15:8 | 7:0 |
|---|---|---|---|---|---|
| 8-BIT | 2 ADDRESS LSBs | 00b | 01b | 10b | 11b |
| | BE[3:0] | 0111 | 1011 | 1101 | 1110 |
| 16-BIT | 2 ADDRESS LSBs | 00b | | 10b | |
| | BE[3:0] | 0011b | | 1100b | |
| | 16-BIT BITS | 15:8 | 7:0 | 15:8 | 7:0 |
| 32-BIT | 2 ADDRESS LSBs | 00b | | | |
| | BE[3:0] | 0000b | | | |
| | 32-BIT BITS | 31:24 | 23:16 | 15:8 | 7:0 |

LSBs OF ADDRESS REFERS TO THE LOGICAL BYTE ADDRESS GENERATED BY THE CPU OR DMA. THE VALUES OF BE ARE SHOWN FOR A WRITE. FOR ANY READ ALL BE[3:0]=0000b (ALL ENABLED).

FIG. 60

| ACCESS | ED BITS | 31:24 | 23:16 | 15:8 | 7:0 |
|---|---|---|---|---|---|
| 1ST | EA[1:0] | UNUSED | | | 00b |
| | WORD BIT POSITIONS | | | | 7:0 |
| 2ND | EA[1:0] | | | | 01b |
| | WORD BIT POSITIONS | | | | 15:8 |
| 3RD | EA[1:0] | | | | 10b |
| | WORD BIT POSITIONS | | | | 23:16 |
| 4TH | EA[1:0] | | | | 11 |
| | WORD BIT POSITIONS | | | | 31:24 |

| ACCESS | ED BITS | 31:24 | 23:16 | 15:8 | 7:0 |
|---|---|---|---|---|---|
| 1ST | EA[0] | UNUSED | | | 0b |
| | WORD BIT POSITIONS | | | 15:8 | 7:0 |
| 2ND | EA[0] | | | | 1b |
| | WORD BIT POSITIONS | | | 31:24 | 23:16 |

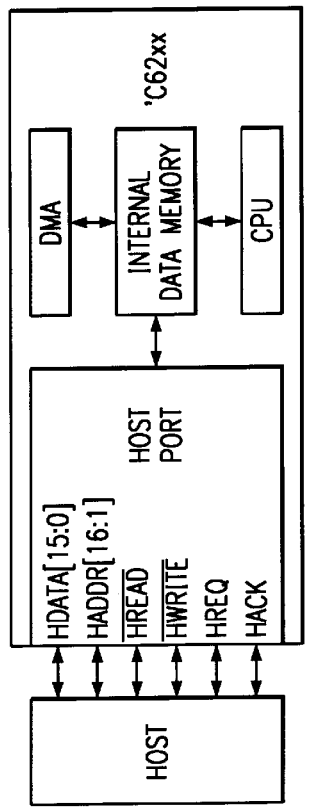
FIG. 72
FIG. 73
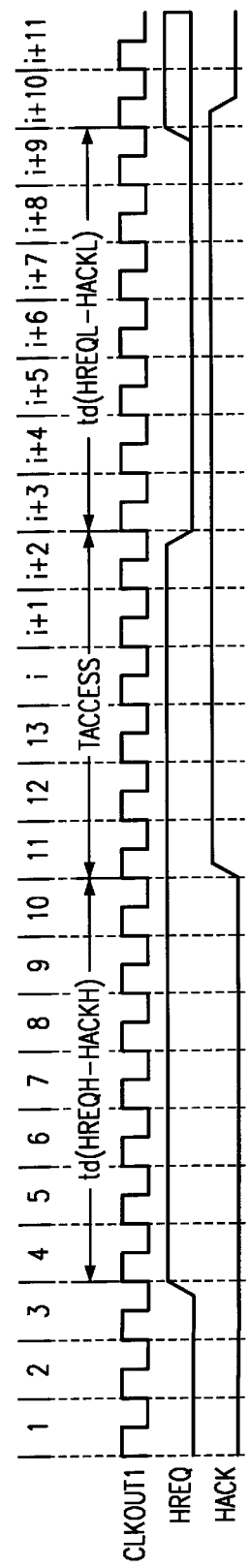
FIG. 74

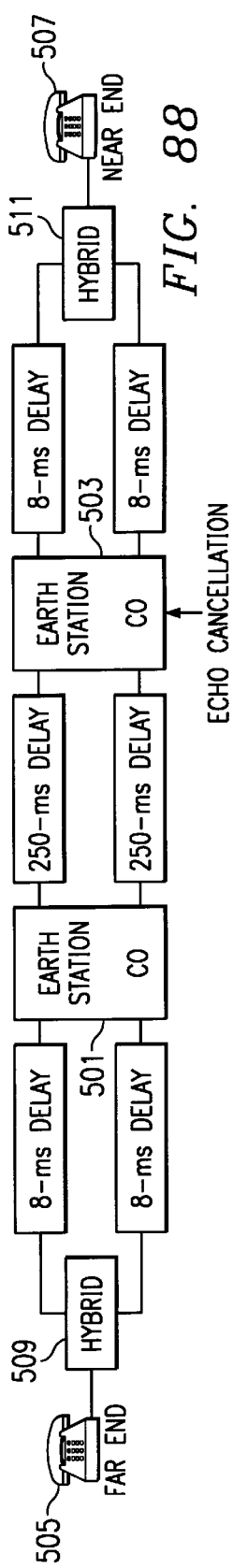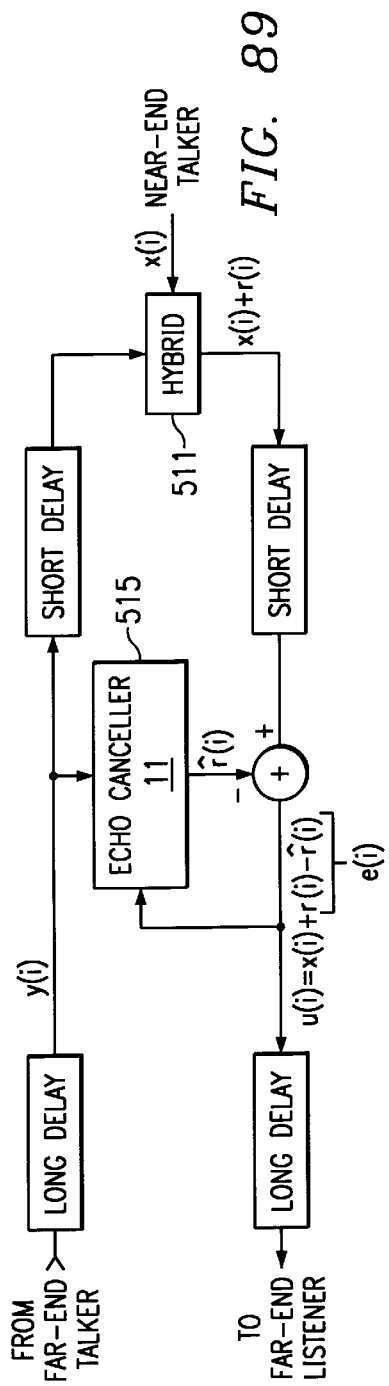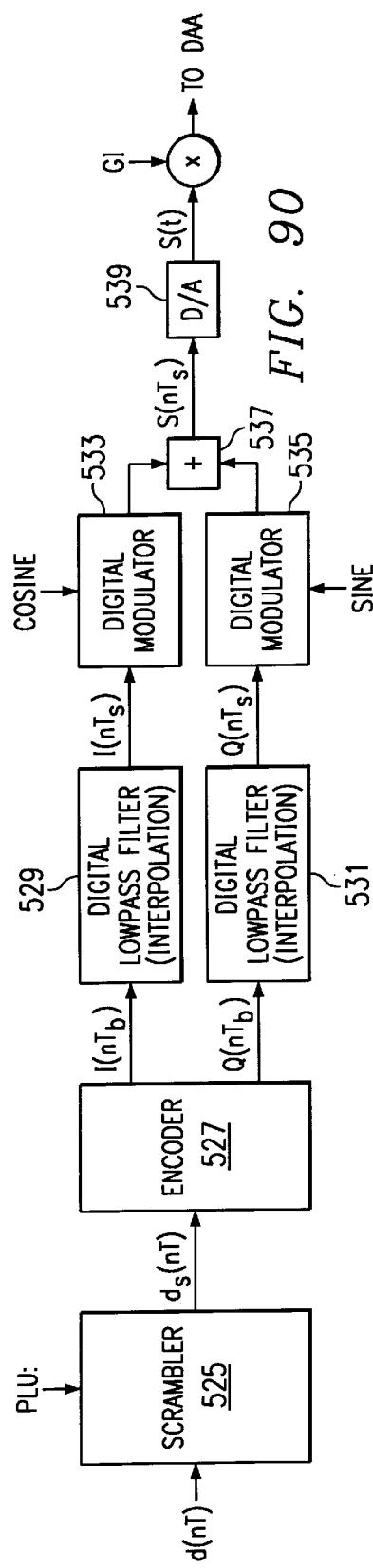

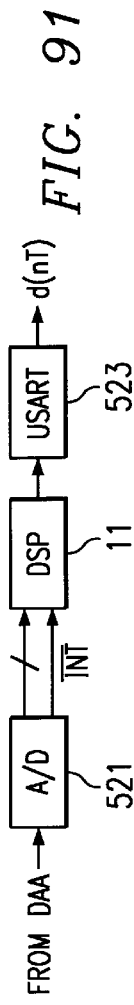
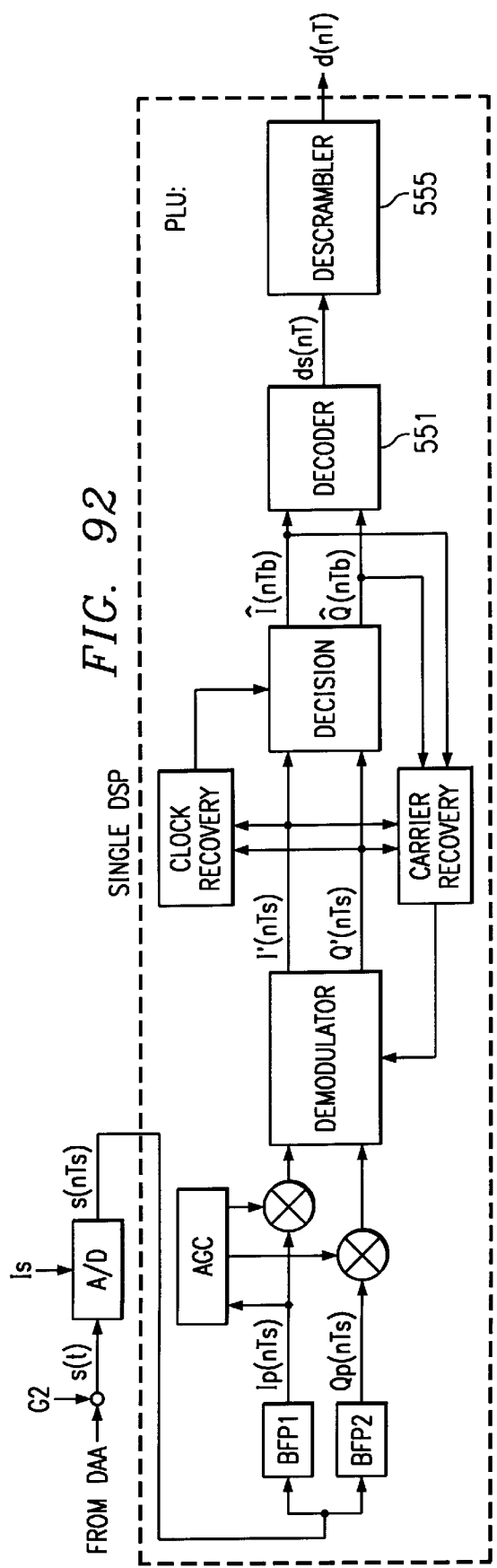
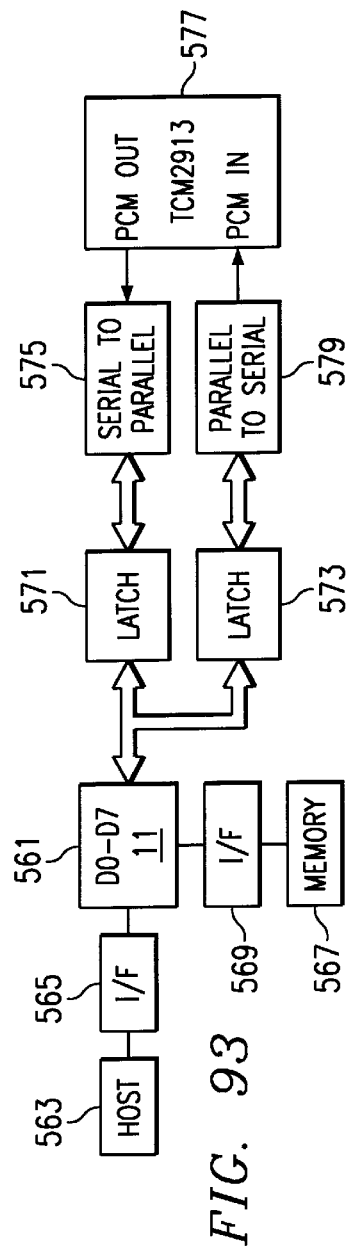
FIG. 91
FIG. 92
FIG. 93

MICROPROCESSOR

CROSS-REFERENCE TO RELATED APPLICATIONS

This application is related to coassigned Ser. No. 09/008,909 (TI-22106) now U.S. Pat. No. 5,958,044, Ser. No. 09/012,676 (TI-22109) now U.S. Pat. No. 6,055,628, Ser. No. 09/012,380 (TI-23604) now U.S. Pat. No. 6,078,940, Ser. No. 09/012,381 (TI-24333) now U.S. Pat. No. 6,003,125, Ser. No. 09/012,324 (TI-24334) now U.S. Pat. No. 6,061,780, Ser. No. 09/012,693 (TI-24335), Ser. No. 09/012,325 (TI-24942) now U.S. Pat. No. 6,112,291, Ser. No. 09/012,332 (TI-24956) now U.S. Pat. No. 6,058,474, Ser. No. 09/012,327 (TI-25248) now U.S. Pat. No. 6,128,725, Ser. No. 09/012,329 (TI-25309), and Ser. No. 09/012,326 (TI-25310); all filed contemporaneously herewith and incorporated herein by reference.

NOTICE (C) Copyright 1997 Texas Instruments Incorporated. A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

This application claims the benefit of U.S. Provisional Application No. 60/036,482, filed Jan. 24, 1997.

This invention relates to data processing devices, electronic processing and control systems and methods of their manufacture and operation.

BACKGROUND OF THE INVENTION

A microprocessor device is a central processing unit or CPU for a digital processor which is usually contained in a single semiconductor integrated circuit or "chip" fabricated by MOS/LSI technology, as shown in U.S. Pat. No. 3,757,306, issued to Gary W. Boone and assigned to Texas Instruments Incorporated. The Boone patent shows a single-chip 8-bit CPU including a parallel ALU, registers for data and addresses, an instruction register and a control decoder, all interconnected using the von Neumann architecture and employing a bidirectional parallel bus for data, address and instructions. U.S. Pat. No. 4,074,351, issued to Gary W. Boone and Michael J. Cochran, assigned to Texas Instruments Incorporated, shows a single-chip "microcomputer" type device which contains a 4-bit parallel ALU and its control circuitry, with on-chip ROM for program storage and on-chip RAM for data storage, constructed in the Harvard architecture. The term microprocessor usually refers to a device employing external memory for program and data storage, while the term microcomputer refers to a device with on-chip ROM and RAM for program and data storage. In describing the instant invention, the term "microcomputer" will be used to include both types of devices, and the term "microprocessor" will be primarily used to refer to microcomputers without on-chip ROM. Since the terms are often used interchangeably in the art, however, it should be understood that the use of one of the other of these terms in this description should not be considered as restrictive as to the features of this invention.

Modem microcomputers can be grouped into two general classes, namely general-purpose microprocessors and special-purpose micro-computers/microprocessors. General-purpose microprocessors, such as the M68020 manufactured by Motorola, Inc. are designed to be programmable by the user to perform any of a wide range of tasks, and are therefore often used as the central processing unit in equipment such as personal computers. Such general-purpose microprocessors, while having good performance for a wide range of arithmetic and logical functions, are of course not specifically designed for or adapted to any particular one of such functions. In contrast, special-purpose microcomputers are designed to provide performance improvement for specific predetermined arithmetic and logical functions for which the user intends to use the microcomputer. By knowing the primary function of the microcomputer, the designer can structure the microcomputer in such a manner that the performance of the specific function by the special-purpose microcomputer greatly exceeds the performance of the same function by the general-purpose microprocessor regardless of the program created by the user.

One such function which can be performed by a special-purpose microcomputer at a greatly improved rate is digital signal processing, specifically the computations required for the implementation of digital filters and for performing Fast Fourier Transforms. Because such computations consist to a large degree of repetitive operations such as integer multiply, multiple-bit shift, and multiply-and-add, a special-purpose microcomputer can be constructed specifically adapted to these repetitive functions. Such a special-purpose microcomputer is described in U.S. Pat. No. 4,577,282, assigned to Texas Instruments Incorporated and incorporated herein by reference. The specific design of a microcomputer for these computations has resulted in sufficient performance improvement over general purpose microprocessors to allow the use of such special-purpose microcomputers in real-time applications, such as speech and image processing.

Digital signal processing applications, because of their computation intensive nature, also are rather intensive in memory access operations. Accordingly, the overall performance of the microcomputer in performing a digital signal processing function is not only determined by the number of specific computations performed per unit time, but also by the speed at which the microcomputer can retrieve data from, and store data to, system memory. Prior special-purpose microcomputers, such as the one described in said U.S. Pat. No. 4,577,282, have utilized modified versions of a Harvard architecture, so that the access to data memory may be made independent from, and simultaneous with, the access of program memory. Such architecture has, of course provided for additional performance improvement.

The increasing demands of technology and the marketplace make desirable even further structural and process improvements in processing devices, application systems and methods of operation and manufacture.

Among the objects of the present invention are to provide improved data processing devices, systems and methods that reduce competition for processor resources between data acquisition, or output, functions and intensive computation operations; to provide improved data processing devices, systems and methods that reduce housekeeping overhead in a processor in high sample rate digital signal processing applications; to provide improved data processing devices, systems and methods for streamlining interrupt handling and subroutine calls and returns; and to provide improved data processing devices, systems and methods that increase processor bandwidth in telecommunications, control systems and other applications.

SUMMARY OF THE INVENTION

In general, one form of the invention is an improved data processing device that includes an improved very long instruction word (VLIW) electronic processor.

Generally, another form of the invention is a system of signal processing apparatus including an analog-to-digital converter for producing a digital signal corresponding to an analog input by a conversion process and for producing an interrupt signal when a conversion is complete. Digital processing circuitry having a memory and a processor connected to the analog-to-digital converter is responsive to the interrupt signal to enter the digital signal into memory. The processor includes registers sets, at least one multiplier and at least one arithmetic logic unit.

A microprocessor, comprising a first set of functional units capable of performing parallel data operations, a second set of functional units capable of performing parallel data operations, and a data interconnection path connecting the first and second functional units. A data processing system, comprising fetch circuitry for fetching a first plurality of instructions simultaneously, and circuitry capable of executing a second plurality of instructions simultaneously, wherein the second plurality of instructions is less than or equal to the first plurality of instructions. A data processing system, comprising fetch circuitry for fetching a first plurality of instructions simultaneously, and circuitry capable of conditionally executing a second plurality of instructions simultaneously, wherein the second plurality of instructions is less than or equal to the first plurality of instructions.

Other device, system and method forms of the invention are also disclosed and claimed herein. Other objects of the invention are disclosed and still other objects will be apparent from the disclosure herein.

BRIEF DESCRIPTION OF THE DRAWINGS

The novel features believed characteristic of the invention are set forth in the appended claims. The preferred embodiments of the invention as well as other features and advantages thereof will be best understood by reference to the detailed description which follows, read in conjunction with the accompanying drawings, wherein:

FIG. 3 shows the addressing mode register (AMR);

FIG. 4 shows the control status register (CSR) which contains control and status bits;

FIGS. 8A, 8B, 8C, 8D, 8E, 8F, 8G, 8H, 8I and 8J, together, show the DSP's opcode map;

FIG. 9 shows the basic format of a fetch packet;

FIG. 10A depicts a fully serial p-bit;

FIG. 10B depicts a fully parallel p-bit;

FIG. 10C depicts a partially serial p-bit;

FIG. 11 shows the phases of the pipeline;

FIG. 12 shows the branch instruction phases;

FIG. 13 shows the operation of the pipeline based on clock cycles and fetch packets;

FIG. 14 depicts fetch packet n, which contains three execute packets, shown followed by six fetch packets (n+1 through n+6), each with one execution packet (containing 8 parallel instructions);

FIG. 15 show the interrupt enable register (IER);

FIG. 19 shows the relationship of the ISTB to the table location;

FIG. 20 shows the interrupt return pointer (IRP);

FIG. 21 shows the NMI return pointer (NRP);

FIG. 26 shows the addressing example;

FIG. 54 shows the 16-bit Host Port used in FIGS. 52 and 53;

FIG. 55 shows the DSP data memory system;

FIG. 56 shows the different combinations of conflicting accesses;

FIGS. 59 and 60 show the effect of address and endianness on BE and external data (ED);

FIG. 72 shows the usage of fields in the EMIF control register;

FIG. 73 shows the interface of the Host Port to a host and to the internal data memory;

FIG. 74 shows the handshake operation for a host to gain access to the host port;

FIG. 88 is an electrical block diagram of an improved satellite telecommunications system;

FIG. 89 is an electrical block diagram of an improved echo canceling system for the system of FIG. 88;

FIG. 90 is an electrical block diagram of an improved modem transmitter;

FIG. 91 is an electrical block diagram equally representative of hardware blocks or process blocks for the improved modem transmitter of FIG. 90;

FIG. 92 is an electrical block diagram equally representative of hardware blocks or process blocks for an improved modem receiver;

FIG. 93 is an electrical block diagram of an improved system including a host computer and a digital signal processor connected for PCM (pulse code modulation) communications;

Corresponding numerals and other symbols refer to corresponding parts in the various figures of drawing except where the context indicates otherwise.

DETAILED DESCRIPTION

Figure 1:
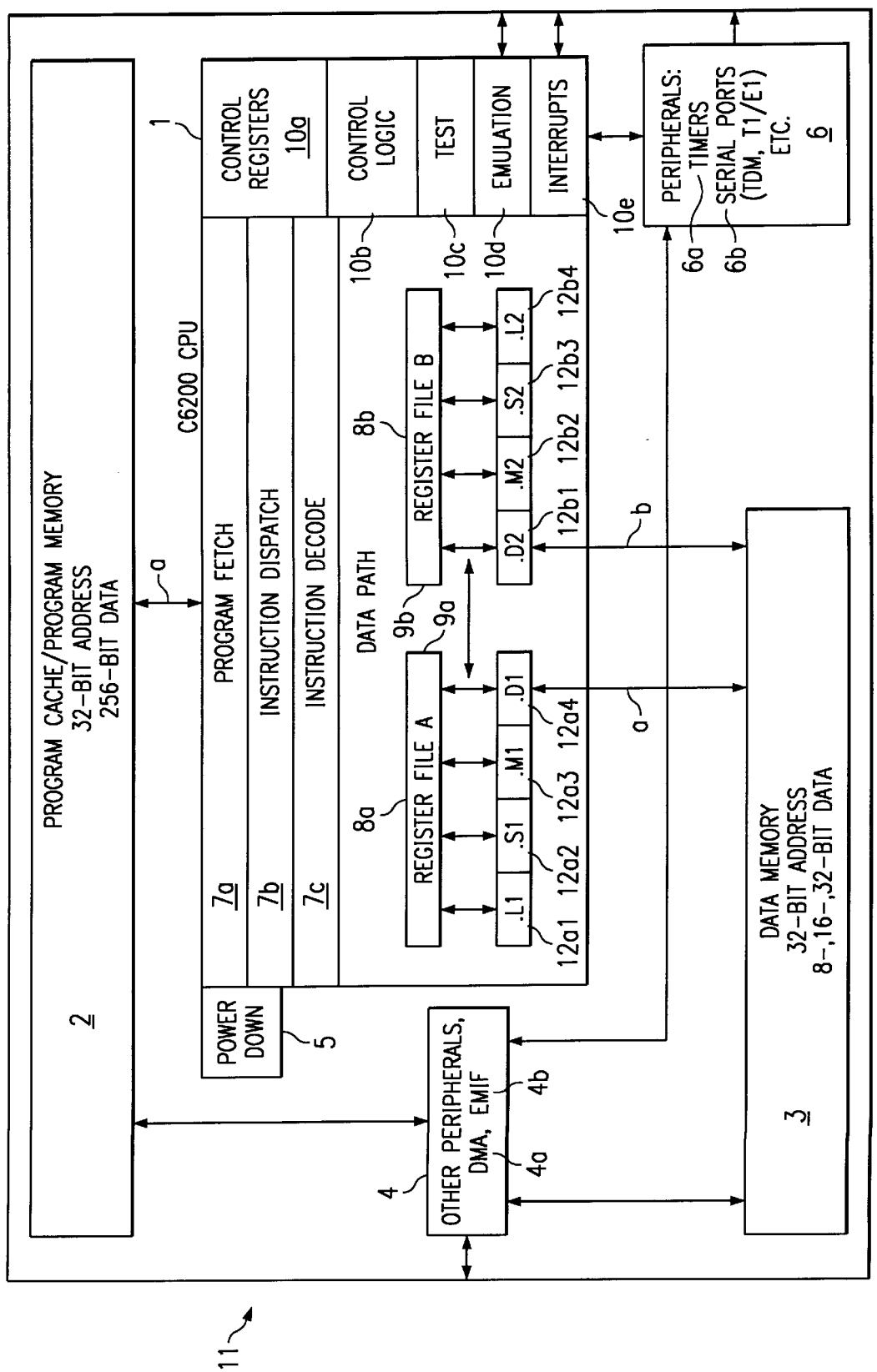
FIG. 1 shows a block diagram for a digital signal processor.

Referring now to FIG. 1, there may be seen a high level functional block diagram of a presently preferred microprocessor 11.

FIG. 1 shows a block diagram for a digital signal processor (DSP). The DSP is based on a CPU 1, shown in the right center portion of FIG. 1. The DSP devices 11 come with program memory 2 which may be used as a program cache. The devices 11 may also have varying sizes and/or types of data memory 3. Peripherals 4 such as a direct memory access (DMA) controller 4a, power-down logic 5, an external memory interface (EMIF) 46 preferably come with the CPU, and peripherals 6 such as serial ports 6b and host ports 6a are optionally available.

The DSP has a 32-bit, byte addressable address space. Internal (on-chip) memory is organized in separate data 3 and program spaces 2. When off-chip memory is used, preferably these two spaces are unified into a single memory space via the external memory interface (EMIF) 46.

The DSP has two internal ports 3a,3b to access data memory 3, each with 32 bits of data and a 32-bit byte address reach. The DSP has a single port 2a to access program memory 2, with an instruction-fetch width of 256 bits and a 30-bit word (four bytes) address, equivalent to a 32-bit byte address.

The following peripheral modules may be supplied on the DSP: serial ports; timers; external memory interface (EMIF) that supports synchronous and asynchronous SRAM and synchronous DRAM; 2-channel auto-bootloading direct memory access (DMA) controller; host port; and power-down logic that can halt CPU activity, peripheral activity, and PLL activity to reduce power consumption.

Continuing to refer to FIG. 1, the CPU contains: a program fetch unit 7a; an instruction dispatch unit 7b; an instruction decode unit 7c; two data paths 8a,8b, each with four functional units .L1, .S1, .M1 and .D1 or .L2, .S2, .M2 and .D2); 32 32-bit registers 9; control registers 10a; control logic 10b; and test 10c, emulation 10d, and interrupt 10e logic The program fetch 7a, instruction dispatch 7b, and instruction decode 7c units can deliver up to eight 32-bit instructions from the program memory 2 to the functional units every cycle. Processing occurs in each of the two data paths (8a and 8b). Each data path 8 has four functional units (.L, .S, .M, and .D) and a register file 9a or 9b containing 16 32-bit registers. Each functional unit is controlled by a 32-bit instruction. The data paths are covered in more detail later herein. A control register file 10a provides the means to configure and control various processor operations. How instructions are fetched, dispatched, decoded, and executed in the data path are described later herein with reference to pipeline operations.

Figure 2:
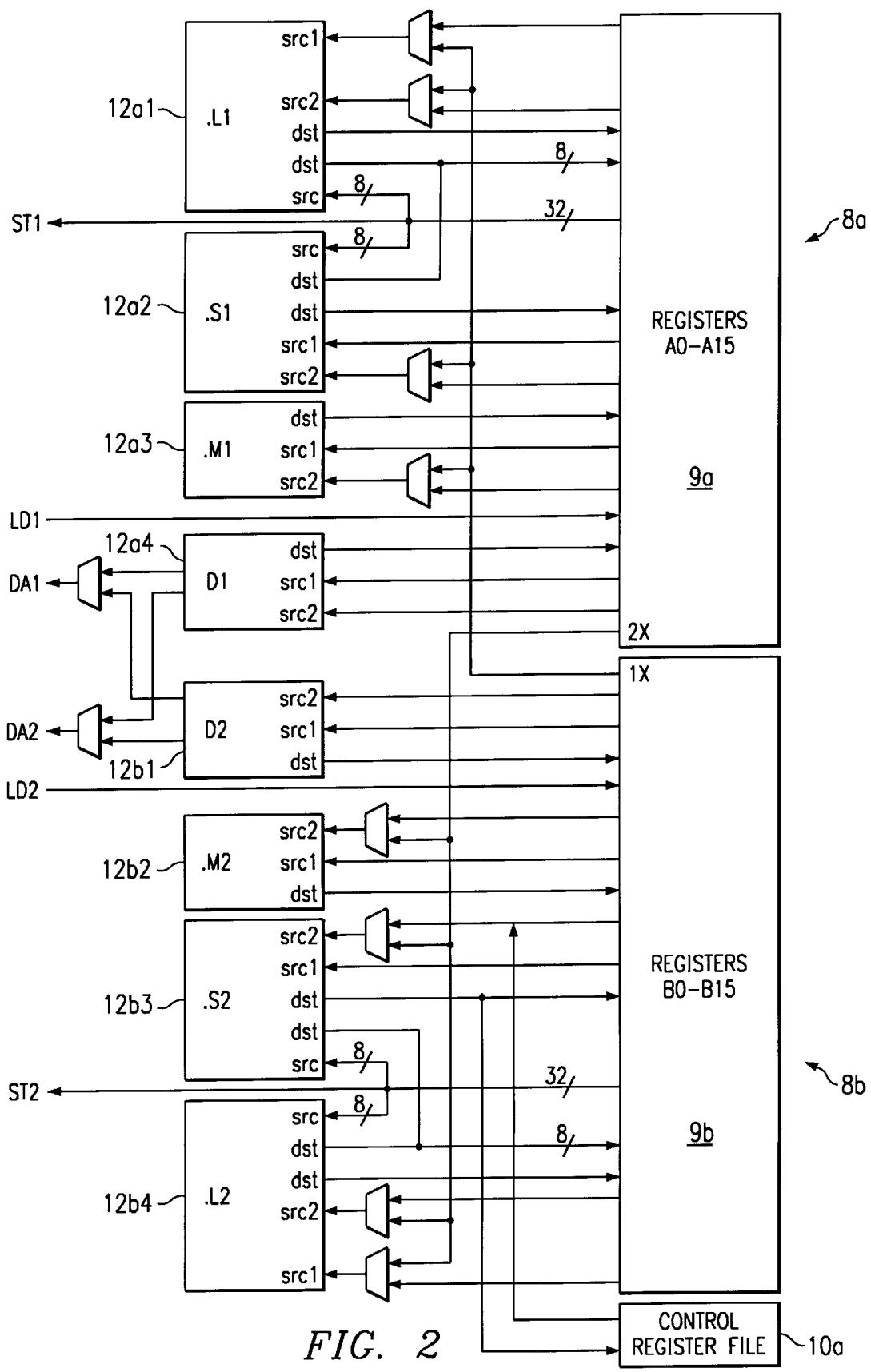
FIG. 2 shows the CPU data paths.

FIG. 2 shows the CPU 1 data paths, which consists of: two general purpose register files (9a and 9b); eight functional units (.L1, .L2, .S1, .S2, .M1, .M2, .D1, and .D2, ); two load-from-memory paths (LD1 and LD2); two store-to-memory paths (ST1 and ST2); and two register file cross paths (1X and 2X).

There are two general purpose register files (9a and 9b) in the data paths. Each of these files contains 16 32-bit registers (labeled A0–A15 for file A and B0–B15 for file B). The general purpose registers can be used for data, data address pointers, or as condition registers.

The eight functional units in the data paths can be divided into two groups of 4 (12a1–12a4 and 12b1–12b4), each of which is virtually identical for each register file. The functional units are described in Table 1 below.

TABLE 1

Functional Units and Descriptions

| Functional Unit | Description |
| --- | --- |
| .L Unit (.L1,.L2) | 32/40-bit arithmetic and compare operations<br>Left most 1, 0, bit counting for 32 bits<br>Normalization count for 32 and 40 bits<br>32 bit logical operations |
| .S Unit (.S1, .S2) | 32-bit arithmetic operations<br>32/40 bit shifts and 32-bit bit-field operations<br>32 bit logical operations,<br>Branching<br>Constant generation<br>Register transfers to/from the control register file |
| .M Unit (.M1, .M2) | 16 × 16 bit multiplies |
| .D Unit (.D1, .D2) | 32-bit add, subtract, linear and circular address calculation |

Most data lines in the CPU 1 support 32-bit operands, and some support long (40-bit) operands. Each functional unit has its own 32-bit write port into a general-purpose register file. All units ending in 1 (for example, .L1) write to register file A and all units ending in 2 write to register file B. As depicted in FIG. 2, each functional unit has two 32-bit read ports for source operands src1 and src2. Four units (.L1, .L2, .S1, .S2) have an extra 8-bit wide port for 40-bit long writes as well as an 8-bit input for 40-bit long reads. Because each unit has its own 32-bit write port, all eight units can be used in parallel every cycle.

As depicted in FIG. 2, each general-purpose register file is connected to the opposite register file's functional units by the 1X and 2X paths. These paths allow the .S, .M, and, .L units from each side to access operands from either file.

Four units (.M1, .M2, .S1, .S2), have one 32-bit input mux selectable with either the same side register file (A for units ending in a 1 and B for units ending in a 2), or the opposite file via the cross paths (1X and 2X). The 32-bit inputs on the .L1 and .L2 units are both multiplexer ("mux") selectable via the cross paths.

There are two 32-bit paths for loading data from memory to the register file: one (LD1) for register file A, and one (LD2) for register file B. There are also two 32-bit paths, ST1 and ST2, for storing register values to memory from each register file. The store paths are shared with the .L and .S long read paths.

As depicted in FIG. 2, the data address paths (DA1 and DA2) coming out of the .D units allow data addresses generated from one register file to support loads and stores to memory from the other register file.

As depicted in FIG. 2, one unit (.S2) can read from and write to the control register file. Table 2 lists the control registers contained in the control register file, and briefly describes each. The control registers are described more fully later herein. Each control register is accessed by the MVC instruction; see the MVC instruction description later herein.

TABLE 2

Control Registers

| Abbreviation | Name | Description | Page No. |
| --- | --- | --- | --- |
| AMR | Addressing mode register | Specifies whether to use linear or circular addressing for one of eight registers; also contains sizes for circular addressing | 2–9 |
| CSR | Control status register | Contains the global interrupt enable bit, cache control bits, and other miscellaneous control and status bits | 2–11 |
| IFR | Interrupt flag register | Displays status of interrupts | 5–7 |
| ISR | Interrupt set register | Allows you to set pending interrupts manually | 5–8 |
| ICR | Interrupt clear register | Allows you to clear pending interrupts manually | 5–8 |
| IER | Interrupt enable register | Allows enabling/disabling of individual interrupts | 5–6 |
| ISTP | Interrupt service table pointer | Points to the beginning of the interrupt service table | 5–10 |
| IRP | Interrupt return pointer | Contains the address to be used to return from a maskable interrupt | 5–12 |
| NRP | Nonmaskable interrupt return pointer | Contains the address to be used to return from a nonmaskable interrupt | 5–12 |
| IN | General-purpose input register | Contains 32 input signals | 2–12 |
| OUT | General-purpose output register | Contains 32 output signals | 2–12 |

TABLE 2-continued

Control Registers

| Abbreviation | Name | Description | Page No. |
|---|---|---|---|
| PCE1 | Program counter | Contains the address of the fetch packet that contains the execute packet in the E1 pipeline stage | |
| PDATA_O | Program data out | Contains 12 output signals; used by the STP instruction to write to program space | |

FIG. 3 shows the addressing mode register, (AMR). Eight registers (A4–A7, B4–B7) can perform circular addressing. For each of these registers, the AMR specifies the addressing mode. A 2-bit field for each register is used to select the address modification mode: linear (the default) or circular mode. With circular addressing, the field also specifies which BK (block size) field to use for a circular buffer. In addition, the buffer must be aligned on a byte boundary equal to the block size. The mode select field encoding is shown in Table 3.

TABLE 3

Addressing Mode Field Encoding

| Mode | Description |
|---|---|
| 00 | Linear modification (default at reset) |
| 01 | Circular addressing using the BK0 field |
| 10 | Circular addressing using the BK1 field |
| 11 | Reserved |

The block size fields, BK0 and BK1, specify block sizes for circular addressing. The five bits in BK0 and BK1 specify the width. The formula for calculating the block size width is:

Block size (in bytes)=$2^{(N+1)}$ where N is the value in BK1 or BK0

Table 4 shows block size calculations for all 32 possibilities.

TABLE 4

Block Size Calculations

| N | Block Size | N | Block Size |
|---|---|---|---|
| 00000 | 2 | 10000 | 131?072 |
| 00001 | 4 | 10001 | 262?144 |
| 00010 | 8 | 10010 | 524?288 |
| 00011 | 16 | 10011 | 1?048?576 |
| 00100 | 32 | 10100 | 2?097?152 |
| 00101 | 64 | 10101 | 4?194?304 |
| 00110 | 128 | 10110 | 8?388?608 |
| 00111 | 256 | 10111 | 16?777?216 |
| 01000 | 512 | 11000 | 33?554?432 |
| 01001 | 1?024 | 11001 | 67?108?864 |
| 01010 | 2?048 | 11010 | 134?217?728 |
| 01011 | 4?096 | 11011 | 268?435?456 |
| 01100 | 8?192 | 11100 | 536?870?912 |
| 01101 | 16?384 | 11101 | 1?073?741?824 |
| 01110 | 32?768 | 11110 | 2?147?483?648 |
| 01111 | 65?536 | 11111 | 4?294?967?296 |

The control status register (CSR), shown in FIG. 4, contains control and status bits. The function of the bit fields in the CSR are shown in Table 5.

TABLE 5

Control Status Register: Bit Fields, Read/Write Status and Function

| Bit Position | Width | Bit Field Name | Function |
|---|---|---|---|
| 31–24 | 8 | CPU ID | CPU ID. Defines which CPU. |
| 23–16 | 8 | Rev ID | Revision ID. Defines silicon revision of the CPU. |
| 15–10 | 6 | PWRD | Control power down modes. The values will always be read as zero. |
| 9 | 1 | SAT | The saturate bit, set when any unit performs a saturate, can be cleared only by the MVC instruction and can be set only by a functional unit. The set by a functional unit has priority over a clear (by the MVC instruction) if they occur on the same cycle. The saturate bit gets set one full cycle (1 delay slot) after a saturate occurs. |
| 8 | 1 | EN | Endian bit: 1 = little endian, 0 = big endian. |
| 7–5 | 3 | PCC | Program cache control mode |
| 4–2 | 3 | DCC | Data cache control mode |
| 1 | 1 | PGIE | Previous GIE (global interrupt enable). Saves CIE when an interrupt is taken. |
| 0 | 1 | GIE | Global interrupt enable. Enables (1) or disables (0) all interrupts except the reset interrupt and NMI (nonmaskable interrupt). |

Figure 5:
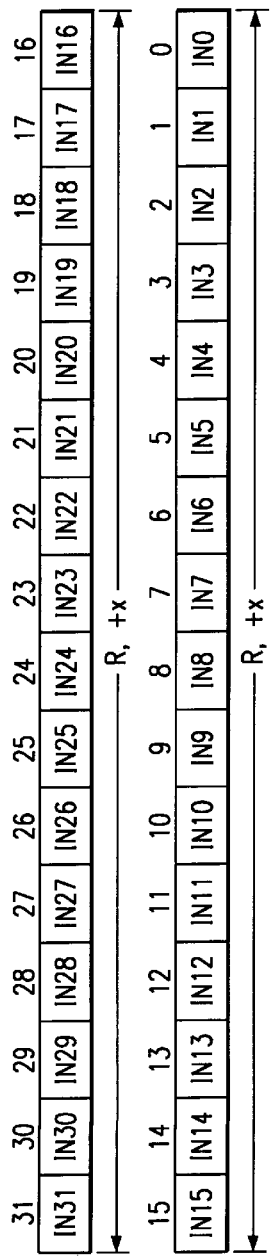
FIG. 5 depicts a general-purpose input register (IN) which supports 32 general-purpose input signals.
Figure 6:
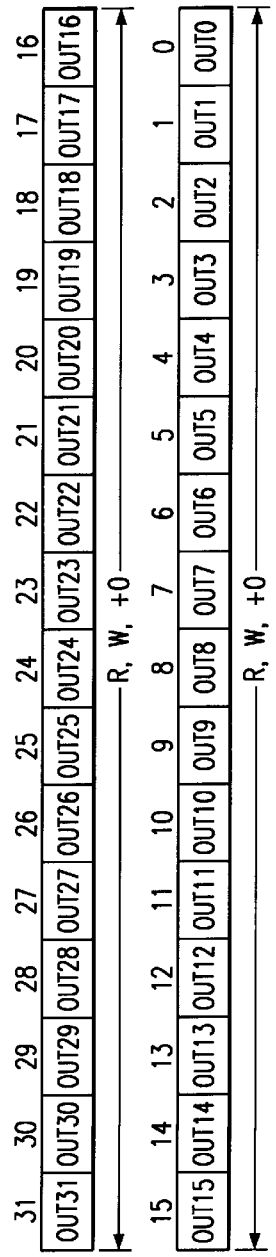
FIG. 6 depicts a general-purpose output register (OUT) which supports 32 general-purpose output signals.

A general-purpose input register (IN) depicted in FIG. 5 supports 32 general-purpose input signals, while a general-purpose output register (OUT) depicted in FIG. 6 supports 32 general-purpose output signals. The function of these signals is described later herein.

Table 6 below explains various symbols used herein.

TABLE 6

Instruction Operation and Execution Notations

| Symbol | Meaning |
|---|---|
| int | 32-bit register value |
| long | 40-bit register value |
| creg | 3-bit field specifying a conditional register |
| cstn | n-bit constant |
| LSBn | n least significant bits |
| MSBn | n most significant bits |
| ® | Assignment |
| + | Addition |
| − | Subtraction |
| × | Multiplication |
| +a | Perform twos-complement addition using the addressing mode defined by the AMR |
| −a | Perform twos-complement subtraction using the addressing mode defined by the AMR |
| and | Bitwise AND |
| or | Bitwise OR |
| xor | Bitwise exclusive OR |
| not | Bitwise logical complement |
| by$_{y..z}$ | Selection of bits y through z of bit string b |
| << | Shift left |
| >>s | Shift right with sign extension |
| >>z | Shift right with a zero fill |
| x clear b,e | Clear a field in x, specified by b (beginning bit) and e (ending bit) |
| x exts l,r | Extract and sign-extend a field in x, specified by l (shift left value) and r (shift right value) |
| x extu l,r | Extract an unsigned field in x, specified by l (shift left value) and r (shift right value) |
| +s | Perform twos-complement addition and saturate the result to the result size, if an overflow or underflow occurs |
| −s | Perform twos-complement subtraction and saturate the result to the result size, if an overflow or underflow occurs |
| x set b,e | Set field in x, to all 1s specified by b (beginning bit) and e (ending bit) |
| abs(x) | Absolute value of x |
| lmb0(x) | Leftmost 0 bit search of x |
| lmb1(x) | Leftmost 1 bit search of x |
| norm(x) | Leftmost nonredundant sign bit of x |
| R | Any general purpose register |
| cond | Check for either creg equal to zero or creg not equal to zero |
| nop | No operation |

Table 7 and Table 8 define the mapping between instructions and functional units.

TABLE 7

Instruction to Functional Unit Mapping

| .L Unit | .M Unit | .S Unit | .D Unit |
|---|---|---|---|
| ABS | MPY | ADD | ADD |
| ADD | SMPY | ADDK | ADDA |
| AND | | ADD2 | LD mem |
| CMPEQ | | AND | LD mem (15-bit offset) |
| CMPGT | | B disp | MV |
| CMPGTU | | B IRP | NEG |
| CMPLT | | B NRP | ST mem |
| CMPLTU | | B reg | ST mem (15-bit offset) |
| LMBD | | CLR | SUB |
| MV | | EXT | SUBA |
| NEG | | EXTU | ZERO |
| NORM | | MVC | |
| NOT | | MV | |
| OR | | MVK | |
| SADD | | MVKH | |
| SAT | | NEG | |
| SSUB | | NOT | |
| SUB | | OR | |
| SUBC | | SET | |
| XOR | | SHL | |
| ZERO | | SHR | |

TABLE 7-continued

Instruction to Functional Unit Mapping

| .L Unit | .M Unit | .S Unit | .D Unit |
|---|---|---|---|
| | | SHRU | |
| | | SSHL | |
| | | STP[?] | |
| | | SUB | |
| | | SUB2 | |
| | | XOR | |
| | | ZERO | |

TABLE 8

Functional Unit to Instruction Mapping

| | C62xx Functional Units | | | |
|---|---|---|---|---|
| Instruction | .L Unit | .M Unit | .S Unit | .D Unit |
| ABS | n | | | |
| ADD | n | | n | n |
| ADDA | | | | n |
| ADDK | | | n | |
| ADD2 | | | n | |
| AND | n | | n | |
| B | | | n | |
| B IRP | | | n[?] | |
| B NRP | | | n[?] | |
| B reg | | | n[?] | |
| CLR | | | n | |
| CMPEQ | n | | | |
| CMPGT | n | | | |
| CMPGTU | n | | | |
| CMPLT | n | | | |
| CMPLTU | n | | | |
| EXT | | | n | |
| EXTU | | | n | |
| IDLE | | | | |
| LD mem | | | | n |
| LD mem (15-bit offset) | | | | n |
| LMBD | n | | | |
| MPY | | n | | |
| MVC | | | n | |
| MV | n | | n | n |
| MVK | | | n | |
| MVKH | | | n | |
| NEG | n | | n | n |
| NOP | | | | |
| NORM | n | | | |
| NOT | n | | n | |
| OR | n | | n | |
| SADD | n | | | |
| SAT | n | | | |
| SET | | | n | |
| SHL | | | n | |
| SHR | | | n | |
| SHRU | | | n | |
| SMPY | | n | | |
| SSHL | | | n | |
| SSUB | n | | | |
| ST mem | | | | n |
| ST mem (15-bit offset) | | | | n |
| STP | | | n | |
| SUB | n | | n | n |
| SUBA | | | | n |
| SUBC | n | | | |
| SUB2 | | | n | |
| SWI | | | | |
| XOR | n | | n | |
| ZERO | n | | n | n |

The general-purpose register file supports 32- and 40-bit data. 32-bit data is contained in single registers. 40-bit data is contained across two registers; the 32 LSBs of the data are stored in an even register and the 8 MSBs are stored in the 8 LSBs of the next register (which is always an odd register). There are 16 valid register pairs for 40-bit data as shown in Table 9. In assembly language syntax, the register pairs are denoted by a colon in between the register names. The odd register is specified first.

TABLE 9

Long Register Pairs

| Register File | |
|---|---|
| A | B |
| A1:A0 | B1:B0 |
| A3:A2 | B3:B2 |
| A5:A4 | B5:B4 |
| A7:A6 | B7:B6 |
| A9:A8 | B9:B8 |
| A11:A10 | B11:B10 |
| A13:A12 | B13:B12 |
| A15:A14 | B15:B14 |

Figure 7:
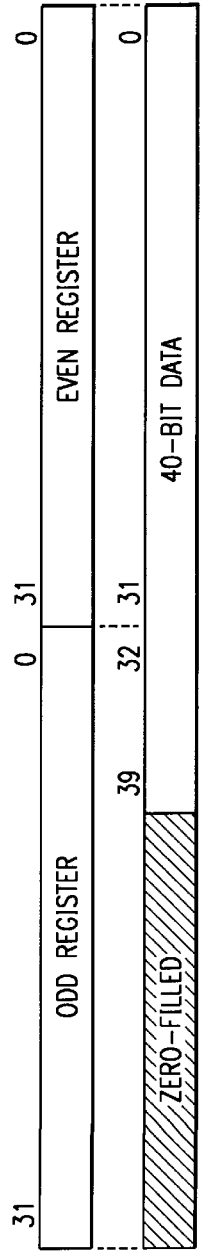
FIG. 7 illustrates the register storage scheme for 40-bit data.

FIG. 7 illustrates the register storage scheme for 40-bit data. Operations requiring a long input ignore the 24 MSBs of the odd register. Operations producing a long result zero-fill the 24 MSBs of the odd register. The even register is encoded in the opcode.

The DSP's opcode map is shown in FIGS. 8A through 8J. Refer to Table 6 and the instruction descriptions later herein for explanations of the field syntaxes and values.

All instructions can be conditional. The condition is controlled by a 3-bit (creg) field specifying the register tested, and a 1-bit field (z) specifying a test for zero or nonzero. The four MSBs of every opcode are creg and z. The register is tested at the beginning of the E1 pipeline stage for all instructions. The pipeline is described later herein. If z=1, the test is for equality with zero. If z=0, the test is for nonzero. The case of condition register field (creg)=0 and z=0 is treated as always true to allow instructions to be executed unconditionally. The creg register field is encoded as shown in Table 10.

TABLE 10

Registers That Can Be Tested by Conditional Operations

| creg | | | z | |
|---|---|---|---|---|
| 31 | 30 | 29 | 28 | Register Tested |
| 0 | 0 | 0 | 0 | Unconditional. |
| 0 | 0 | 0 | 1 | Reserved. |
| 0 | 0 | 1 | z | B0 |
| 0 | 1 | 0 | z | B1 |
| 0 | 1 | 1 | z | B2 |
| 1 | 0 | 0 | z | A1 |
| 1 | 0 | 1 | z | A2 |
| 1 | 1 | x | x | Reserved |

Note: x is don't care for reserved cases.

Conditional instructions are represented by "[ ]" surrounding the condition register. The following execute packet contains two ADD instructions in parallel. The first ADD is conditional on B0 being non-zero. The second ADD is conditional on B0 being zero. '!' indicates the 'not' of the condition.

|   | [B0] ADD  | .L1 | A1,A2,A3 |
|---|-----------|-----|----------|
| ‖ | [!B0] ADD | .L2 | B1,B2,B3 |

The above instructions are mutually exclusive. This means that only one will execute.

If they are scheduled in parallel, mutually exclusive instructions must still follow all resource constraints mentioned later herein.

If mutually exclusive instructions share any resources as described later herein, they cannot be scheduled in parallel (put in the same execute packet), even though only one will end up executing.

The execution of instructions can be defined in terms of delay slots. Table 11 shows the types of instructions, how many delay slots each type instruction has, and the execute phases it uses. Delay slots are the number of extra cycles it takes before a result is available to be read after the source operands are read. For a single-cycle type instruction (such as ADD), if source operands are read in cycle i, the result can be read in cycle i+1. For a multiply instruction (MPY), if source operands are read in cycle i, the result can be read in cycle I+2.

TABLE 11

Delay Slot Summary

| Instruction Type | Delay Slots | Execute Phases Used |
|---|---|---|
| Branch (The cycle when the target enters E1) | 5 | E1- branch target E1 |
| Load (LD) (Incoming Data) | 4 | E1–E5 |
| Load (LD) (Address Modification) | 0 | E1 |
| Multiply | 1 | E1–E2 |
| Single-cycle | 0 | E1 |
| Store (ST) (Address modification) | 0 | E1 |
| NOP (no execution pipeline operation) | — | — |
| STP (no CPU internal results written) | — | — |

Figures 9, 10A, 10B, 10C:
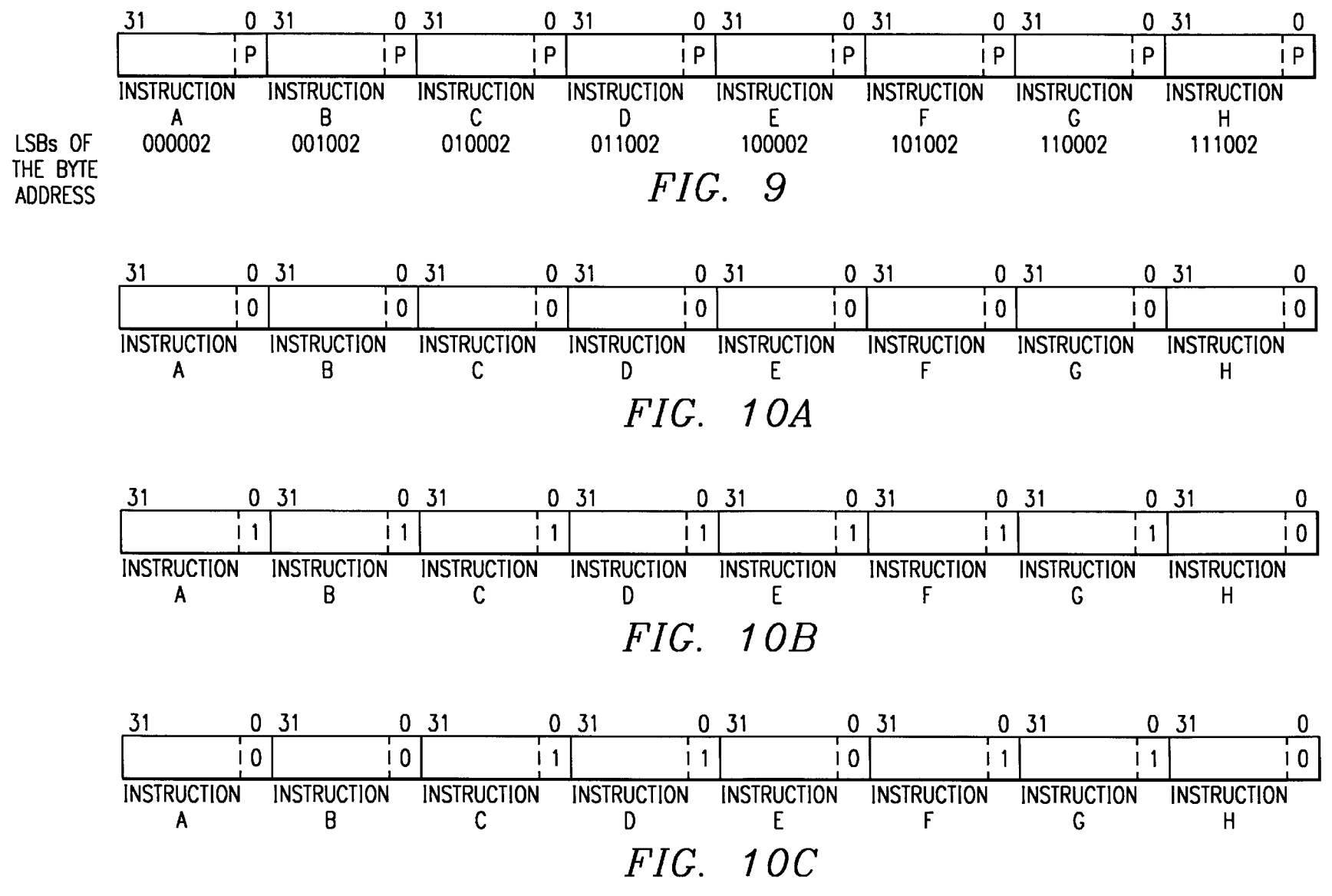

Instructions are always fetched eight at a time. This constitutes a fetch packet. The basic format of a fetch packet is shown in FIG. 9. The execution grouping of the fetch packet is specified by the p-bit, bit zero, of each instruction. Fetch packets are 8-word aligned.

The p bit controls the parallel execution of instructions. The p bits are scanned from left to right (lower to higher address). If the p bit of instruction i is 1, then instruction i+1 is to be executed in parallel with (in the same cycle as) instruction i. If the p-bit of instruction i is 0, then instruction i+1 is executed in the cycle after instruction i. All instructions executing in parallel constitute an execute packet. An execute packet can contain up to eight instructions. All instructions in an execute packet must use a unique functional unit.

An execute packet cannot cross an 8-word boundary. Therefore, the last p bit in a fetch packet is always set to 0, and each fetch packet starts a new execute packet. The following examples illustrate the conversion of a p-bit sequence into a cycle-by-cycle execution stream of instructions. There are three types of p-bit patterns for fetch packets. These three p-bit patterns result in the following execution sequences for the eight instructions: fully serial; fully parallel; or partially serial. These three sequences of execution are explained more fully below.

This fully serial p-bit pattern depicted in FIG. 10A results in this execution sequence:

| Cycle | Instructions |
|---|---|
| 1 | A |
| 2 | B |
| 3 | C |
| 4 | D |

-continued

| Cycle | Instructions |
|---|---|
| 5 | E |
| 6 | F |
| 7 | G |
| 8 | H |

The eight instructions are executed sequentially.

3.7.2

This fully parallel p-bit pattern depicted in FIG. 10B results in this execution sequence:

| Cycle | Instructions | | | | | | | |
|---|---|---|---|---|---|---|---|---|
| 1 | A | B | C | D | E | F | G | H |

All eight instructions are executed in parallel.

This partially serial p-bit pattern depicted in FIG. 10C results in this execution sequence:

| Cycle | Instructions | | | |
|---|---|---|---|---|
| 1 | A | | | |
| 2 | B | | | |
| 3 | C | D | E | |
| 4 | F | G | H | |

Note that the instructions C, D, and E do not use any of the same functional units, cross paths, or other data path resources. This is also true for instructions F, G, and H.

The || characters signify that an instruction is to execute in parallel with the previous instruction. In the previous partially serial example, the code would be represented as this:

|   |   |   |
|---|---|---|
|   | instruction | A |
|   | instruction | B |
|   | instruction | C |
| \|\| | instruction | D |
| \|\| | instruction | E |
|   | instruction | F |
| \|\| | instruction | G |
| \|\| | instruction | H |

If a branch into the middle of an execution packet occurs, all instructions at lower addresses are ignored. In the partially serial example, if a branch to the address containing instruction D occurs, then only D and E will execute. Even though instruction C is in the same execute packet, it is ignored. Instructions A and B are also ignored because they are in earlier execute packets.

No two instructions within the same execute packet can use the same resources. Also, no two instructions can write to the same register during the same cycle. The following describes each of the resources an instruction can use.

Two instructions using the same functional unit cannot be issued in the same execute packet.

The following execute packet is invalid:
ADD .S1 A0, A1, A2;\.S1 is used for
|| SHR .S1 A3, 15, A4; /both instructions
The following execute packet is valid:
ADD .L1 A0, A1, A2;\Two different functional
|| SHR .S1 A3, 15, A4; /units are used Cross Paths (1X and 2X): one unit (either a .S, .L, or .M) per data path, per execute packet, can read a source operand from its opposite register file via the cross paths (1X and 2X). For example, .S1 can read both operands from the A register file, or one operand from the B register file using the 1X cross path. This is denoted by an X following the unit name.

Two instructions using the same X cross path between register files -cannot be issued in the same execute packet since there is only one path from A to B and one path from B to A.

The following execute packet is invalid:
ADD .L1X A0,B1,A1; \1X cross path is used
|| MPY .M1X A4,B4,A5; /for both instructions
The following execute packet is valid:
ADD .L1X A0,B1,A1; \Instructions use the 1X and
|| MPY .M2X A4,B4,B2; /2X cross paths
The operand will come from a register file opposite of the destination if the x bit in the instruction field is set (as shown in the opcode map).

Loads and stores can use an address pointer from one register file while loading to or storing from the other register file. Two loads and/or stores using an address pointer from the same register file cannot be issued in the same execute packet.

The following execute packet is invalid:
LDW .D1 *A0,A1; \Address registers from the same
|| LDW .D1 *A2,B2; /register file
The following execute packet is valid:
LDW .D1 *A0,A1; \Address registers from different
|| LDW .D2 *B0,B2; /register files
Two loads and/or stores loading to and/or storing from the same register file cannot be issued in the same execute packet.

The following execute packet is invalid:
LDW .D1 *A4,A5; \Loading to and storing from the
|| STW .D2 A6,*B4; /same register file
The following execute packet is valid:
LDW .D1 *A4,B5; \Loading to, and storing from
|| STW .D2 A6,*B4; /different register files
Only one long result may be written per cycle on each side of the register file. Because the .S and .L units share a read register port for long source operands and a write register port for long results, only one may be issued per side in an execute packet.

The following execute packet is invalid:
ADD .L1 A5:A4,A1,A3:A2; \Two long writes
|| SHL .S1 A8,A9,A7:A6; /on A register file
The following execute packet is valid:
ADD .L1 A5:A4,A1,A3:A2; \One long write for
|| SHL .S2 B8,B9,B7:B6; /each register file
Because the .L and .S units share their long read port with the store port, operations that read a long value cannot be issued on the .L and/or .S units in the same execute packet as a store.

The following execute packet is invalid:
ADD .L1 A5:A4,A1,A3:A2; \Long read operation and a
|| STW .D1 A8,*A9; /store
The following execute packet is valid:
ADD .L1 A4, A1, A3:A2; \No long read with
|| STW .D1 A8,*A9; /with the store
More than four reads of the same register cannot occur on the same cycle. Conditional registers are not included in this count.

The following code sequence is invalid:
MPY .M1 A1,A1,A4; five reads of register A1
‖ ADD .L1 A1,A1,A5
‖ SUB .D1 A1,A2,A3
whereas this code sequence is valid:
MPY .M1 A1,A1,A4; only four reads of A1
‖ [A1] ADD .L1 A0,A1,A5
‖ SUB .D1 A1,A2,A3

Multiple writes to the same register on the same cycle can occur if instructions with different latencies writing to the same register are issued on different cycles. For example, an MPY issued on cycle i followed by an ADD on cycle i+1 cannot write to the same register since both instructions will write a result on cycle i+1. Therefore, the following code sequence is invalid:
MPY .M1 A0,A1,A2
ADD .L1 A4,A5,A2

Table 12 shows different multiple write conflicts. For example, the ADD and SUB in execute packet L1 write to the same register. This conflict is easily detectable.

The MPY in packet L2 and the ADD in packet L3 might both write to B2 simultaneously; however, if a branch instruction causes the execute packet after L2 to be something other than L3, this would not be a conflict. Thus, the potential conflict in L2 and L3 might not be detected by the assembler. The instructions in L4 do not constitute a write conflict because they are mutually exclusive. In contrast, because it is not obvious that the instructions in L5 are mutually exclusive, the assembler cannot determine a conflict. If the pipeline does receive commands to perform multiple writes to the same register, the result is undefined.

TABLE 12

Examples of the Detectability of
Write Conflicts by the Assembler

| L1: | | ADD | .L2 | B5, | B6, | B7; | detectable, conflict |
| ‖ | | SUB | .52 | B8, | B9, | B7 | |
| L2: | | MPY | .M2 | B0, | B1, | B2 | ; \ not detectable |
| L3: | | ADD | .L2 | B3, | B4, | B2 | ;/ |
| L4: | [!B0] | ADD | .L2 | B5, | B6, | B7 | ; detectable, no conflict |
| ‖ | [B0] | SUB | .S2 | B8, | B9, | B7 | |

TABLE 12-continued

Examples of the Detectability of
Write Conflicts by the Assembler

| L5: | [!B1] | ADD | .L2 | B5, | B6, | B7 | ; \ not detectable |
| ‖ | [B0] | SUB | .S2 | B8, | B9; | B7 | ;/ |

The addressing modes are linear, circular using BK0, and circular using BK1. The mode is specified by the addressing mode register (AMR).

Eight registers can perform circular addressing. A4–A7 are used by the .D1 unit and B4–B7 are used by the .D2 unit. No other units can perform circular addressing modes. For each of these registers, the AMR specifies the addressing mode.

LD(B)(H)(W), ST(B)(H)(W), ADDA(B)(H)(W), and SUBA(B)(H)(W) instructions all use the AMR to determine what type of address calculations are performed for these registers. All registers can perform linear mode addressing.

LD/ST Instructions: linear mode simply shifts the offsetR/cst operand to the left by 2, 1, or 0 for word, half-word, or byte access respectively and then performs an add or subtract to baseR, (depending on the operation specified).

ADDA/SUBA Instructions: linear mode simply shifts src1/cst operand to the left by 2, 1, or 0 for word, halfword, or byte access respectively and then performs an add or subtract, (depending on the operation specified).

The BK0 and BK1 fields in the AMR specify block sizes for circular addressing.

LD/ST Instructions: after shifting offsetR/cst to the left by 2, 1, or 0 for LDW, LDH, or LDB respectively, an add or subtract is performed with the carry/borrow inhibited between bits N and N+1. Bits N+1 to 31 of baseR remain unchanged. All other carries/borrows propagate as usual. Thus, if an offsetR/cst is greater than the circular buffer size, $2^{(N+1)}$, is specified, the address will be outside of the circular buffer. The circular buffer size in the AMR is not scaled; for example: a size of 4 is 4 bytes, not 4×size of (type). So, to perform circular addressing on an array of 8 words, a size of 32 should be specified, or N=4. Table 13 shows an LDW performed with register A4 in circular mode, with BK0=4, so the buffer size is 32 bytes, 16 halfwords, or 8 words. The value put in the AMR for this example is 0004 0001h.

TABLE 13

LDW in Circular Mode

| LDW | .D1 | *++A4[9],A1 |
| --- | --- | --- |

| | Before LDW | | 1 cycle after LDW | | 5 cycles after LDW |
| --- | --- | --- | --- | --- | --- |
| A4 | 0000?0100h | A4 | 0000?0104h | A4 | XXXX?XXXXh |
| A1 | XXXX XXXXh | A1 | XXXX?XXXXh | A1 | 0000?0100h |
| mem 104h | 1234 5678h | mem 104h | XXXX XXXXh | mem 104h | XXXX XXXXh |

Note:
9h words is 24h bytes. 24h bytes is 4 bytes beyond the 32 (20h) byte boundary 100h–11Fh, thus it is wrapped around to 104h.

ADDA/SUBA Instructions: after shifting src1/cst to the left by 2, 1, or 0 for ADDAW, ADDAH, or ADDAB respectively, an add or subtract is performed with the carry/borrow inhibited between bits N and N+1. Bits N+1 to 31, inclusive, of src2 remain unchanged. All other carries/borrows propagate as usual. Thus, if src1 is greater than the circular buffer size, $2^{(N+1)}$, is specified, the address will be outside of the circular buffer. The circular buffer size in the AMR is not scaled, for example: a size of 4 is 4 bytes, not 4×size of (type). So, to perform circular addressing on an array of 8 words, a size of 32 should be specified, or N=4. Table 14 shows an ADDAH performed with register A4 in circular mode, with BK0=4, so the buffer size is 32 bytes, 16 halfwords, or 8 words. The value put in the AMR for this example is 0004 0001 h.

TABLE 14

ADDAH in Circular Mode

| ADDAH | .D1 | A4,A1,A1 |
|---|---|---|

| Before ADDAH | | 1 cycle after ADDAH | |
|---|---|---|---|
| A4 | 0000?0100h | A4 | 0000?0106h |
| A1 | 0000 0013h | A1 | XXXX?XXXXh |

Note:
13h halfwords is 26h bytes. 26h bytes is 6 bytes beyond the 32 (20h) byte boundary 100h–11Fh, thus it is wrapped around to 106h.

This following provides detailed information on the instruction set for the DSP 11. Each instruction presents the following information:
Assembler syntax
Functional units
Operands
Opcode
Description
Execution
Instruction type
Delay slots
Examples Syntax EXAMPLE (.unit) src,
This is what the syntax looks like for the ADD instruction:
ADD (.unit) src1, src2, dst
OR
ADDU (.unit) src1, src2, dst
OR
ADD (.unit) src2, src1, dst
unit=.L1, .L2, .S1, .S2, .D1, .D2
src and dst indicate source and destination respectively. The (.unit) dictates which functional unit the instruction is mapped to (.L1, .L2, .S1, .S2, .M1, .M2, .D1, or .D2).

A table is provided for each instruction that gives the opcode map fields, units the instruction is mapped to, operands, and the opcode.

The opcode map breaks down the various bit fields that make up each instruction.

There are certain instructions that can be executed on more than one functional unit. Table 100 shows how this is documented for the ADD instruction. This instruction has three opcode map fields: src1, src2, and dst. In the seventh row, the operands have the types cst5, long, and long for src1, src2, and dst, respectively. The ordering of these fields implies: cst5+long$^3$ long, where '+' represents the operation being performed by the ADD. This operation can be done on the .L1 or .L2 (since .L1 and .L2 are specified in the unit column). The 's' in front of each operand signifies that src1 (scst5), src2 (slong), and dst (slong) are all signed values.

In the third row, src1, src2, and dst are int, int, and long respectively. The 'u' in front of each operand signifies that all operands are unsigned. Any operand that begins with 'x' can be read from a register file which is different from the destination register file. The operand will come from the register file opposite of the destination if the x bit in the instruction field is set (shown in the opcode map).

The DSP pipeline has several key features which improve performance, decrease cost, and simplify programming. They are: increased pipelining eliminates traditional architectural bottlenecks in program fetch, data access, and multiply operations; control of the pipeline is simplified by eliminating pipeline interlocks; the pipeline can dispatch eight parallel instructions every cycle; parallel instructions proceed simultaneously through the same pipeline phases; sequential instructions proceed with the same relative pipeline phase difference; and load and store addresses appear on the CPU boundary during the same pipeline phase, eliminating read-after-write memory conflicts.

A multi-stage memory pipeline is present for both data accesses and program fetches. This allows use of high-speed synchronous memories both on-chip and off-chip, and allows infinitely nestable zero-overhead looping with branches in parallel with other instructions.

There are no internal interlocks in the execution cycles of the pipeline, so a new execute packet enters execution every CPU cycle. Therefore, the number of CPU cycles for a particular algorithm with particular input data is fixed. If during program execution, there are no memory stalls, the number of CPU cycles equals the number of clock cycles for a program to execute.

Performance can be inhibited only by stalls from the memory subsystems or interrupts. The reasons for memory stalls are determined by the memory architecture. To fully understand how to optimize a program for speed, the sequence of program fetch, data store, and data load requests the program makes, and how they might stall the CPU should be understood.

The pipeline operation, from a functional point of view, is based on CPU cycles. A CPU cycle is the period during which a particular execute packet is in a particular pipeline stage. CPU cycle boundaries always occur at clock cycle boundaries; however, memory stalls can cause CPU cycles to extend over multiple clock cycles. To understand the machine state at CPU cycle boundaries, one must be concerned only with the execution phases (E1–E5) of the pipeline. The phases of the pipeline are shown in FIG. 11 and described in Table 15.

TABLE 15

Pipeline Phase Description

| Pipeline | Pipeline Phase | Symbol | During This Phase | Instruction Types Completed |
|---|---|---|---|---|
| Program Fetch | Program Address Generate | PG | Address of the fetch packet is determined. | |
| | Program Address Send | PS | Address of fetch packet is sent to memory. | |
| | Program Wait | PW | Program memory access is performed. | |
| | Program Data Receive | PR | Fetch packet is executed at CPU boundary. | |
| Program Decode | Dispatch | DP | Next execute packet in fetch packet determined and sent to the appropriate functional unite to be decoded. | |
| | Decode | DC | Instructions are decoded at functional units. | |
| Execute | Execute 1 | E1 | For all instruction types, conditions for instructions are evaluated and operands read. Load and store instructions: Address generation is computed and address modifications written to register file$^?$ Branch instructions: affects branch fetch packet in PG phase$^?$ Single-cycle instructions: results are written to a register file$^?$ | Single-cycle |
| | Execute 2 | E2 | Load instructions: address is sent to memory$^?$ Store instructions and STP: address and data are sent to memory$^?$ Single-cycle instructions that saturate results set the SAT bit in the Control Status Register (CSR) if saturation occurs.$^?$ Multiply instructions: results are written to a register file$^?$ | Stores STP Multiplies |
| | Execute 3 | E3 | Data memory accesses are performed. Any multiply instruction that saturates results sets the SAT bit in the Control Status Register (CSR) if saturation occurs.$^?$ | |
| | Execute 4 | E4 | Load instructions: data is brought to CPU boundary$^?$ | |
| | Execute 5 | E5 | Load instructions: data is loaded into register$^?$ | Loads |

This assumes that the conditions for the instructions are evaluated as true. If the condition is evaluated as false, the instruction will not write any results or have any pipeline operation after E1.

The pipeline operation of the instructions can be categorized into seven types shown in Table 16. The delay slots for each instruction type are listed in the second column.

TABLE 16

Delay Slot Summary

| Instruction Type | Delay Slots | Execute Stages Used |
|---|---|---|
| Branch (The cycle when the target enters E1) | 5 | E1 - branch target E1 |
| Load (LD) (Incoming Data) | 4 | E1–E5 |
| Load (LD) (Address Modification) | 0 | E1 |
| Multiply | 1 | E1–E2 |
| Single-cycle | 0 | E1 |
| Store | 0 | E1 |
| NOP (no execution pipeline operation) | — | — |
| STP (no CPU internal results written) | — | — |

The execution of instructions can be defined in terms of delay slots (Table 16). A delay slot is a CPU cycle that occurs after the first execution phase (E1) of an instruction in which results from the instruction are not available. For example, a multiply instruction has 1 delay slot, this means that there is 1 CPU cycle before another instruction can use the results from the multiply instruction.

Single cycle instructions execute during the E1 phase of the pipeline. The operand is read, operation is performed and the results are written to a register all during E1. These instructions have no delay slots.

Multiply instructions complete their operations during the E2 phase of the pipeline. In the E1 phase, the operand is read and the multiply begins. In the E2 phase, the multiply finishes, and the result is written to the destination (dst) register. Multiply instructions have 1 delay slot.

Load instructions have two results: data loaded from memory and address pointer modification.

Data loads complete their operations during the E5 phase of the pipeline. In the E1 phase, the address of the data is computed. In the E2 phase, the data address is sent to data memory. In the E3 phase, a memory read is performed. In the E4 stage, the data is received at the CPU core boundary. Finally, in the E5 phase, the data is loaded into a register. Because data is not written to the register until E5, these instructions have 4 delay slots. Because pointer results are written to the register in E1, there are no delay slots associated with the address modification.

Store instructions complete their operations during the E3 phase of the pipeline. In the E1 phase, the address of the data is computed. In the E2 phase, the data address is sent to data memory. In the E3 phase, a memory write is performed. The address modification is performed in the E1 stage of the pipeline. Even though stores finish their execution in the E3 phase of the pipeline, they have no delay slots and follow the following rules (i=cycle):

When a load is executed before a store, the old value is loaded and the new value is stored.

i LDW i+1 STW

When a store is executed before a load, the new value is stored and the new value is loaded.

i STW i+1 LDW

When the instructions are in are in parallel, the old value is loaded and the new value is stored.

i STW i+1 || LDW

Branch instructions execute during the E1 phase of the pipeline five delay slots/CPU cycles after the branch instruction enters an initial E1 phase of the pipeline. FIG. 12 shows the branch instruction phases. FIG. 13 shows the operation of the pipeline based on clock cycles and fetch packets. In FIG. 13, if a branch is in fetch packet n, then the E1 phase of the branch is the PG phase of n+6. In cycle 7 n is in the E1 phase and n+6 is in the PG phase. Because the branch target is in PG on cycle 7, it will not reach E1 until cycle 13. Thus, it appears as if the branch takes six cycles to execute, or has five delay slots.

In FIG. 14, fetch packet n, which contains three execute packets, is shown followed by six fetch packets (n+1 through n+6), each with one execution packet (containing 8 parallel instructions). The first fetch packet (n) goes through the program fetch phases during cycles 1–4. During these cycles a program fetch phase is started for each of the following fetch packets.

In cycle 5, the program dispatch (DP) phase, the CPU scans the p bits and detects that there are three execute packets (k through k+2) in fetch packet n. This forces the pipeline to stall, which allows the DP phase to start execute packets k+1 and k+2 in cycles 6 and 7. Once execute packet k+2 is ready to move on to the DC phase (cycle 8) the pipeline stall is released.

The fetch packets n+1 through n+4 were all stalled so the CPU would have time to perform the DP phase for each of the three execute packets (k through k+2) in fetch packet n. Fetch packet n+5 was also stalled in cycles 6 and 7; it was not allowed to enter the PG phase until after the pipeline stall was released in cycle 8. The pipeline will continue as shown with fetch packets n+5 and n+6 until another fetch packet containing multiple execution The CPU has 14 interrupts available. These are reset, the non-maskable interrupt (NMI), and interrupts 4–15. These interrupts correspond to the RESET, NMI, and INT4–INT15 signals on the CPU boundary. For some embodiments, these signals may be tied directly to pins on the device, may be connected to on-chip peripherals, or may be disabled by being permanently tied inactive on chip. Generally, RESET and NMI are directly connected to pins on the device.

The priorities of these interrupts are listed in Table 17. A low-to-high transition on an interrupt pin sets the pending status of the interrupt within the interrupt flag register (IFR). If the interrupt is properly enabled, the CPU begins processing the interrupt and redirecting program flow to the interrupt service routine.

TABLE 17

| Interrupt Priorities | |
|---|---|
| Priority | Interrupt Name |
| Highest | RESET |
| | NMI |

TABLE 17-continued

| Interrupt Priorities | |
|---|---|
| Priority | Interrupt Name |
| | INT4 |
| | INT5 |
| | INT6 |
| | INT7 |
| | INT8 |
| | INT9 |
| | INT10 |
| | INT11 |
| | INT12 |
| | INT13 |
| | INT14 |
| Lowest Priority | INT15 |

The CPU cannot be prevented from processing a reset. A reset begins to be processed when RESET experiences a low-to-high transition. Unlike the other interrupts, the RESET signal is labeled active-low. A low value on RESET has the effect of stopping all CPU processing and returning all registers to their reset values.

The non-maskable interrupt (NMI) is the interrupt of second-highest priority. Two conditions prevent NMI from causing interrupt processing: the CPU is in the delay slots of a branch, whether the branch is taken or not; and the NMI-enable bit (NMIE) in the interrupt enable register (IER) is 0. NMIE is cleared upon reset to prevent interruption of processor initialization and upon NMI processing to prevent reinterruption of an NMI by another NMI. NMI is reenabled by setting NMIE or by completing the execution of a B NRP instruction.

If NMIE is 0, INT4–INT15 are disabled. During NMI processing the return pointer, which continues previous program execution, is stored in the NMI return pointer register (NRP). Thus, the B NRP instruction returns to the previous program flow after servicing the NMI. Table 18 shows how to return from an NMI.

TABLE 18

| Return from NMI | | | |
|---|---|---|---|
| B | .S2 | NPR | ; return, sets NMIE |
| NOP | | 5 | ; delay slots |

The following conditions can prevent INT4–INT15 from causing interrupt processing: the CPU is processing code which resides in the delay slots of a branch and this includes conditional branches that do not complete execution due to a false condition; the NMIE bit in the interrupt enable register (IER) is 0; the corresponding interrupt enable (IE) bit in the IER is 0; or the global interrupt enable bit (GIE) bit in the control status register (CSR) is 0.

During interrupt processing the return pointer, which continues previous program execution, is stored in the interrupt return pointer register (IRP). Thus, the B IRP instruction returns to the program flow after servicing the interrupt. Table 19 shows how to return from a maskable interrupt.

TABLE 19

Return from a Maskable Interrupt

| B   .S2 | IPR | ; return, moves PGIE to GIE |
| NOP | 5 | ; delay slots |

The IACK and INUM signals alert hardware, external to the device 11, when interupts have taken place. The IACK signals indicates that the CPU has begun processing an interrupt. The INUMx signals (INUM0–INUM3) indicate the number if the interrupt (bit position in th IFR) that is being processed.

TABLE 20

Interrupt Control Registers

| Abbreviations | Name | Description | Register Address |
| --- | --- | --- | --- |
| IFR | Interrupt flag register | Status of interrupts | 00010 |
| ISR | Interrupt set register | Allows you to set flags in the IFR manually. | 00010 |
| ICR | Interrupt clear register | Allows you to clear flags in the IFR manually. | 00011 |
| IER | Interrupt enable register | Allows you to enable interrupts. | 00100 |
| ISTP | Interrupt service table pointer | Pointer to the beginning of the interrupt service table. | 00101 |
| IRP | Interrupt return pointer | Contains the return address used on return from a maskable interrupt. This return is accomplished via the B IRP instruction. | 00110 |
| NRP | Nonmaskable interrupt return pointer | Contains the return address used on return from a nonmaskable interrupt. This return is accomplished via the B NRP instruction. | 00111 |

The IFR and the ISR share a register address. The IFR can be read from, and the ISR can be written to. The other registers have unique addresses.

The global interrupt enable (GIE) allows enabling or disabling maskable interrupts by controlling the value of a bit. GIE is bit 0 of the control status register (CSR).

GIE=1 enables the maskable interrupts so that they are processed.

GIE=0 disables the maskable interrupts so that they are not processed.

Bit 1 of the CSR is PGIE, the previous GIE. During processing of a maskable interrupt, PGIE is loaded with the GIE and GIE is cleared. The GIE bit is cleared during a maskable interrupt to keep another maskable interrupt from occurring before the device state has been saved. Upon return from an interrupt, by way of the B IRP instruction, the PGIE value is copied back to the GIE (in the CSR) and remains unchanged. The purpose of the PGIE is to allow proper clearing of the GIE while an interrupt has already been detected for processing.

Suppose the CPU begins processing an interrupt. Just as the interrupt is beginning to be processed, the GIE is being cleared by writing a 0 to bit 0 of the CSR with the MVC instruction. The GIE is cleared by the MVC instruction prior to being copied to the PGIE. Upon returning from the interrupt the PGIE is copied back to the GIE, resulting in the GIE being cleared as directed by the code.

Table 21 shows how to disable interrupts and Table 22 shows how to enable interrupts.

TABLE 21

Code Sequence to Disable Interrupts

| | | | |
|---|---|---|---|
| MVC | .S2 | CSR,B0 | ; get CSR |
| AND | .S2 | -2,B0,B0 | ; get ready to clear GIE |
| MVC | .S2 | B0,CSR | ; clear GIE |

TABLE 22

Code Sequence to Enable Interrupts

| | | | |
|---|---|---|---|
| MVC | .S2 | CSR,B0 | ; get CSR |
| OR | .S2 | 1,B0,B0 | ; get ready to set GIE |
| MVC | .S2 | B0,CSR | ; set GIE |

An interrupt can trigger interrupt processing only if the corresponding bit in the Interrupt Enable Register (IER) is set. Bit 0, corresponding to reset, is not writable and is always read as 1. The RESET interrupt is always enabled. RESET cannot be disabled. Bits IE4–IE15 may be written as 1 or 0, enabling or disabling the associated interrupt, respectively. The IER is shown in FIG. 15.

The NMIE, if clear, disables all nonreset interrupts, preventing interruption of NMI. The NMI enable (NMIE) is unaffected by a write of 0 but is set by a write of 1. NMIE is initialized to 0 upon reset to prevent any interruption of processor initialization until enabled by you. After reset, you must set NMIE to enable NMI and to allow INT15–INT4 to be enabled by GIE and the appropriate IE bit. You cannot manually clear the NMIE. The NMIE is cleared by the occurrence of an NMI. If cleared, NMIE is set only by completing a B NRP instruction or by a write of 1 to NMIE.

Figure 16:
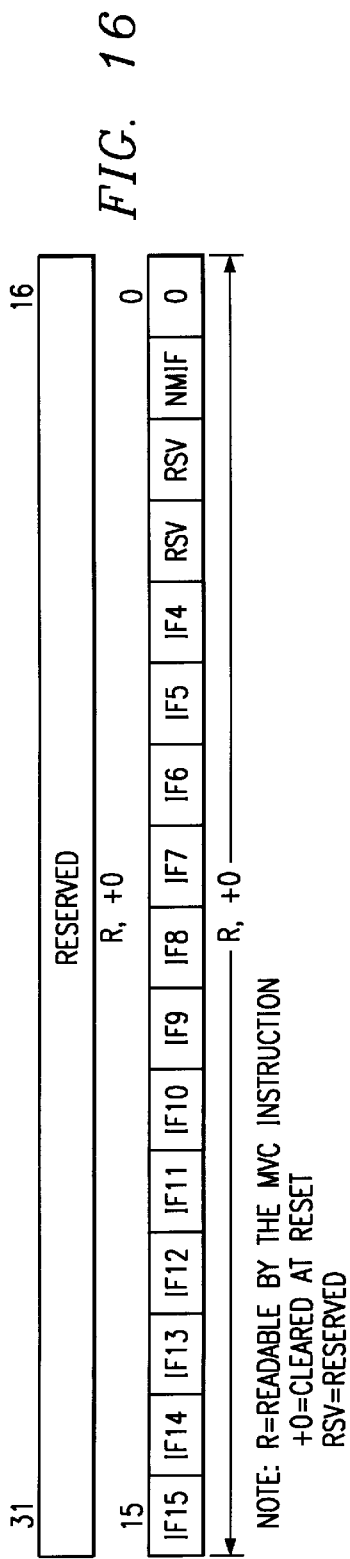
FIG. 16 shows the interrupt flag register (IFR) which contains the status of INT4–INT15 and NMI.

The interrupt flag register (IFR) (see FIG. 16) contains the status of INT4–INT15 and NMI. Table 23 lists the interrupt flags and the interrupts they correspond to. If you want to check the status of interrupts, use the MVC instruction to read the IFR.

TABLE 23

Interrupt Flag Bits

| Interrupt | Description |
|---|---|
| NMIF | Set by NMI |
| IF15-IF4 | Set by the respective interrupt (INT15-INT4) |

Figure 17:
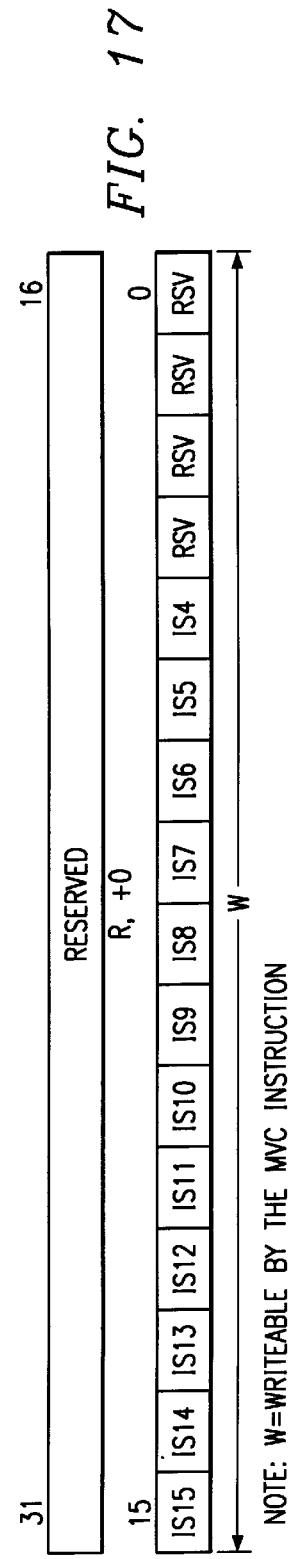
FIG. 17 shows the interrupt set register (ISR), which allows to setting or clearing interrupts manually in the IFR.
Figure 18:
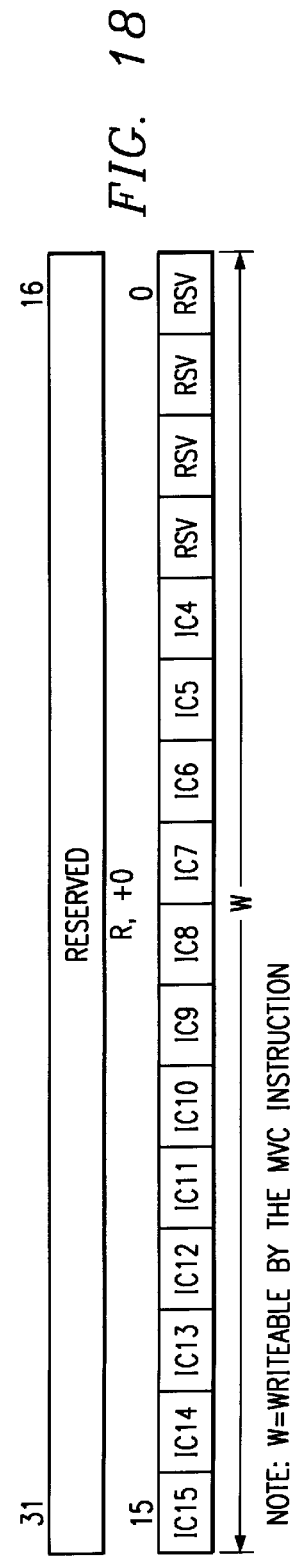
FIG. 18 shows the interrupt clear register (ICR), which allows to setting or clearing interrupts manually in the IFR.

The interrupt set register (ISR) and the interrupt clear register (ICR) (see FIG. 17 and FIG. 18) allow you to set or clear interrupts manually in the IFR. Writing a 1 to IS4–IS15 of the ISR causes the corresponding interrupt flag to be set. Similarly, writing a 1 to a bit of the ICR causes the corresponding interrupt flag to be cleared. Writing a 0 to any bit of either the ISR or the ICR has no effect. Incoming interrupts have priority and override any write to the ICR. You cannot set or clear reset or NMI. Any write to the ISR or ICR (by the MVC instruction) effectively has one delay slot because the results cannot be read (by the MVC instruction) in the IFR until 2 cycles after the write to the ISR or ICR.

An interrupt service fetch package (ISFP) is a fetch packet used to service interrupts. If the eight instructions in the ISFP are insufficient, the program must branch out of this block for additional interrupt service. If the delay slots of the branch do not reside within the ISFP, execution continues from execute packets in the next fetch packet.

The interrupt service table (IST) is 16 contiguous ISFPs, most corresponding to an interrupt in the IFR. The IST must be aligned on a 256-word boundary (32 fetch packets×8 words/fetch packet). Although only 16 interrupts are defined, space in the IST is reserved for 32 for possible future expansion. The IST resides in memory accessible by the program fetch.

The contents and addresses of the IST are shown in Table 24. Because each fetch packet contains eight 32 bit instruction words (or 32 bytes) you will notice that each address in the table below is incremented by 32 bytes from the one below it.

TABLE 24

Interrupt Service Table

| Interrupt | ISFP Address |
|---|---|
| RESET | 0x000 |
| NMI | ISTB + 0x020 |
| Reserved | ISTB + 0x040 |
| Reserved | ISTB + 0x060 |
| INT4 | ISTB + 0x080 |
| INT5 | ISTB + 0x0A0 |
| INT6 | ISTB + 0x0C0 |
| INT7 | ISTB + 0x0E0 |
| INT8 | ISTB + 0x100 |
| INT9 | ISTB + 0x120 |
| INT10 | ISTB + 0x140 |
| INT11 | ISTB + 0x160 |
| INT12 | ISTB + 0x180 |
| INT13 | ISTB + 0x1A0 |
| INT14 | ISTB + 0x1C0 |
| INT15 | ISTB + 0x1E0 |

The RESET fetch packet must be located at address zero but the rest of the Interrupt Service Table can be at any program memory location as long as it begins on a 256 word boundary. The location of the Interrupt Service Table is determined by the Interrupt Service Table Base (ISTB). FIG. 19 shows the relationship of the ISTB to the table location. The ISTB is contained in the upper bit field of the Interrupt Service Table Pointer (ISTP) register. This register is not only used to point to the Interrupt Service Table but it can be used to determine the highest priority pending interrupt that is enabled in the Interrupt Enable Register.

FIG. 19 shows the bit fields of the ISTP. Table 25 describes the bit fields of the ISTP and how they are used. Table 24 is an interrupt service table showing the address of each ISFP in the IST. The ISTP is used as the branch target for interrupt processing. It can also be used when interrupts are disabled to point to the location of the ISFP of the highest priority interrupt whose interrupt flag is set and IE bit is set.

TABLE 25

ISTP Bit Fields

| Bits | Name | Description |
| --- | --- | --- |
| 0–4 | | Set to 0 because fetch packets must be aligned on 8-word (32-byte) boundaries |
| 5–9 | HPEINT | Highest priority IE-enabled interrupt. The number (related bit-position in the IFR) of the highest priority interrupt (as defined in Table 5-1) that is enabled by its bit in the IER. Thus, the ISTP can be used for manual branches to the highest priority enabled interrupt. If no interrupt is pending and enabled, the HPEINT contains the value 0000b. The corresponding interrupt does not have to be enabled by NMIE (unless it is NMI) or by GIE.<br>If the IFR contained 0xABC0 (1010 1011 1100 0000b), and the IER contained 0x1230 (0001 0010 0011 0001b), the value of HPEINT would be 01001 representing bit 9. Thus, the ISTP would contain ISTB + 01001 00000b or ISTB + 0x120 |
| 10–31 | ISTB | Interrupt service table base. The location of the ISFP in the IST. This value is set to 0 on reset. Thus, upon startup the IST must reside at address 0. After reset, you can relocate the IST by writing a new value to ISTB. If relocated, the first ISFP (corresponding to RESET) is never executed via interrupt processing, because reset sets the ISTB to 0. |

The IFR and IER may be polled to manually detect interrupts and then branch to the value held in the ISTP as shown below in Table 26.

TABLE 26

Manual Interrupt Processing

```
        MVC     .S2     ISTP,B2             ; get related ISFP address
        EXTU    .S2     B2,23,27,B1         ; extract HPEINT
[B1]    B       .S2     B2                  ; branch interrupt
   [B1] MVK         .S1     1,A0            ; setup ICR word
[B1]    MVK     .S2     RET_ADR,B2          ; create return address
[B1]    MVKH    .S2     RET_ADR,B2          ;
[B1]    MVC     .S2     B2,IRP              ; save return address
[B1]    SHL     .S2     A0,B1,B1            ; create ICR word
[B1]    MVC     .S2     B1,ICR              ; clear interrupt flag
RET_ADR:        (Return Code)
```

After completion of interrupt service, a branch to the IRP or NRP registers (using the B IRP or B NRP instructions, respectively) continues the previous program flow. The IRP contains the 32-bit address of the first execute packet in the program flow that was not executed because of a maskable interrupt. The NRP contains this packet for an NMI. Although a value may be written to this register, any subsequent interrupt processing may overwrite that value. An NRP distinct from IRP is necessary because an NMI may interrupt a maskable interrupt. FIG. 20 shows the IRP and FIG. 21 shows the NRP.

Figure 22:
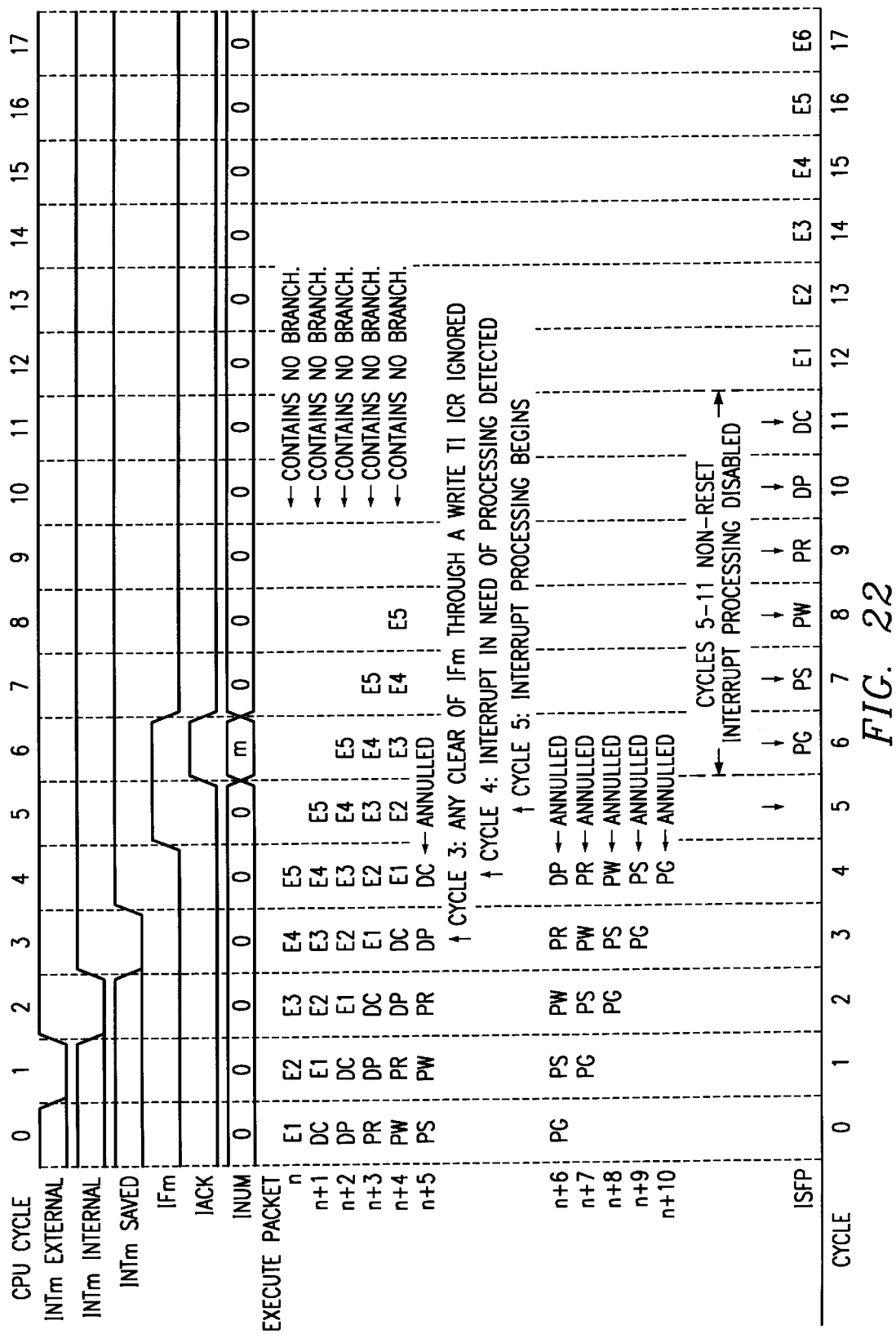
FIG. 22 shows the processing of an interrupt m (INTm).

FIG. 22 shows the processing of interrupt m (INTm). The following describes this figure and the processing of INTm.

The flag for INTm (IFm) is set in the IFR by the low-to-high transition of the INTm signal on the CPU boundary. These transitions are detected on a clock-cycle-by-clock-cycle basis and are not affected by memory stalls that might extend a CPU cycle. In FIG. 22, IFm is set during CPU cycle 5. One could attempt to clear bit IFm by using an MVC instruction to write a 1 to bit m of the ICR in execute packet n+3 (during CPU cycle 3). However, in this case, the automated write by the interrupt detection logic takes precedence and IFm remains set.

FIG. 22 assumes INTm is the highest priority pending interrupt and is enabled by GIE and NMIE as necessary. If it is not, IFm remains set until you either clear it by writing a 1 to bit m of the ICR, or when the processing of INTM occurs.

In CPU cycle 4 of FIG. 22, an interrupt in need of processing is detected. For this interrupt to be processed, the following conditions must be valid on the same clock cycle and are evaluated every clock cycle:

IFm is set during CPU cycle 5. (This determination is made in CPU cycle 4 by the interrupt logic.)
The corresponding bit in the IER is set (IEm=1).
For all maskable interrupts, GIE=1.
For all nonreset interrupts, NMIE =1
For all nonreset interrupts, the five previous execute packets (n through n+4) do not contain a branch (even if the branch is not taken).

Interrupts can be detected, but not taken, during the delay slots of a branch. Any pending interrupt will be taken as soon as pending branches are completed.

During CPU cycles 5–11 of FIG. 22, the following interrupt processing occurs:

Interrupt processing of subsequent nonreset interrupts is disabled.

The next execute packets (from n+5 on) are annulled. If an execute packet is annulled during a particular pipeline stage, it does not modify any CPU state. Annulling also forces an instruction to be annulled in future pipeline stages.

The address of the first annulled execute packet (n+5) is loaded in to the NRP in the case of NMI or into IRP for all other interrupts.

A branch to the address held in ISTP (a pointer to the ISFP for INTm) is forced into the E1 phase of the pipeline during cycle 6.

During cycle 6, IACK is asserted and the proper INUM signals are asserted to indicate which interrupt has occurred. IFm is cleared during cycle 7.

For all interrupts except NMI, PGIE is set to the value of GIE and then GIE is cleared.

For NMI, NMIE is cleared.

For reset, CPU registers are returned to their reset values. This forces the ISTB in the ISTP to 0 and thus execution starts at address 0.

The following operations do not affect interrupt processing:

Branches: branches and interrupt processing do not occur simultaneously, because interrupts are disabled during the delay slots of a branch, even if the branch is not taken.

Code Parallelism: because the serial or parallel encoding of fetch packets does not affect the DC through E5 stages of the pipeline, no conflicts with interrupts exist.

The following operations do affect interrupt processing:

Multicycle NOPs: multi-cycle NOPs (including IDLE) operate the same as other instructions when interrupted except for when an interrupt causes any but the first cycle of a multi-cycle NOP to be annulled. Then, the address of the next execute packet in the pipeline is saved in the NRP or the IRP. This prevents returning to an IDLE instruction or a multi-cycle NOP which was interrupted.

Memory stalls: memory stalls delay interrupt processing by extending the CPU cycles, which would be extended during a memory stall regardless of whether interrupt processing was occurring or not.

Performance in processing interrupts:

Overhead: overhead for all CPU interrupts is 7 cycles. This may be seen from in FIG. 22, where no new instructions are entering the E1 pipeline phase during CPU cycles 5 through 11.

Latency: interrupt latency is 11 cycles. In FIG. 22, although the interrupt is active in cycle 1, execution of service code does not begin until cycle 12.

Frequency: the logic clears the interrupt on cycle 7, with any incoming interrupt having priority. Thus, an interrupt can be recognized every other cycle. Also, because a low-to-high transition is necessary, an interrupt can occur only every other cycle. However, the frequency of interrupt processing depends on the time required for interrupt service and whether you re-enable interrupts during processing, thereby allowing nested interrupts.

Table 27 and Table 28 show the single assignment programming method. When single assignment is used, no registers that have pending results are read. If, in Table 27, the ADD had been in parallel with the LDW (and an extra NOP cycle in the delay slots), the code would obey single assignment because the write from the LDW would not yet be pending.

To avoid unpredictable operation, one must employ single assignment in code that can be interrupted. If an interrupt occurs, all instructions entering E1 prior to the beginning of interrupt processing are allowed to complete execution (through E5.) All other instructions are annulled and refetched upon return from interrupt. The instructions encountered from the return from the interrupt do not experience any delay slots from the instructions prior to processing the interrupt. Thus, instructions with delay slots can appear to have fewer delay slots than they actually have. For example, if an interrupt occurred between the LDW and ADD in Table 27, the ADD would read the new value of A1 loaded by the LDW.

TABLE 27

Not Using Single Assignment

| | | | |
|---|---|---|---|
| LDW | .D1 | *A0,A1 | |
| ADD | .L1 | A1,A2,A3 | ; |
| NOP | | | |
| MPY | .M1 | A1,A4,A5 | ; uses new A1 |

TABLE 28

Using Single Assignment

| | | | |
|---|---|---|---|
| LDW | .D1 | | |
| ADD | .L1 | | |
| NOP | | | |
| MPY | .M1 | A6,A4,A5 | ; |

A trap behaves like an interrupt except it is entered under software control. Upon entry interrupts are disabled. Table 29 and Table 30 show a trap call and return code sequence, respectively. This method will allow multiple nested interrupts. The trap condition (TC) can be any one of the condition registers A1–A2 or B0–B2.

The trap handler must save the values of B0 because, in this code example, it holds the previous GIE and B1 because it contains the return address. Note that the sequence could be shortened to 6 cycles rather than 8 if the TRAP handler were within the 21-bit offset for a branch using a displacement.

TABLE 29

Code Sequence to Invoke a Trap Call

| | | | | |
|---|---|---|---|---|
| [A1] | MVK | .S2 | TRAP_HANDLERS,B0 | ; load 32-bit |
| [A1] | MVKH | .S2 | | |
| [A1] | B | .S2 | B0 | |
| [A1] | MVC | .S2 | CSR,B0 | |
| [A1] | AND | .S2 | -2,B0,B1 | ; |
| [A1] | MVC | .S2 | B1,CSR | |
| [A1] | MVK | .S2 | RADR,B1 | ; |
| [A1] | MVKH | .S2 | | |
| RADR: | | | (return | |

Note:
A1 represents the trap condition.

TABLE 30

Code Sequence for Trap Return

| | | |
|---|---|---|
| B | .S2 | B1 |
| MVC | .S2 | B0,CSR |
| NOP | | 4 |

In general when an interrupt service routine is entered interrupts are disabled. The exception is the nonmaskable interrupt since it allows a second level of interrupt. If the interrupt that occurs is an NMI it is not interrupted by another NMI until after processing of the first one is complete. However, an NMI can interrupt any of the other interrupts.

There may be times when one wants to allow an Interrupt Service Routine to be interrupted by another (particularly higher priority) interrupt. Even though the processor by default does not allow interrupt service routines to be interrupted unless the source is an NMI, it is possible to allow the nesting of interrupts under software control. The process would involve saving the original IRP (or NRP) and IER to memory or a register (either not used or saved if used by subsequent interrupts) and setting up a new set of interrupt enables if desired once the ISR is entered as well as saving the CSR. Then the GIE bit could be set which would re-enable interrupts inside the interrupt service routine.

Figure 23:
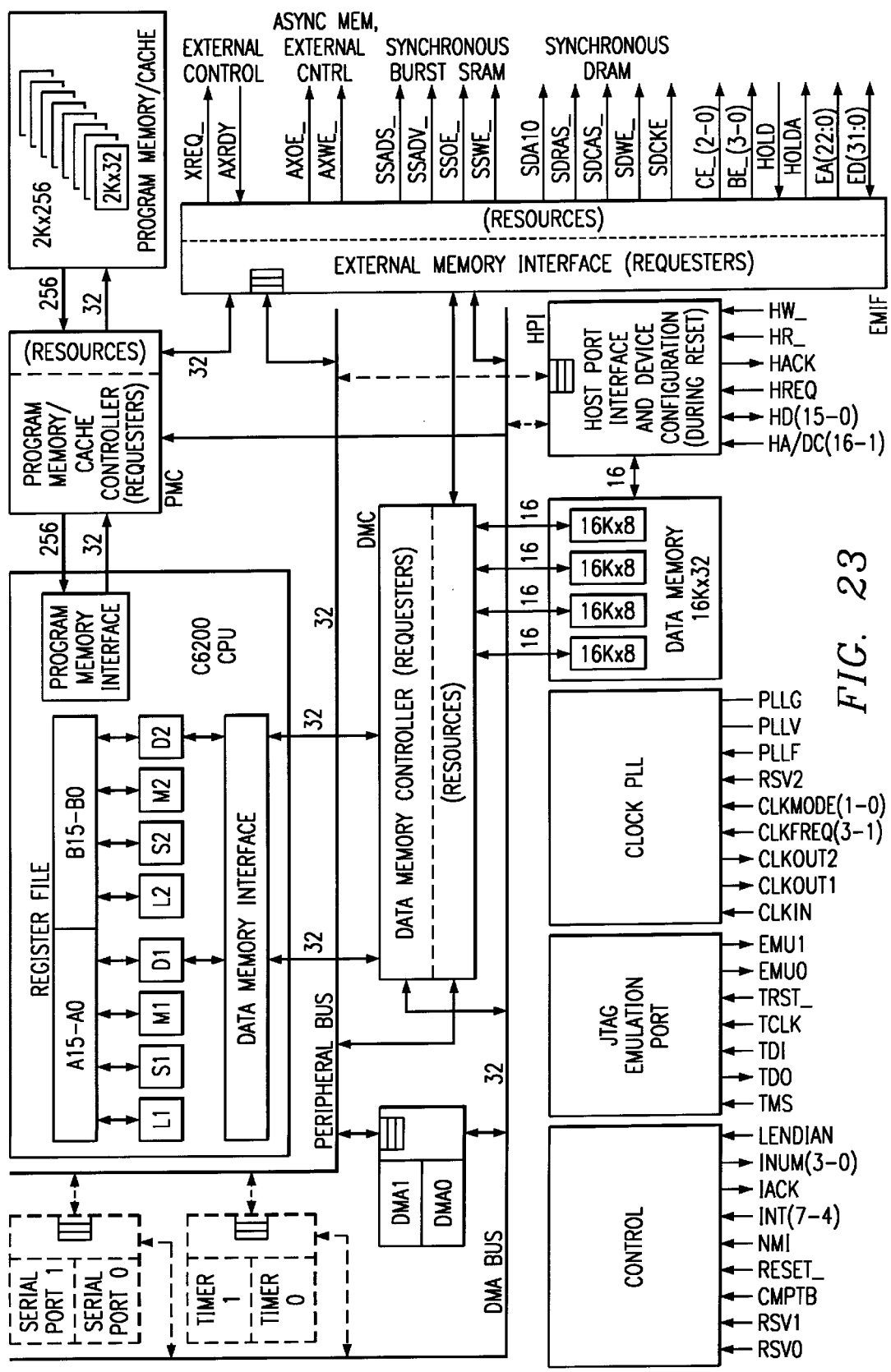
FIG. 23 depicts a high level functional diagram of processor 11.

The presently preferred microprocessor 11 of the present invention is a 32-bit fixed-point digital signal processor (DSP) 11 that is based on a VLIW CPU core. The CPU core has eight functional units that operate in parallel using two register files; each of the two register files contain sixteen 32-bit registers. Device 11 executes up to eight instructions every clock cycle to achieve 1,600 Mips performance at a 200 mhz clock rate. Program parallelism is defined at compile time by a compiler, since there is no data dependency checking done in hardware during run time. A one Megabit on-chip RAM is split between data and program memory. A 256-bit wide portion of the program memory may be configured as cache memory and when so configured, it fetches eight 32-bit instructions every single cycle. The external memory interface (EMIF) supports a variety of synchronous and asynchronous memories, including SBSRAM and SDRAM. The EMIF can release the external bus under host control using a hold/hold acknowledge protocol. In addition, a host processor has direct access to the processor's data memory via a separate 16-bit host port interface. Following power-up the DSP can be booted from an 8-, 16- or 32-bit external ROM using one of the two DMA channels available on the chip. FIG. 23 depicts a high level functional diagram of processor 11.

The Very Long Instruction Word (VLIW) CPU of the present invention uses a 256-bit wide instruction to feed up to eight 32-bit instructions to the eight functional units during every clock cycle. The VLIW architecture features controls by which all eight units do not have to be supplied with instructions if they are not ready to execute. The first bit of every 32-bit instruction determines if the next instruction belongs to the same execute packet as previous instruction, or whether it should be executed in the following clock as a part of the next execute packet. While fetch packets are always 256-bit wide, the execute packets can vary in size as shown by alternating shading on FIG. 24. The variable length execute packets are a key memory saving feature distinguishing the CPU from other VLIW architectures.

Figure 24:
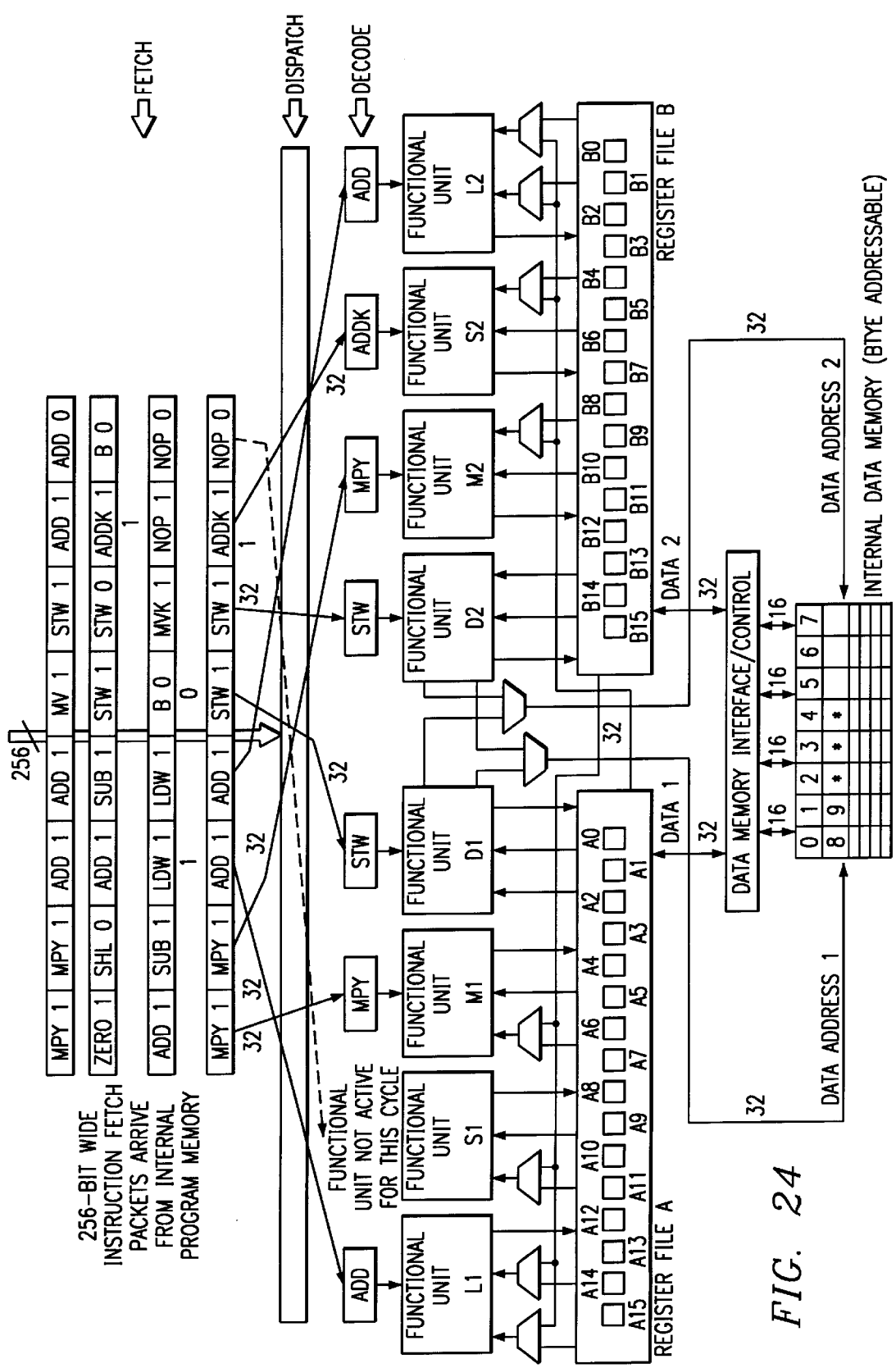
FIG. 24 shows that execute packets can vary in size as shown by alternating shading.

The CPU features two sets of functional units. Each functional unit contains four units and a register file. The two register files each contain sixteen 32-bit registers each for the total of 32 general purpose registers. As shown in FIG. 24, the two sets of functional units, along with two register files, comprise sides A and B of the CPU. The four functional units on each side of the CPU can freely share the sixteen registers belonging to that side. Additionally, each side features a single data bus connected to all registers on the other side, by which the two sets of functional units can cross-exchange data from the register files on opposite sides. Register access by functional units on the same side of the CPU as the register file is serviced for all the units in a single clock cycle; register access using the register file across the CPU is only for one read and one write per cycle.

Another key feature of the CPU is the load/store architecture, where all instructions operate on registers (as opposed to data in memory). Two sets of data addressing units (.D1 and .D2) are exclusively responsible for all data transfers between the register files and the memory. The data address driven by the .D units allow data addresses generated from one register file to be used in data loads and stores affecting the other register file. The CPU supports a variety of indirect addressing modes using either linear or circular addressing modes with 5- or 15-bit offsets. All instructions are conditional, and most can access any one of the 32 registers. Some registers, however, are singled out to support specific addressing or to hold the condition for conditional instructions (if the condition is not automatically "true"). The two .M functional units are dedicated to multiplies. The two .S and .L functional units perform general set of arithmetic, logical and branch functions with results available at the rate of every clock cycle; however, the latency can vary between 1 and 5 cycles due to the multi-stage execution pipeline.

The VLIW processing flow begins when a 256-bit wide instruction fetch packet (IFP's) is fetched from the internal program memory (that can also be configured as cache). The 32-bit instructions destined for the individual functional units are "linked" together by the first bit in the least significant bit position of each instruction in an instruction fetch packet. The instructions that are "chained" together for simultaneous execution (up to eight in total) comprise an "execute packet". A 0 in the LSB of an instruction breaks the chain, effectively placing the instructions that follow it in the next execute packet. If an execute packet crosses the fetch packet boundary (256 bits wide), the compiler will place it in the next fetch packet, while the remainder of the current fetch packet is padded with NOP instructions. The number of execute packets within a fetch packet can vary from one to eight. Execute packets are dispatched to their respective functional units at the rate of one per clock cycle (see FIG. [24????]) and the next 256-bit fetch packet will not be fetched until all the execute packets from the current fetch packet have been dispatched. After decoding, the instructions simultaneously drive all active functional units for a maximum execution rate of eight instructions every clock cycle. While most results are stored in 32-bit registers, they can be stored in memory as bytes or half-words as well, effectively making all stores and loads byte addressable for considerable savings in memory requirements.

The pin functions of signals in FIG. 23 are as follows:

| NAME | NO. PINS | TYPE | DESCRIPTION |
|---|---|---|---|
| Clock/PLL | | | |
| CLKIN | 1 | I | Clock Input |
| CLKOUT1 | 1 | O | Full speed clock output |
| CLKOUT2 | 1 | O | Half speed clock output |
| CLKMODE | 2 | I | Clock mode select (x4, x2 or x1) |
| PLLFREQ | 3 | I | PLL Frequency Range |
| RSV2 | 1 | I | Reserved (pull-up with 20KΩ) |
| PLLV | 1 | A... | PLL filter VCCA |
| PLLG | 1 | A... | PLL filter GNDA |
| PLLF | 1 | A... | PLL filter |

| NAME | NO. PINS | TYPE | DESCRIPTION |
|---|---|---|---|
| External Memory Interface (EMIF) | | | |
| CE_ | 3 | O/Z | External Memory space enables |
| BE_ | 4 | O/Z | Byte Enables |
| EA | 23 | O/Z | External Address (word) |
| ED | 32 | I/O/Z | External Data |
| XREQ_ | 1 | O/Z | External Controller request |
| AXRDY | 1 | I | External Controller ready |
| AXOE_ | 1 | O/Z | Async/External output enable |
| AXWE_ | 1 | O/Z | Async/External write enable |

| NAME | NO. PINS | TYPE | DESCRIPTION |
|---|---|---|---|
| JTAG Emulation | | | |
| TMS | 1 | I | JTAG test port mode select |
| TDO | 1 | O/Z | JTAG test port data out |
| TDI | 1 | I | JTAG test port data in |
| TCK | 1 | I | JTAG test port clock |
| TRST_ | 1 | I | JTAG test port reset |
| EMU0 | 1 | I/O/Z | Emulation pin 0 |
| EMU1 | 1 | I/O/Z | Emulation pin 1 |

| NAME | NO. PINS | TYPE | DESCRIPTION |
|---|---|---|---|
| SSADS_ | 1 | O/Z | SBSRAM address strobe |
| SSADV_ | 1 | O/Z | SBSRAM address advance |
| SSOE_ | 1 | O/Z | SBSRAM output enable |
| SSWE_ | 1 | O/Z | SBSRAM write enable |
| SDA10 | 1 | O/Z | SDRAM address A10 |
| SDRAS_ | 1 | O/Z | SDRAM row address advance |
| SDCAS_ | 1 | O/Z | SDRAM column addr strobe |
| SDWE_ | 1 | O/Z | SDRAM write enable |
| SDCKE | 1 | O/Z | SDRAM clock enable |
| HOLD_ | 1 | I | Hold request from host |
| HOLDA_ | 1 | O | Hold request acknowledge |

| NAME | NO. PINS | TYPE | DESCRIPTION |
|---|---|---|---|
| Control | | | |
| RSV0 | 1 | I | Reserved (pull-up with 20KΩ) |
| RSV1 | 1 | I | Reserved (pull-up with 20KΩ) |
| CMPTB | 1 | I | Compatibility (pull-up with 20KΩ) |
| RESET_ | 1 | I | Device reset |
| NMI | 1 | I | Non-Maskable interrupt |
| INT | 4 | I | External interrupts 4,5,6 and 7 |
| IACK | 1 | O | Interrupt acknowledge |
| INUM | 4 | O | Active interrupt identification no. |
| LENDIAN | 1 | I | Little or Big Endian select |

Host Port Interface (HPI)

| | | | |
|---|---|---|---|
| HA/DC | 16 | I | HPI address (or Device Config) |
| HD | 16 | I/O/Z | HPI data |
| HREQ | 1 | I | HPI request |
| HACK | 1 | O | HPI request acknowledge |
| HR_ | 1 | I | HPI read strobe |
| HW_ | 1 | I | HPI write strobe |

-continued

..Analog Signals (PLL Filter)

:

The CPU has a register based load/store architecture featuring two general purpose register files A and B. All data manipulation instructions operate on data residing in registers. The data is moved between the registers and memory using separate load and store instructions. The general purpose register files are 32 bits wide, each containing 16 registers. Side A registers have multiple paths to the four side A functional units, while side B registers have multiple data paths to side B functional units. There is a single cross-path between the opposite register files/functional units that allows sharing of data, but for optimum data throughput, side A functional units should mostly operate on data located in side A registers and side B units on side B data. All general purpose registers may be used with instructions that operate on 40-bit data by grouping the registers in pairs. While most registers can be used with most instructions, some also have specific uses as shown below.

In addition to general purpose register files A and B, the CPU also features a set of control registers used for controlling interrupts, Program Cache operation, power-down modes, data saturation, setting linear/circular and endian addressing modes, accessing Program Counter, performing general purpose I/O and writing to Program Memory.

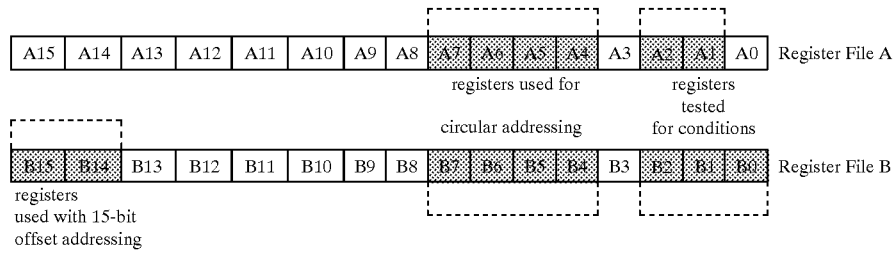

Control Registers

| Acronym | Name | Description |
|---|---|---|
| AMR | Addressing mode register | Specifies whether to use linear or circular addressing for one of eight registers. Also contains block sizes for circular addressing. |
| CSR | Control status register | Contains the global interrupt enable bit, cache control bits, and other miscellaneous control and status bits |
| PCE1 | Program counter | Contains the address of the fetch packet that contains the execute packet in the E1 pipeline stage |
| IN | General purpose input register | Contains 32 input signals |
| OUT | General purpose output register | Contains 32 output signals |
| PDATA_O | Program data out | Contains 32 output signals. Used by the STP instructions to write to program space |
| IER | Interrupt enable register | Allows enabling/disabling of individual interrupts |
| IFR | Interrupt flag register | Displays status of interrupts |
| ISR | Interrupt set register | Allows to manually set pending interrupts |
| ICR | Interrupt clear register | Allows to manually clear pending interrupts |
| ISTP | Interrupt service table pointer | Points to beginning of the interrupt service routine |
| IRP | Interrupt return pointer | Contains the address to be used to return from a maskable interrupt |
| NRP | Non-maskable interrupt return pointer | Contains the address to be used to return from a non- maskable interrupt |

-continued

```
       31         26 25        21 20        16 15 14 13 12 11 10  9   8  7  6  5  4  3  2  1  0
AMR  |    rsv    |    BK1      |    BK0      |B7m|B6m|B5m|B4m|A7m|A6m|A5m|A4m|
     |  reserved | block size 1| block size 0|      linear or circular addressing mode select    |
```

```
       31      24 23        16 15    10 9        8      7     5 4     2 1        0
CSR  | CPU ID  | REVISION    | PWRD   | SAT   | EN     | PCC   | DCC † | PGIE | GIE |
     |         |   ID        |        |       |        |       |       |      |     |
     | CPU type| silicon     | power- |saturate|endian |program| data  |previous|global|
     |identif. |identification| down  | status |control| cache | cache | GIE state|interrupt|
     |         |             | modes  |        |       |control|control|      |enable|
```

```
       31                                                                       0
PCE1 | Program Counter (address of Fetch Packet containing Execute Packet in the E1 pipeline stage) |

IN   | General Purpose Input (reflects status of 32 general purpose input pins)               |

OUT  | General Purpose Output (drives 32 general purpose output pins)                         |

PDATA_O | Program Data Out (contains 32 bits used by the STP instructions to write to program space) |
```

```
       31  15  14  13  12  11  10  9   8   7   6   5   4   3   2   1   0
       16
IER  |ISTB|IE15|IE14|IE13|IE12|IE11|IE10|IE9|IE8|IE7|IE6|IE5|IE4|rsv|rsv|NMIE| 0 |

31  15  14  13  12  11  10  9   8   7   6   5   4   3   2   1   0
       16
IFR  |ISTB|IF15|IF14|IF13|IF12|IF11|IF10|IF9|IF8|IF7|IF6|IF5|IF4|rsv|rsv|NMIF| 0 |

31     16 15  14  13  12  11  10  9   8   7   6   5   4   3   2   1   0
ISR  |reserved|IS15|IS14|IS13|IS12|IS11|IS10|IS9|IS8|IS7|IS6|IS5|IS4|rsv|rsv|rsv|rsv|

31     16 15  14  13  12  11  10  9   8   7   6   5   4   3   2   1   0
ICR  |reserved|IC15|IC14|IC13|IC12|IC11|IC10|IC9|IC8|IC7|IC6|IC5|IC4|rsv|rsv|rsv|rsv|
```

```
       31                    10 9                              5 4   3   2   1   0
ISTP |        ISTB           |           HPEINT                | 0 | 0 | 0 | 0 | 0 |
     | interrupt service table| highest priority IE-enabled interrupt | intr service packet size |
     |  address of the Interrupt Service Fetch Packet (ISFP) for the highest priority pending interrupt |
```

```
       31                                                                       0
IRP  | Interrupt Return Address                                                 |

31                                                                       0
NRP  | Non-maskable Interrupt Return Address                                    |
```

Note: only 0's are permitted to be written to reserved fields of the registers.

Instruction Set Summary

| | | Functional Units | | | |
|---|---|---|---|---|---|
| .L unit | | M unit | .S unit | | .D unit |
| ABS | NOR | MPY | ADD | EXT | SET | ADD |
| ADD | M | SMPY | ADDK | EXTU | SHL | ADDA |
| AND | NOT | | ADD2 | MVC † | SHR | LD mem |
| CMPEQ | OR | | AND | MV | SHRU | LD mem (15-bit offset) ‡ |
| CMPGT | SADD | | B disp | MVK | SSHL | MV |
| CMPGTU | SAT | | B IRP † | MVKH | STP † | NEG |

-continued

| | | Functional Units | | |
|---|---|---|---|---|
| .L unit | M unit | .S unit | | .D unit |
| CMPLT | SSUB | B NRP † | NEG NOT | SUB ST mem |
| CMPLTU | SUB | B reg | OR | SUB2 ST mem (15-bit offset) ‡ |
| LMBD | SUBC | CLR | | XOR SUB |
| MV | XOR | | | ZERO SUBA |
| NEG | ZERO | | | ZERO |

† .S2 only
‡ .D2 only

Instruction Execute Phases

| instruction type | number of delay slots | execute stages used |
|---|---|---|
| Branch (from E1 to E1) | 5 | E1, , , , , E1 |
| Load (incoming data) | 4 | E1, E2, E3, E4, E5 |
| Multiply | 1 | E1, E2 |
| Load (address modification) | 0 | E1 |
| Single-cycle (ADD, for example) | 0 | E1 |
| Store | 0 | E1 |
| STP | 0 | E1 |
| NOP (no execution) | — | — |

Pipeline Description

| Pipeline phase | pipeline stage | symbol | during this phase: |
|---|---|---|---|
| Program Fetch | Program Address Generate | PG | Address of the Fetch Packet is determined |
| | Program Address Send | PS | Address of the Fetch Packet is sent to memory |
| | Program Wait | PW | Program memory read is performed |
| | Program Data Receive | PR | Fetch packet is expected at CPU boundary |
| Program Decode | Execute Packet Dispatch | DP | Next Execute Packet sent to Functional Units |
| | Decode | DC | Instructions are decoded in Functional Units |
| Execute | Execute 1 | E1 | Instruction conditions evaluated, operands read |
| | | | Load/Store addresses computed/modified |
| | | | Branches affect Fetch Packet in PG stage |
| | | | Single-cycle results written to register file |
| | Execute 2 | E2 | Load address is sent to memory |
| | | | Store/STP address and data are sent to memory |
| | | | Single-cycle instructions may set the SAT bit |
| | Execute 3 | E3 | Multiply results written to the register file |
| | | | Load memory reads are continuing |
| | Execute 4 | E4 | Multi-cycle instruction may set the SAT bit |
| | Execute 5 | E5 | Load data arrives at the CPU boundary |
| | | | Load data is placed in the register |

CPU Instruction Opcode Map

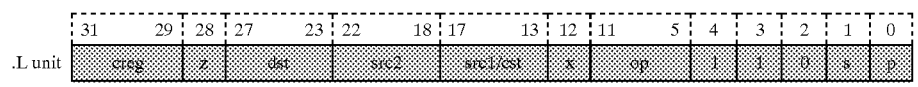

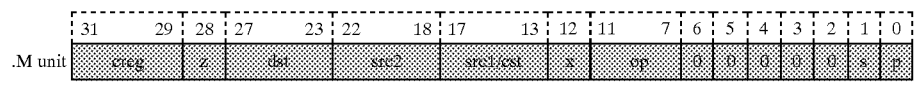

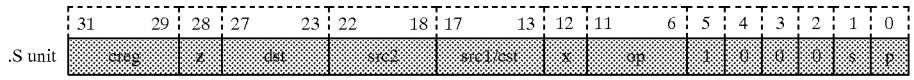

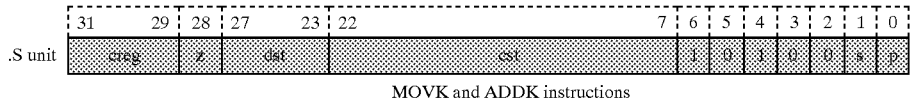

MOVK and ADDK instructions

Load/Store with 15 bit offset

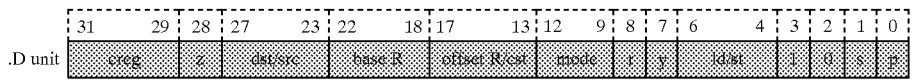

Load/Store 'base R' + 'offset R/cst'

| p | parallel instruction | creg | condition register (A1, A2, B1, B2, B3, 0000b - always true) |
|---|---|---|---|
| s | destination file A or B | dst | destination register |
| x | cross path | op | functional unit operation code |
| y | base addr in B14 or B15 | cst | constant |
| z | test for zero or non-zero | ld/st | types of load/store (signed, unsigned, half etc.) |
| r | reserved | mode | addressing mode (linear, circular) |

Figure 25:
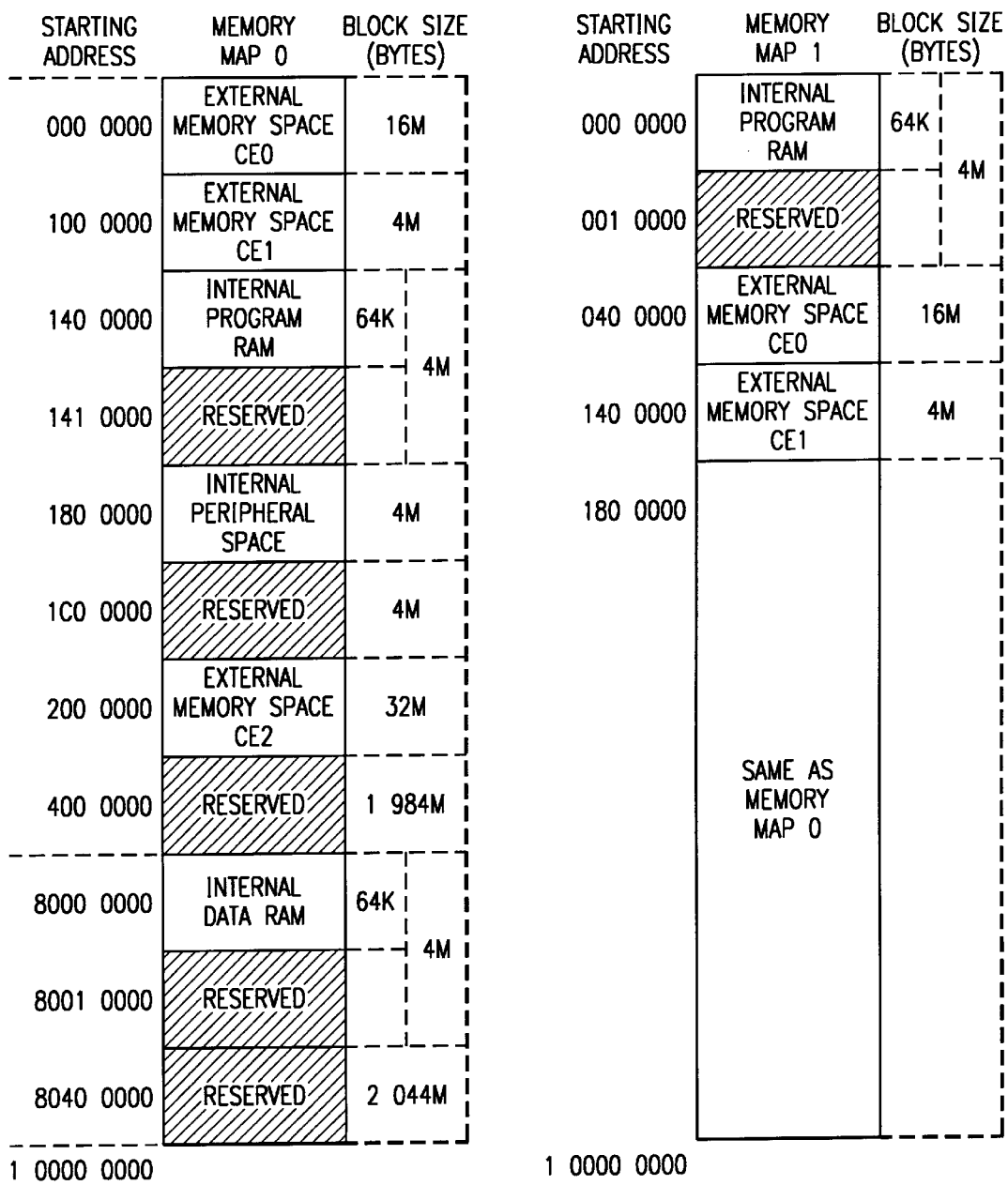
FIG. 25 shows the Memory Map of the DSP.

FIG. 25 shows the Memory Map of the DSP. The memory is byte addressable and it's total address range is 4G bytes (corresponding to 32-bit internal address). The Memory Map is divided between the Internal Program Memory, Internal Data Memory and 3 External Memory Spaces and Internal Peripheral Space. A section of Internal memory can be accessed by the Host Port Interface (HPI).

The Internal Memory consists of 512K bits of on-chip Program/Cache Memory and 512K bits of on-chip data memory. The Program Memory, configurable as Cache or Program, is organized in 2K of 256-bit Fetch Packets. The DSP fetches all instructions one Fetch Packet at a time. The packets are processed at the maximum rate of eight 32-bit instructions per CPU cycle or at a minimum of one instruction per cycle. The Internal Data Memory is byte addressable by the CPU (for reads as well as writes) and supports byte, half-word and full word transfers.

All external data accesses by the CPU or DMA pass through the External Memory Interface (EMIF). The External Memory is divided into 3 Spaces—CE0, CE1 and CE2. Each has a dedicated chip enable signal that is asserted during data access to or from the corresponding space. Each External Space has assigned a separate internal peripheral bus register that determines the shape of the read/write cycle when accessing Asynchronous Memory.

In addition to Asynchronous Memory, CE0 and CE2 Spaces can also interface to other types of memory. SBSRAM or SDRAM Memory can be assigned to those two spaces by controlling signal levels on signal groups CE0_TYPE and CE2_TYPE (pins DC2–DC5) during Reset.

External Memory Space CE1 can only interface to asynchronous memory. However, while spaces CE0 and CE2 are always 32-bit wide, the CE1 Memory Space can also be configured to the width of 8 or 16 bits by controlling signal levels on signal group CE1_WIDTH (pins DC6–DC7). The EMIF automatically packs bytes and half-words into words during read cycles—feature typically used when booting from an 8- or 16-bit EPROM. The CE1 Memory Space can be used for ROM interfacing because ROM cycles are similar to Asynchronous SRAM read cycles.

Note, that while the CE1 space is the only External Memory Space that allows read cycles from 8- or 16-bit wide memory, read cycles from any External Memory Space can access byte or half-word sized data from 32-bit wide External Memory. The EMIF data write cycles can transfer bytes, half-words or words to external memory as well, using BE_control signals for byte selects. Data read cycles always latch all 4 bytes (all 4 BE_'s active) and the CPU then extracts the appropriate bytes internally if the data size is less then 32 bits. Note, that EMIF writes requested by the Program Memory Controller or the DMA, are always 32-bits wide (as opposed to 8-, 16-, or 32-bit transfers originated by the Data Memory Controller).

State of pin DC1 (MAP_BOOT signal group) during Reset determines whether the Internal Program RAM is placed in the Memory Map before or after the External Memory Spaces CE0 and CE1. The type of Memory Map mode chosen would typically depend on the startup procedure used following the device power-up (see the "Startup following Reset" section of the Data Sheet).

The LENDIAN configuration pin determines the order in which the individual byte addresses increase within the word (the low byte within a word can represent bits 0–7 or bits 24–31 of the 32-bit word). In the analogous way, the LENDIAN pin also determines the order of half-words within the word. The LENDIAN pin affects the Internal Data Memory as well as External Memory accesses.

The peripherals on the DSP are accessed and controlled via memory mapped control registers. One embodiment includes 2 peripherals—External Memory Interface (EMIF) and the two-channel Direct Memory Access controller (DMA). One of the DMA channels, DMAO, is used by the processor during the Bootload Startup procedure to initialize the Internal Program Memory after Reset.

Internal Peripheral Space

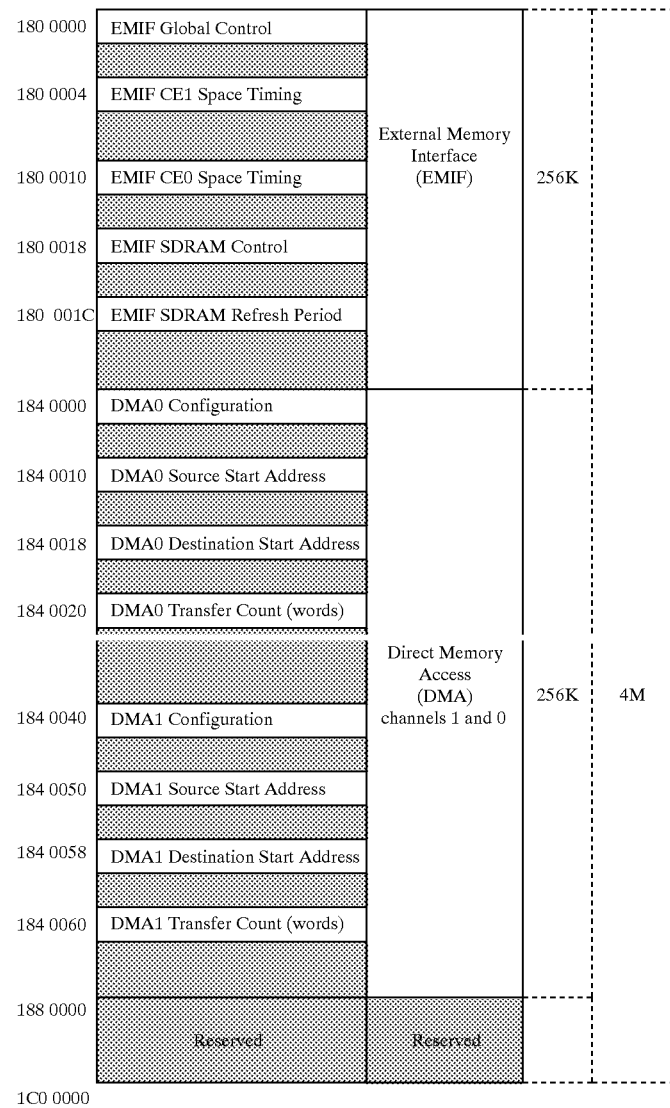

Memory Mapped Registers—EMIF

| | bits | field | description |
|---|---|---|---|
| EMIF Global Control Register | 31–24 | rsv | reserved |
| | 23 | AXRDY | value of AXRDY input pin (reserved for revision A) |
| | 22 | HOLDA | value of HOLDA output pin |
| | 21 | EXT_ACK | indicates External Controller cycle acknowledge |
| | 20 | EXT_SEL | indicates External Controller cycle in progress |
| | 19 | PMC_SEL | indicated that EMIF has accepted data transfer request from PMC |
| | 18 | PMC_ACK | indicates that EMIF is completing transfer between PMC and External Memory |
| | 17 | DMC_SEL | indicates that EMIF has accepted data transfer request from DMC |
| | 16 | DMC_ACK | indicates that DMC being services by EMIF |
| | 15 | DMA_SEL | indicates that EMIF has accepted data transfer request from DMA |
| | 14 | DMA_ACK | indicates that DMA is being serviced by EMIF |
| | 13 | ADR_RES | indicates request to EMIF with invalid address (latched until Reset) |
| | 12 | ADR_LAT | indicates request to EMIF with invalid address (latched until read) |
| | 11 | PMC_ADR | indicates PMC as the source of EMIF request with invalid address |
| | 10 | DMC_ADR | indicates DMC as the source of EMIF request with invalid address |
| | 9 | DMA_ADR | indicates DMA as the source of EMIF request with invalid address |
| | 8 | SDRAM_INIT | indicates SDRAM in process of being initialized by the DSP |
| | 7–3 | rsv | reserved |
| | 2 | XCE2 | assigns CE2 Space to External Controller sysles, overriding normal memory type † |
| | 1 | XCE0 | assigns CE0 Space to External Controller sysles, overriding normal memory type † |
| | 0 | RESET | initializes EMIF to its Reset state |

† type of memory assigned to external spaces CE0 and CE2 is initially set during Reset by selected DC pins

| | 31 20 | 19 16 | 15 14 | 13 8 | 7 2 | 1 0 |
|---|---|---|---|---|---|---|
| CE Space Timing Register | rsv | SETUP‡ | rs | STROBE‡ | rsv | HOLD‡ |
| | reserved | setup time before strobe falling edge | reserved | active strobe width | reserved | hold time after strobe rising edge |

‡ The smallest value permitted for this field is 1

| | | | used by the 320C6201 | | | | used by the SDRAM | | | | |
|---|---|---|---|---|---|---|---|---|---|---|---|
| | 31 25 | 24 | 23 20 | 19 16 | 15 12 | 11 10 | 9 | 8 7 | 6 4 | 3 | 2 0 |
| SDRAM Control Register | rsv | INIT† | TRCD | TRP | TRC | rsv | WBL‡ | rsv | RL | BT‡ | BL |
| | reserved | initialize SDRAM internal mode register | SDRAM $T_{RCD}$ parameter | SDRAM $T_{RP}$ parameter | SDRAM $T_{RC}$ parameter | reserved | write burst length (rsv) | reserved | read latency | burst type (rsv) | burst length |
| | | | in CLKOUT2 cycles | | | | | | | | |

† Bits 0–11 of the SDRAM Control Registerare used to initialize the SDRAM internal mode register
‡ Reserved

| | 31 12 | 11 4 | 3 0 |
|---|---|---|---|
| SDRAM Refresh Period Register | rsv | PERIOD_1 | PERIOD_0 |
| | reserved | timer high counter reload value | timer low counter reload value |

Note: only 0's are permitted to be written to reserved fields of the registers

Memory Mapped Registers—DMA

| DMA Control Register | 31 26 | 25 | 24 | 23 19 | 18 14 | 13 8 | 7 6 | 5 4 | 3 2 | 1 0 |
|---|---|---|---|---|---|---|---|---|---|---|
| | rsv | TCINT | rsv | WSYNC | RSYNC | rsv | DST_DIR | SRC_DIR | STATUS | START |
| | | enables interrupt generation following transfer | | identifies interrupt synchronizing the writes (or no sync) | identifies interrupt synchronizing the reads (or no sync) | | incremenet or decrement destination address after each transfer | incremenet or decrement source address after each transfer | shows if DMA is started or stopped | starts, pauses, aborts DMA operation |

| DMA Source Address Register | 31 | 30 25 | 24 2 | 1 0 |
|---|---|---|---|---|
| | SA | rsv | SRC_ADR | rsv |
| | source addr select: internal data memory or external data memory/ internal program memory | these bits are 0 to cover EMIF and internal program memory spaces | source word address | these bits are 0 since DMA only supports word sized transfers |

| DMA Destination Address Register | 31 | 30 25 | 24 2 | 1 0 |
|---|---|---|---|---|
| | DA | rsv | DST_ADR | rsv |
| | destination addr select: internal data memory or external data memory/ internal program memory | these bits are 0 to cover EMIF and internal program memory spaces | destination word address | these bits are 0 since DMA only supports word sized transfers |

| DMA Transfer Count Register | 31 16 | 15 0 |
|---|---|---|
| | rsv | TC |
| | reserved | DMA transfer counter† |

† the transfer counter is decremented upon the completion of the write portion of each transfer. Note: only 0's are permitted to be written to reserved fields of the registers.

The 512K bits of Internal Data Memory can be accessed both from the CPU and through the Host Port Interface (HPI). The CPU sees the Internal Data Memory as 64K bytes organized in eight columns, each 1 byte wide and 16K rows tall. The HPI addresses the same memory across four columns, each 1 half-word wide and 16K rows tall (32K half-words total). Unlike the 15 CPU, the HPI only has the capability to address the Internal Data in a Little Endian mode where the address of individual half-words grows in the same direction as the addresses of the full words. See FIG. 26 for the addressing example.

Figure 27:
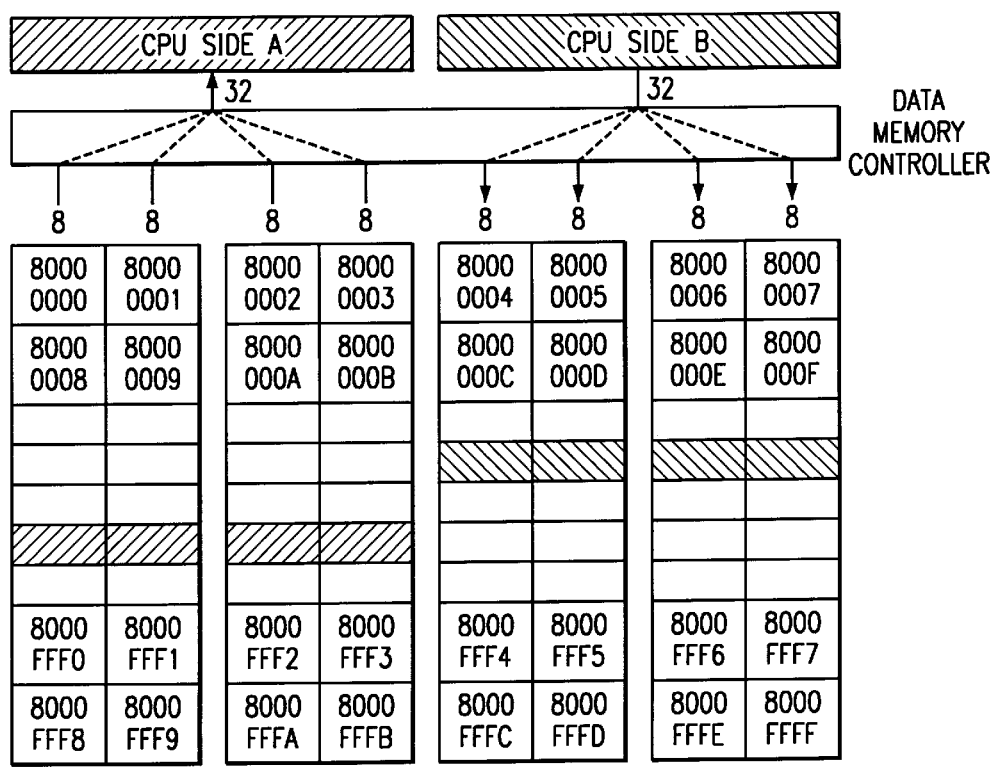
FIGS. 27 and 28 show the data is byte addressable by the CPU with address increasing across the blocks from left to right.
Figure 28:
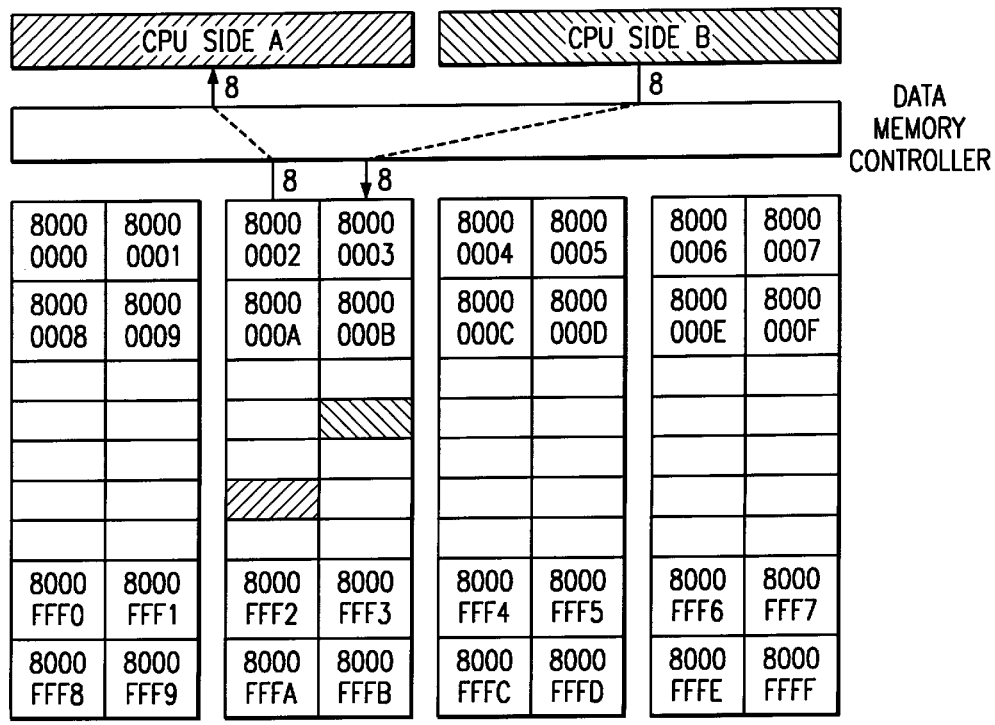

To visualize maximum memory access performance, the Internal Data Memory of the DSP can be organized in 4 blocks, each 2 bytes wide and 16K rows tall. As shown in FIG. 27 and 28, the data is byte addressable by the CPU with address increasing across the blocks from left to right (This example uses Little Endian addressing mode). In order for both sides of the CPU to access data simultaneously during the same CPU cycle, none of the bytes of side A data can reside in the same memory block as any of the side B data bytes. As shown in FIG. 27, a word of data is loaded to a side A register at the same time as another word is stored from a side B register. The two accesses in FIG. 28 (both 8 bits wide), however, take two cycles because both bytes reside in the same block of the Internal Data Memory.

Device reset begins immediately following the falling signal edge at the RESET_pin. During Reset all functional blocks of the processor are initialized to a known state as are all CPU and Internal Peripheral Bus registers. The External Memory Interface output signals (except HOLDA) and all Host Port Interface output signals are tri-stated immediately following the falling edge of RESET_. They remain tri-stated until the RESET_0 signal returns to high level.

Figure 29:
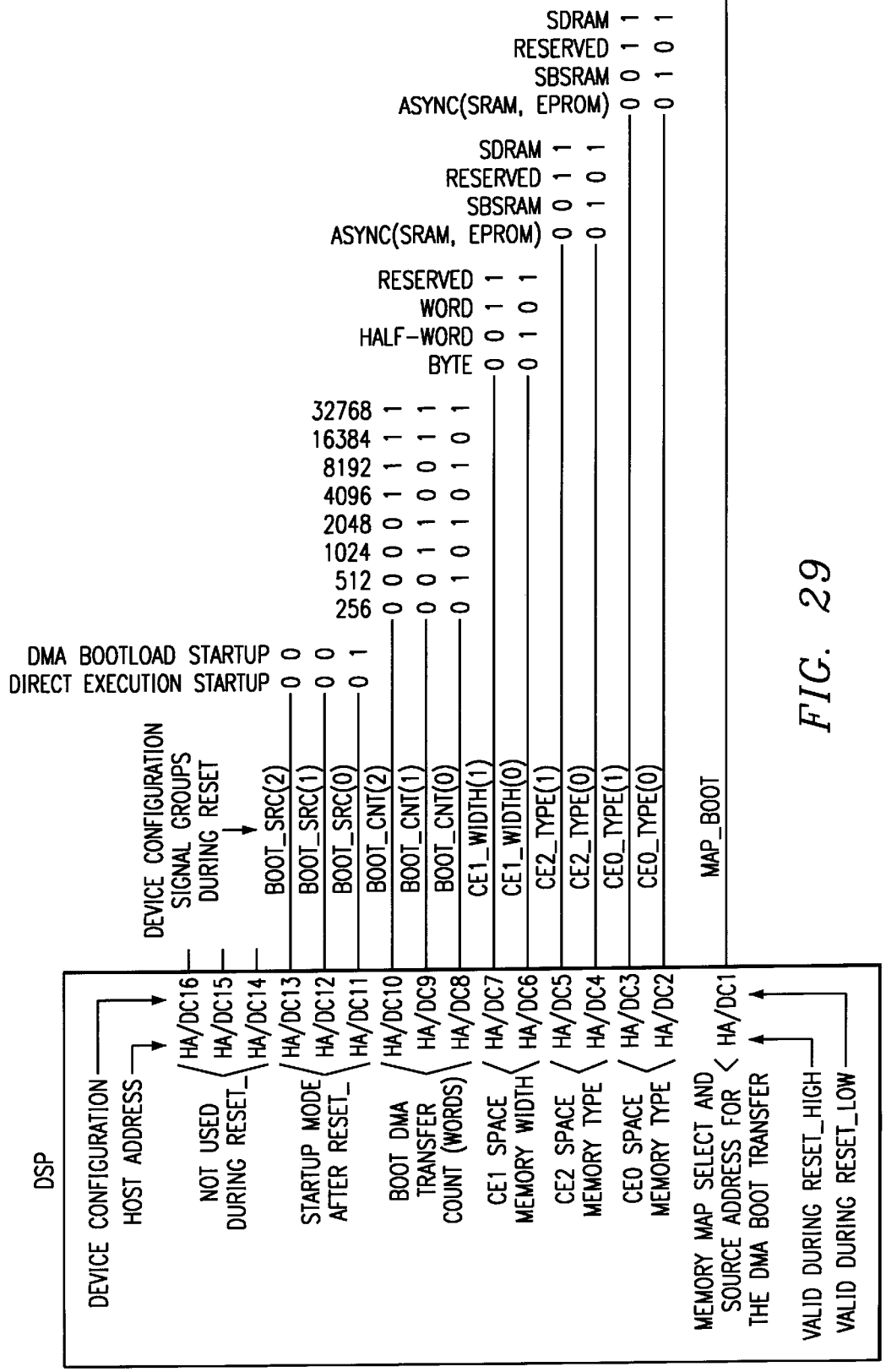
FIG. 29 shows the device configuration pins.

Most of the HPIF address pins have a special function during device Reset. They become Device Configuration pins as shown on FIG. 29. The lowest bit HPIF address pin becomes Memory Map select pin (it will also select Boot DMA transfer source address in the future revisions). The selection of low or high state for that pin typically depends on the processor startup mode after Reset (pins DC 13 to 11).

There are two methods by which the DSP can start operating following the deassertion of the RESET_signal. The state of signal DC11 (during Reset) determines if the device starts direct program execution from external address 0h or whether it first uses an Internal DMA channel 0 to boot-load the Internal Program Memory from an external EPROM before commencing program execution from internal address 0h.

Figure 30:
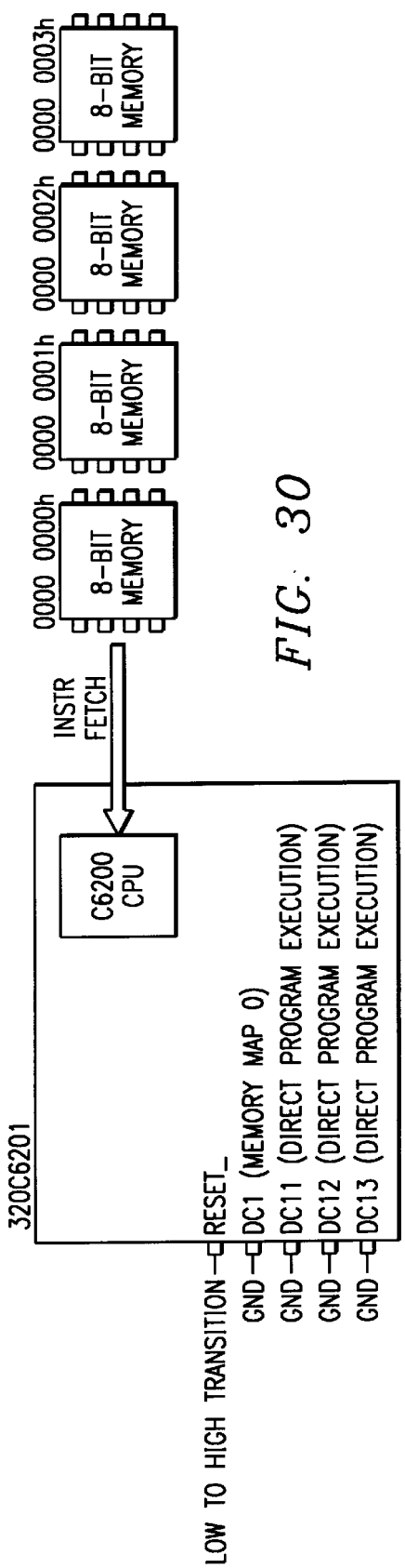
FIG. 30 depicts the value of 000b of DC(13-11) pins during RESET.

As depicted in FIG. 30, the value of 000b of DC(13-11) pins during RESET causes the DSP to start program execution directly from memory starting at address 0h (location of Reset Service Fetch Packet). Depending on the MAP_BOOT mode used, address 0h will fall inside or external to the chip. Typically MAP_BOOT mode 0 (pin DC1 low during Reset) is used to start execution from 32-bit external EPROM or SRAM that has been properly initialized by the Host during Reset. Memory Map 1 mode would most likely not be used with some DSPs for direct execution startup, because there is no mechanism to initialize the Internal Program Memory other then by the DSP itself (Some embodiments may include an enhanced Host Port Interface with the capability to access Internal Program Memory via one of the DMA channels).

Figure 31:
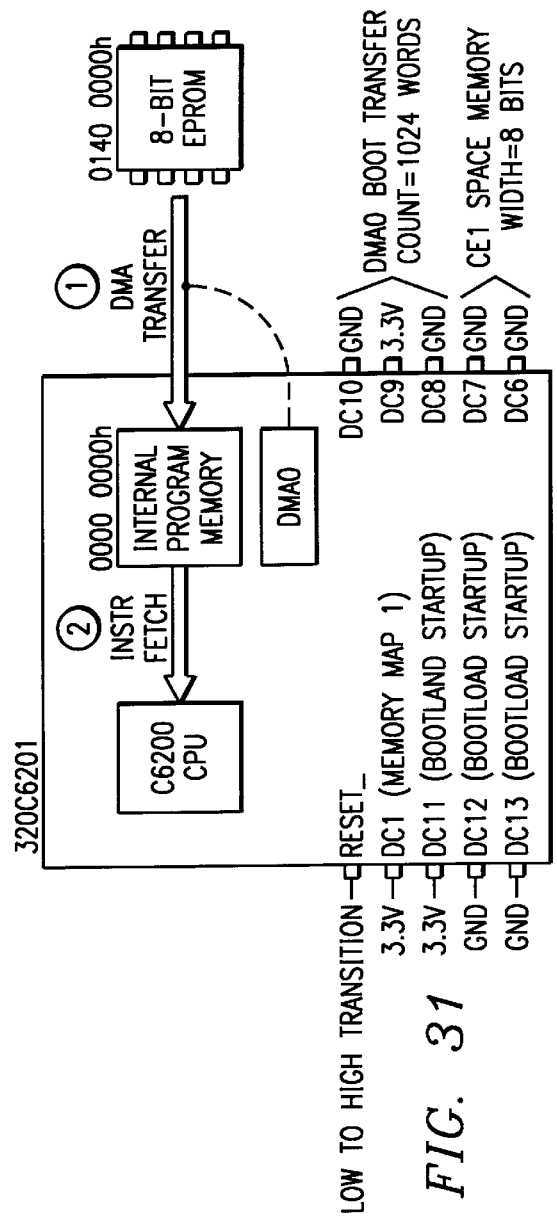
FIG. 31 depicts the value of 001b of DC(31-11) pins during RESET.

As depicted in FIG. 31, the value of 001b of DC(13-11) pins during Reset causes the DSP DMA channel 0 to transfer a block of data from the External Memory Space CE1 to Internal Program Memory starting at 0h. The size of the boot block is determined by the state of pins DC(10-8) during Reset (see FIG. 29). Internal Program Memory location at address 0h of the Memory Map corresponds to the MAP_BOOT mode 1 (pin DC1 high during Reset).The DSP may not support MAP_BOOT mode 0 for the bootload startup. Upon the completion of the DMA transfer, the processor starts executing the Reset Service Fetch Packet from Internal Program Memory address 0h. Typically the Reset Packet includes a branch instruction to jump over the other Interrupt Service Fetch Packets (ISFP's) to the application bootloader program. The bootloader will then most likely load the internal Data Memory with application initialized data and possibly load another program block to some location in the External Memory Space CE0 or CE2 before branching to the main program loop.

Figure 32:
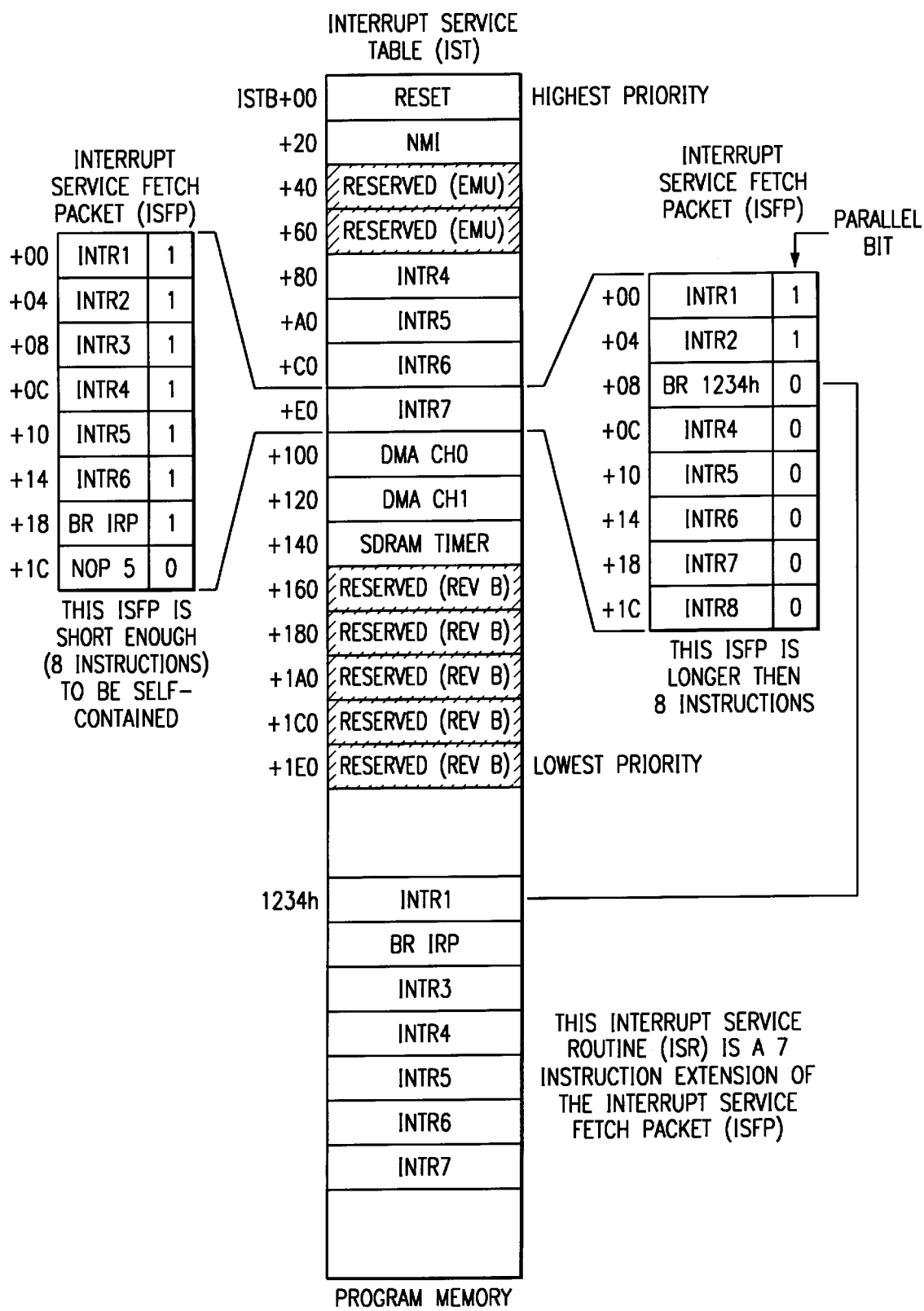
FIG. 32 depicts the relationships of the interrupt service table with interrupt service fetch packets.

Before an interrupt can be processed automatically, it's corresponding bit has to be set in the Interrupt Enable Register (IER) and the Global Interrupt Enable bit (GIE) has to be set as well in the Control Status Register (CSR). During interrupt processing, the processor stops current program execution and saves the address of the next instruction scheduled for execution in the Interrupt Return Pointer (IRP). In case of the non-maskable interrupt (NMI), the return address is saved in the NRP register. Program execution is then redirected to one of 16 pre-assigned contiguous locations in the Interrupt Service Table (the IST base is assigned to address 0h following Reset, but can be relocated anywhere on a 1K byte address boundary by changing the ISTB field of the ISTP register). The ISFPs consist of 8 instructions of which one has to be a branch to the IRP address (to return from interrupt) or a branch to additional code if the Interrupt Service Routine (ISR) is larger then the ISFP (see FIG. 32.). The branch has to be executed at least 5 cycles before the end of the ISFP in order to prevent intrusion into ISFPs belonging to other interrupts. This can be accomplished either by placing the branch 5 non-parallel instructions before the end of the ISFP or by following the branch with a NOP 5 instruction.

With the GIE bit disabled, the highest priority active interrupt can still be identified in software by polling the ISTP register containing the address pointing to the ISFP of the next interrupt in line for processing if the GIE were enabled. All active interrupts can also be identified by polling the Interrupt Flag Register (IFR). Interrupt Set and Clear Registers (ISR and ICR) can be used to manually set/clear interrupts in software.

During automatic interrupt processing, the IFR bit is cleared, and the active interrupt is encoded on the four INUM pins, at the beginning of the IACK pulse (see the timing section of the Data Sheet). At the same time, the GIE bit is copied to PGIE field of CSR, and GIE bit is cleared for all interrupts except NMI. The GIE bit is enabled again upon return from interrupt via the B IRP or B NRP instructions (at the end of the E1 phase).

The DSP uses an external oscillator to drive the on-chip PLL (Phase-Locked Loop) circuit that generates all internal and external clocks. The PLL typically multiplies the external oscillator frequency by 4 or by 2 and feeds the resulting clock to CLKOUT1 output pin. The internal version of CLKOUT1 is used by the processor as an instruction cycle clock. Most timing parameters of this device are defined relative to the CLKOUT1 clock and specifically to it's rising edge. CLKOUT2 is another output clock derived from CLKOUT1 at half of it's frequency. It is primarily used to clock some synchronous memories such as the SDRAM.

Figure 33:
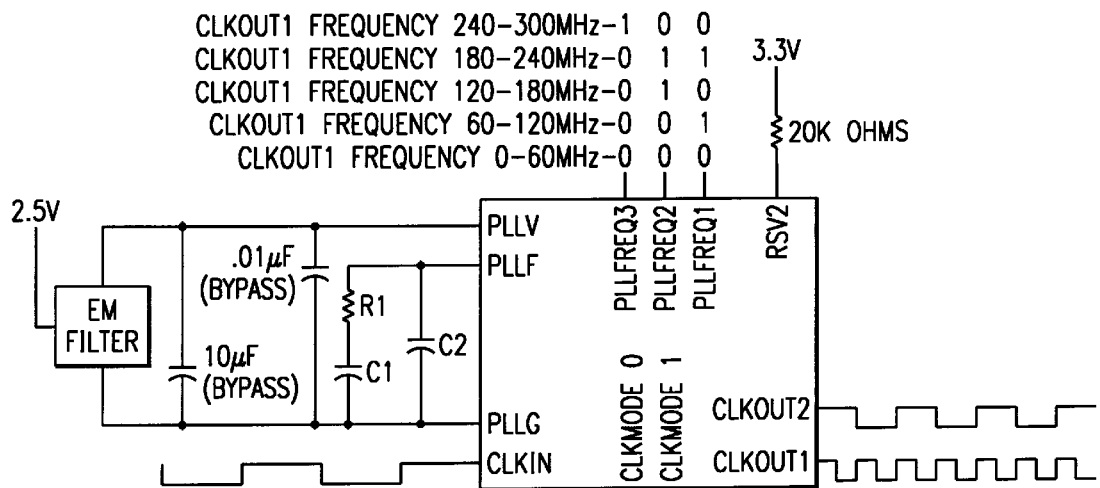
FIG. 33 shows the clock mode is controlled by two CLKMODE pins.

In addition to x2 and x4 mode, the clock circuit can operate in multiply by 1 mode, where the input clock frequency is the same as the CLKOUT1 output clock frequency. The factors to consider in choosing the multiply factor include board level noise and clock jitter. The x4 mode will minimize the board noise, while the x2 mode will reduce the jitter. The clock mode is controlled by two CLKMODE pins as shown in FIG. 33.

The amount of time that the PLL needs to synchronize to the output frequency depends on the CLKIN and CLKOUT1 frequencies and is typically in the range of tens of microseconds. See the PLL Component Selection table for the exact time. The synchronization time affects the duration of the Reset signal in that the Reset has to be asserted long enough for the PLL to synchronize to the proper output frequency.

Three PLLFREQ pins identify the range of CLKOUT1 frequencies that the PLL is expected to synchronize to. The PLL also requires 2 bypass capacitors (between PLLV and PLLG), external low-pass filter components (R1, C1,C2) and an EMI filter (see FIG. 33). The values for R1, C1, C2 and the filter depend on the CLKIN and CLKOUT1 frequencies. Refer to the PLL Component Selection Table 31 to chose correct values for the PLL external components and the EMI filter.

TABLE 31

PLL Component Selection

| CYCLE TIME (NS) | CLKMODE | CLKIN (MHZ) | CLKOUT1 (MHZ) | R1 (Ω) | C1 (UF) | C2 (PF) | EMI FILTER PART NO. | LOCK TIME (US) † |
|---|---|---|---|---|---|---|---|---|
| 5 | X4 | 50 | 200 | 16.9 | .15 | 2700 | TDK #153 | 59 |
| 5 | X2 | 100 | 200 | 16.9 | .068 | 1500 | TDK #153 | 28 |
| 5.5 | X4 | 45.5 | 181.8 | 13.7 | .18 | 3900 | TDK #153 | 49 |
| 5.5 | X2 | 90.9 | 181.8 | 13.7 | .082 | 1800 | TDK #153 | 23 |
| 6 | X4 | 41.6 | 166.7 | 17.4 | .15 | 3300 | TDK #153 | 68 |
| 6 | X2 | 83.3 | 166.7 | 17.4 | .082 | 1500 | TDK #153 | 36 |
| 6.5 | X4 | 38.5 | 153.8 | 16.2 | .18 | 3900 | TDK #153 | 70 |
| 6.5 | X2 | 76.9 | 153.8 | 16.2 | .082 | 1800 | TDK #153 | 33 |
| 7 | X4 | 35.7 | 142.9 | 15 | .22 | 3900 | TDK #153 | 72 |
| 7 | X2 | 71.4 | 142.9 | 15 | .1 | 2200 | TDK #153 | 34 |
| 7.5 | X4 | 33.3 | 133.3 | 16.2 | .22 | 3900 | TDK #153 | 84 |

TABLE 31-continued

PLL Component Selection

| CYCLE TIME (NS) | CLKMODE | CLKIN (MHZ) | CLKOUT1 (MHZ) | R1 (Ω) | C1 (UF) | C2 (PF) | EMI FILTER PART NO. | LOCK TIME (US) † |
|---|---|---|---|---|---|---|---|---|
| 7.5 | X2 | 66.7 | 133.3 | 16.2 | .1 | 2200 | TDK #153 | 40 |
| 8 | X4 | 31.3 | 125 | 14 | .27 | 4700 | TDK #153 | 77 |
| 8 | X2 | 62.5 | 125 | 14 | .12 | 2700 | TDK #153 | 36 |
| 8.5 | X4 | 29.4 | 117.7 | 11.8 | .33 | 6800 | TDK #153 | 67 |
| 8.5 | X2 | 58.8 | 117.7 | 11.8 | .15 | 3300 | TDK #153 | 32 |
| 9 | X4 | 27.7 | 111.1 | 11 | .39 | 6800 | TDK #153 | 68 |
| 9 | X2 | 55.6 | 111.1 | 11 | .18 | 3900 | TDK #153 | 33 |
| 9.5 | X4 | 26.3 | 105.3 | 10.5 | .39 | 8200 | TDK #153 | 65 |
| 9.5 | X2 | 52.6 | 105.3 | 10.5 | .22 | 3900 | TDK #153 | 35 |
| 10 | X4 | 25 | 100 | 10 | .47 | 8200 | TDK #153 | 68 |
| 10 | X2 | 50 | 100 | 10 | .22 | 4700 | TDK #153 | 33 |

‡ Note: For CLKMODE = x1, the PLL is bypassed and the choice of the external component values is irrelevant and the PLLV, PLLF and PLLG inputs can be unconnected. The PLLFREQ inputs should be driven at all times (for CLKMODE = x1 they can be connected to GND).
† Note: Under some operating conditions, the maximum PLL lock time may vary as much as 150% from the specified typical value. For example if the typical lock time is specified as 100 us, its maximum value may be as long as 250 us.

Figure 34:
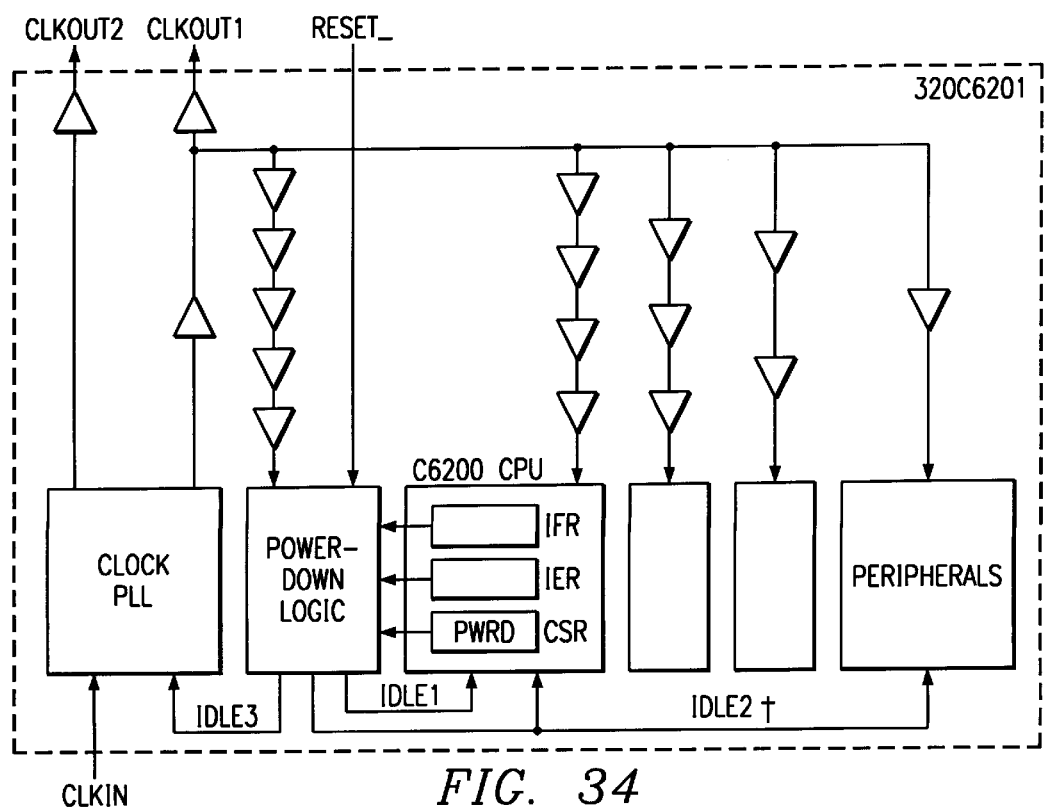
FIG. 34 depicts significant power savings realized without losing data or operational context by preventing some or all of chip's logic from switching.

Most of the operating power of CMOS logic is dissipated during circuit switching from one logic state to another. By preventing some or all of chip's logic from switching, significant power savings can be realized without losing any data or operational context as depicted in FIG. 34. Power-down modes idle1 and idle2 block the internal clock inputs at the boundary of the selected blocks of logic, effectively preventing them from switching. Idle1 shuts down the CPU and idle2 mode shuts down both the CPU and the on-chip peripherals. Additional power savings are accomplished in power-down mode idle3, where the entire on-chip clock tree (including multiple buffers) is "disconnected" at the clock source that is the clock PLL (see FIG. 34).

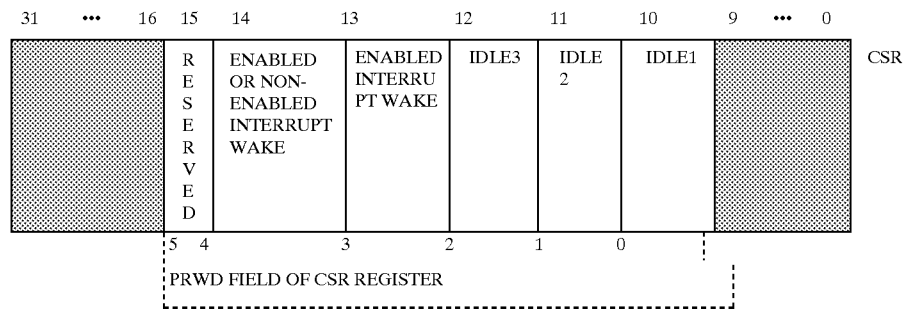

The power-down modes are triggered by setting bits 0–2 in the PWRD field of the Control Status Register (CSR). Idle3 mode can only be aborted by device Reset, while idle1 and idle2 modes can also be terminated by an enabled interrupt, or any interrupt (enabled or not), as directed by bits 3 and 4 of the PWRD field. When writing to CSR, all bits of the PWRD field should be set at the same time. When more then one logic 1's are written to the PRWD field bits 0–2, the highest order enable bit determines the power-down mode.

| POWER-DOWN MODE | TRIGGER ACTION | WAKE-UP METHOD † | EFFECT ON CHIPS OPERATION |
|---|---|---|---|
| idle1 | write a logic 1 into bit 0 of PWRD field of CSR, register | internal interrupt, external interrupt or Reset | CPU halted (except for the interrupt logic) |

-continued

| POWER-DOWN MODE | TRIGGER ACTION | WAKE-UP METHOD † | EFFECT ON CHIPS OPERATION |
|---|---|---|---|
| idle2 | write a logic 1 into bit 1 of PWRD field of CSR register | external interrupt or Reset | peripherals halted and CPU halted (except for the interrupt logic) |
| idle3 | write a logic 1 into bit 2 of PWRD field of CSR register | Reset only | PLL operation is halted stopping the clock tree from switching and resulting in the entire chip being halted |

† The wake-up from idle2 or idle3 can be triggered by either an enabled interrupt, or any interrupt (enabled or not). The first case is selected by writing a logic 1 into bit 3 of the Control Status Register PWRD field, and the second case is selected by writing a logic 1 into bit 4 of the same field. When both bits 3 and 4 are set to 1 any interrupt (enabled or not) will wake the processor from idle1 or idle2. If power-down mode is terminated by a non-enabled interrupt, the program execution simply returns to the instruction following the one that caused the power-down by setting the idle bits in the CSR. Wake-up by an enabled interrupt executes the corresponding Interrupt Service Routine first, prior to returning to the code aborted by the power-down.

CLKIN Timing Parameters

| NO | | | clkmode = X4 | | clkmode = X2 | | clkmode = X1 | | unit |
|---|---|---|---|---|---|---|---|---|---|
| | | | min | max | min | max | min | max | |
| 1 | $t_C$(CLKIN) | Period of CLKIN | 20 | 20 | 10 | 10 | 5 | | ns |
| 2 | $t_W$(CLKIN) | Pulse duration of CLKIN high | 9.2 | | 4.6 | | 1.9 | | ns |
| 3 | $t_W$(CLKIN) | Pulse duration of CLKIN low | 6.0 | | 3.0 | | 1.9 | | ns |
| 4 | $t_T$(CLKIN) | Transition time of CLKIN | | 2.4 | | 1.2 | | 0.6 | ns |

Figure 35:
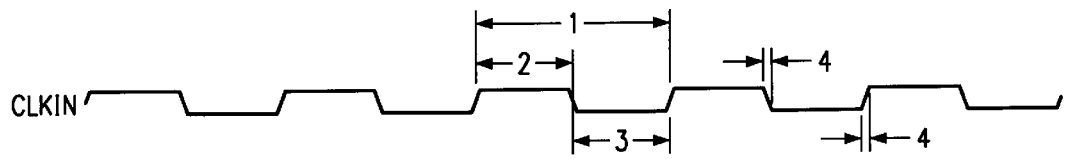
FIG. 35 depicts CLKIN timings.

FIG. 35 depicts CLKIN timings described above.

CLKOUT1 Timing Parameters

| NO | | | min | max | unit |
|---|---|---|---|---|---|
| 1 | $t_C$(CKO1) | Period of CLKOUT1 | 5 | | ns |
| 2 | $t_W$(CKO1) | Pulse duration of CLKOUT1 high | 1.9 | | ns |
| 3 | $t_W$(CKO1) | Pulse duration of CLKOUT1 low | 1.9 | | ns |
| 4 | $t_T$(CKO1) | Transition time of CLKOUT1 | | 0.6 | ns |

Figure 36:
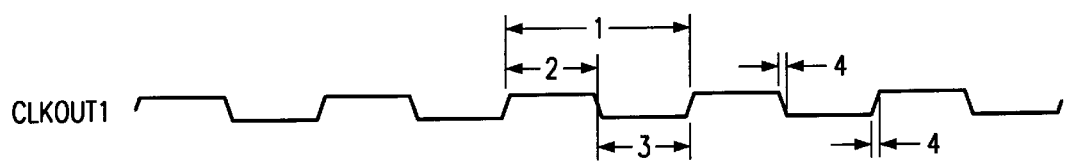
FIG. 36 depicts CLKOUT1 timings.

FIG. 36 depicts CLKOUT1 timings described above.

CLKOUT2 Timing Parameters

| NO | | | min | max | unit |
|---|---|---|---|---|---|
| 1 | $t_C$(CKO2) | Period of CLKOUT2 | 10 | | ns |
| 2 | $t_W$(CKO2) | Pulse duration of CLKOUT2 high | 3.8 | | ns |
| 3 | $t_W$(CKO2) | Pulse duration of CLKOUT2 low | 3.8 | | ns |
| 4 | $t_T$(CKO2) | Transition time of CLKOUT2 | | 0.6 | ns |

Figure 37:
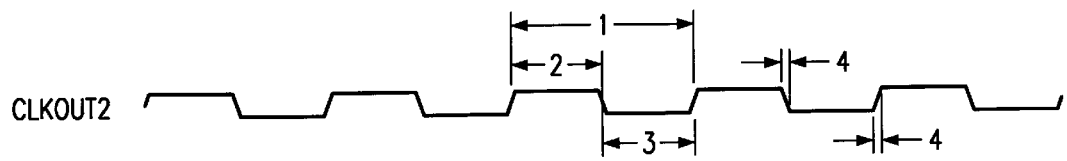
FIG. 37 depicts CLKOUT2 timings.

FIG. 37 depicts CLKOUT2 timings described above.

The External Memory Interface (EMIF) is responsible for accessing data that is external to the chip. As shown in FIG. 23., EMIF can receive requests for external data access from one of 3 functional blocks—Data Memory Controller, Program/Cache Controller or DMA Controller. The EMIF operation is configurable via memory mapped control registers accessed by the internal peripheral bus. Every EMIF program or data access uses common 23-bit address bus and 32-bit data bus.

There are 3 spaces in the Memory Map, each of which is represented by one of 3 chip enables—CE2__, CE1__ and CE0__. One of the chip enables has to be asserted when the processors reads or writes to any of the 3 Memory Map External spaces 2,1 or 0. Byte enable control signals, BE3__—BE0__, select the individual bytes, half-words or words during EMIF write cycles requested by the Data Memory Controller. All Program and DMA requested cycles, as well as Data Memory Controller read cycles, are 32-bit wide—resulting in all 4 BE_signals being active. Data Memory Controller write cycles access byte or half-word data using individual BE_controls to select the active bytes. The addressing of bytes within each word is set by the LENDIAN pin to be in the direction of high bits or low bits.

While CE_spaces 0 and 2 can be programmed to support different types of memory, CE_space 1 is restricted to Asynchronous Memory cycles only, including ROM typically used to boot the system at power-up. While the ROM read cycles are identical to CE0_ and CE2_ Asynchronous Memory cycles from the control signal perspective, the CE_1 cycles have the flexibility to pack bytes into words if the ROM is 8- or 16-bits wide. The External ROM size is expected to be encoded via pins DC 7-6 during Reset.

The type of memory assigned to CE_spaces 0 and 2 are also encoded via the DC pins during Reset. Pins DC 3-2 specify the type of memory for the CE0_space, while pins 5-4 specify the type of memory for space CE2_. The supported memory types include Asynchronous Memory, Synchronous Burst SRAM (SBSRAM) and Synchronous DRAM (SDRAM). External Control cycles can be used to drive CE_spaces 0 and 2 by setting appropriate bits in the EMIF Global Control Register. External Control cycles are different from memory cycles in that they use Request/Ready handshaking to stretch individual bus cycles to accommodate longer response times inherent in slower I/O devices. The EMIF provides a separate set of control signals for each one of the memory cycles listed above (see FIG. 23).

Figure 38:
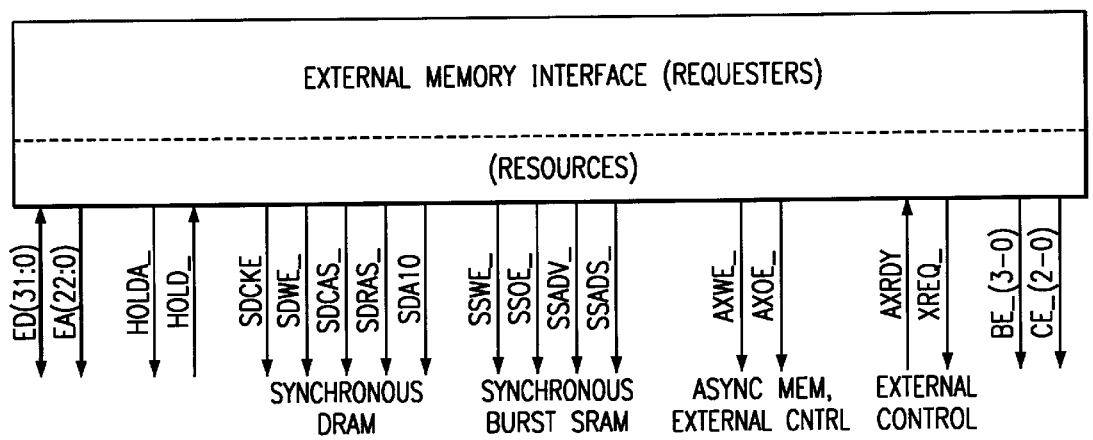
FIG. 38 depicts the EMIF signals.

EMIF HOLD and HOLDA signals are used to arbitrate the ownership of the EMIF bus between the host and the DSP. FIG. 38 depicts the EMIF signals.

Asynchronous memory read cycles use the AXOE_ control signal to enable the memory device to place the data on the data bus. EMIF control registers define the shape of the read cycle and the amount of time that each address is valid. The shape of the read cycle in FIG. 39 reflects the fastest possible asynchronous read corresponding to 1 cycle setup, 1 cycle strobe width and 1 cycle hold fields in the EMIF CE External Space Timing Register (one of 3 registers defining external spaces CE0, CE1 and CE3).

Figure 40:
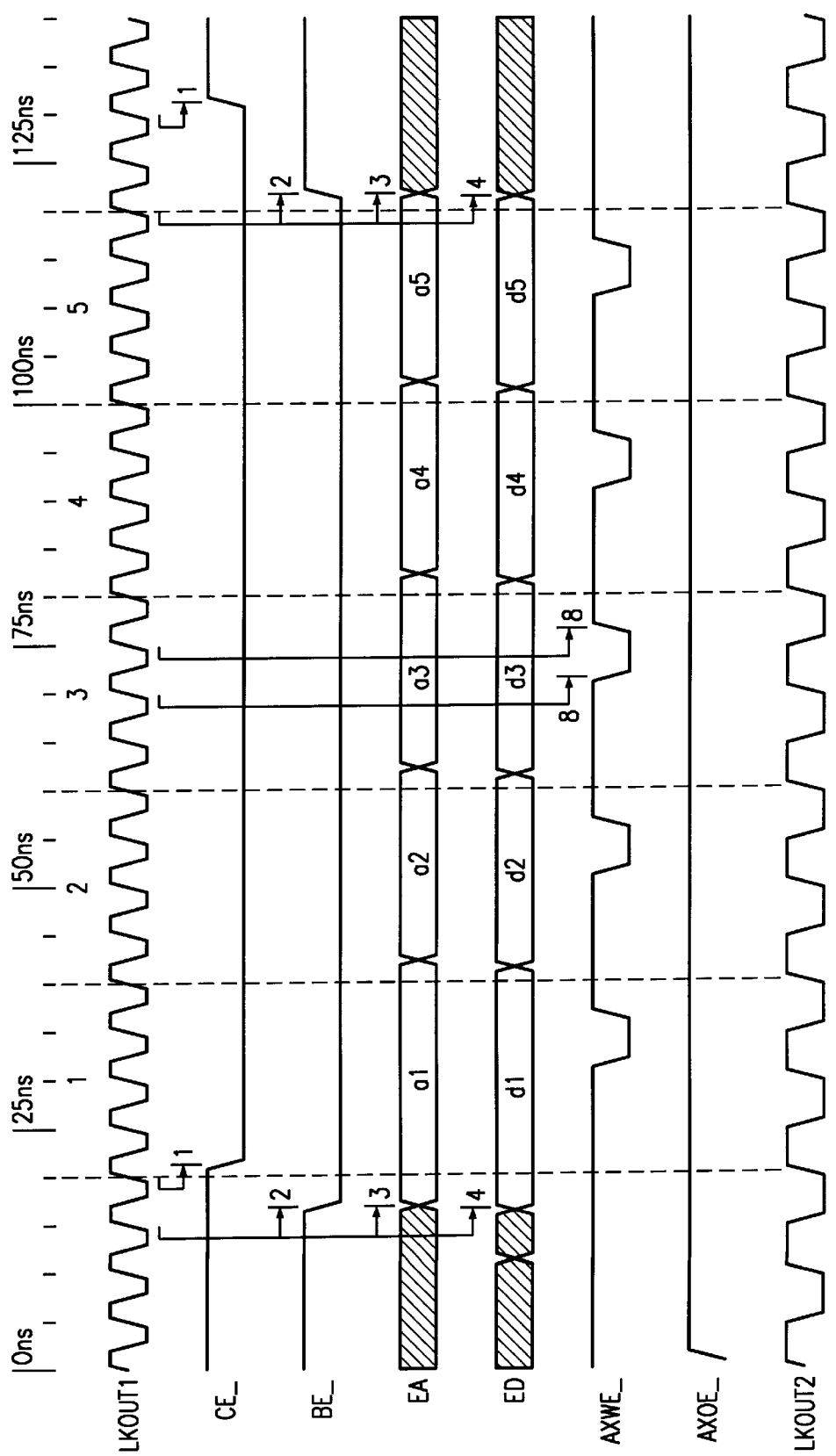
FIG. 40 depicts asynchronous memory write cycle timings.

Asynchronous memory write cycles use the AXWE_ control signal to latch the data in the memory device. The AXWE_signal shape is programmed by setting fields in the EMIF External Timing Register. The cycles in FIG. 40. Correspond to 1 cycle setup, 1 cycle strobe width and 1 cycle hold time (fastest write possible). Asynchronous Memory AXOE_ and AXWE_control signals are also used during External Control cycles.

Timing Parameters for Asynchronous Memory Cycles

| NO | | | min | max | unit |
|---|---|---|---|---|---|
| 1 | $t_d$(CKH-CE) | Delay time, CLKOUT1 high to CE_ valid | | 1.9 | ns |
| 2 | $t_d$(CKH-BE) | Delay time, CLKOUT1 high to BE_ valid | | 2.2 | ns |
| 3 | $t_d$(CKH-A) | Delay time, CLKOUT1 high to A valid | 0 | 1.7 | ns |
| 4 | $t_d$(CKH-D) | Delay time, CLKOUT1 high to D valid | 0 | 2.0 | ns |
| 5 | $t_{su}$(D-CKH) | Setup time, read D before CLKOUT1 high | 0.5 | | ns |
| 6 | $t_h$(CKH-D) | Hold time, read D valid after CLKOUT1 high | 0 | | ns |
| 7 | $t_d$(CKH-OE) | Delay time, CLKOUT1 high to ASOE_ valid | | 1.9 | ns |
| 8 | $t_d$(CKH-WE) | Delay time, CLKOUT1 high to ASWE_ valid | | 2.0 | ns |

Figure 39:
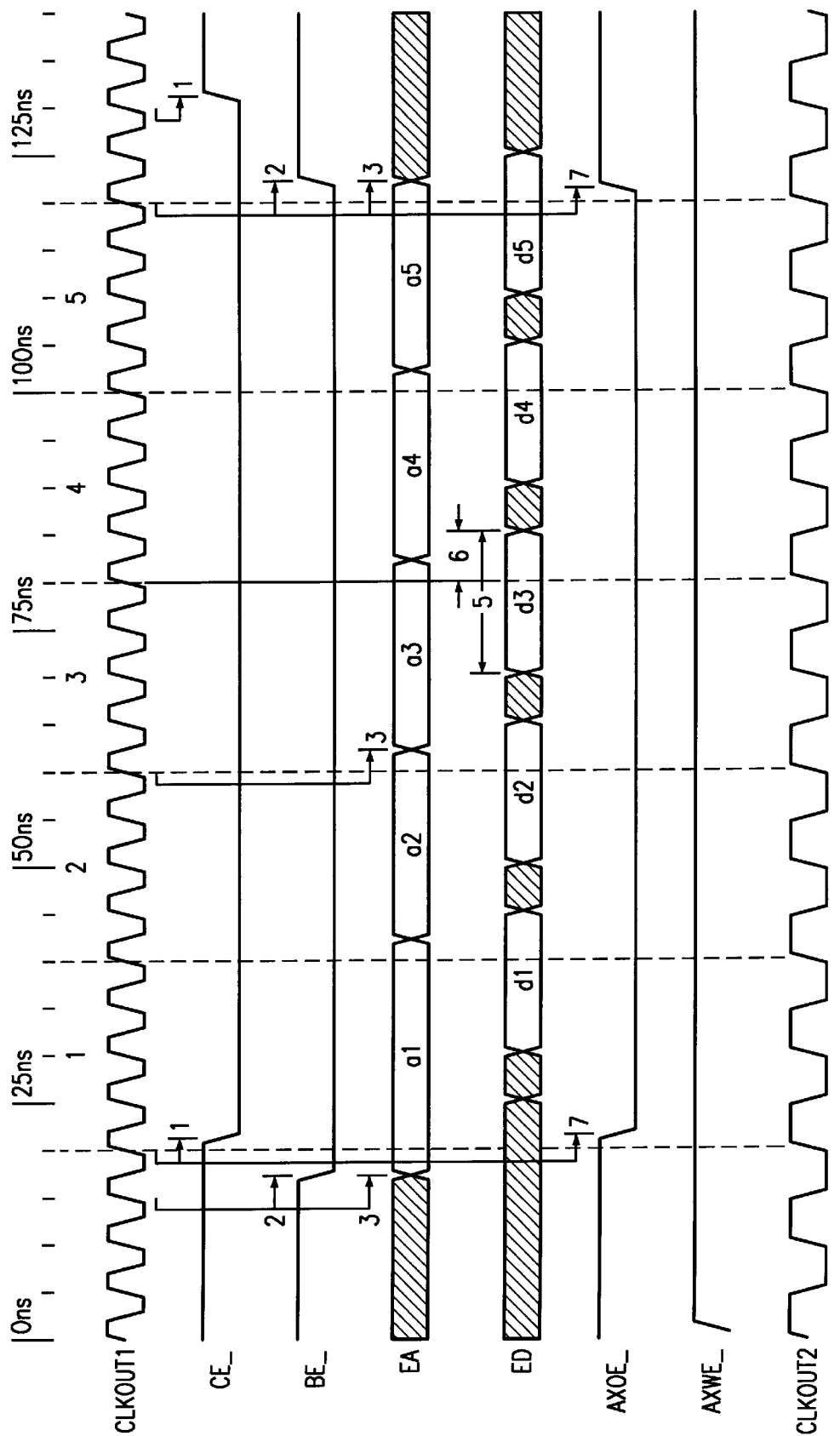
FIG. 39 depicts asynchronous memory read cycle timings.

FIG. 39 depicts asynchronous memory read cycle timings described above and FIG. 40 depicts asynchronous memory write cycle timings.

The CE Space Timing Register contains 3 fields that determine the shape and duration of the AXWE_ and AXOE_control signals. The examples shown in FIGS. 39 and 40 correspond to value of 1 programmed in Setup, Strobe and Hold fields of the CE Space Timing Register (the smallest value permitted). Each read and write also contains a 1 cycle internal address latch time which is not programmable. Even as the AXOE_signal doesn't come up in between the successive read cycles, the combined effect of Setup, Strobe and Hold values determine the total length of each read.

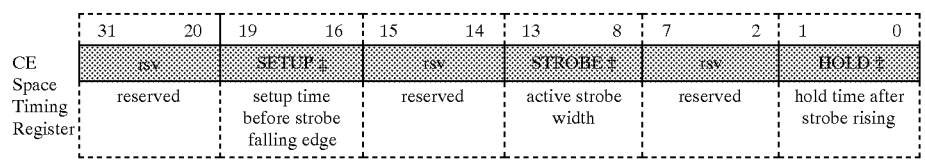

‡ The smallest value permitted for this field is 1

Any External Memory access in CE__space 0 and 2 can be converted to an External Controller cycle by setting appropriate bits in the EMIF Global Control Register. All External Controller cycles use AXOE__ and AXWE__control signals to specify the direction of data transfer. For both reads and writes, the DSP drives the XREQ__control signal low to announce the start of a read or write cycle. If the External Device is ready for the data transfer, it immediately drives the AXRDY signal high. AXRDY remains high as long as the External Device is ready to transfer data. When the External Device is not ready for transfer, it should immediately bring the AXRDY line low to stall the current bus cycle until it is once again ready. See FIGS. 6 and 7 for External Controller timing waveforms.

Parameters for External Controller Cycles

SDWE__control lines. First the ACTV command activates one of two SDRAM internal banks. The READ or WRITE commands transfer data between the DSP and the SDRAM memory. Finally, the DCAB command deactivates both banks of the SDRAM (banks A and B). The SDRAM uses CLKOUT2 clock to transfer data and to latch commands. In case of the read cycle, the data is driven on the bus by the SDRAM exactly 2 CLKOUT2 cycles following the rising edge of SDCAS__. This read LATENCY has been programmed into the SDRAM by the DSP at the time of SDRAM initialization.

The BE__control signals behave differently during SDRAM cycles then they do for other types of memory. Each BE__ signal should be connected to the corresponding SDRAM DQM input. For reads, the SDQM controls become

| NO | | | min | max | unit |
|---|---|---|---|---|---|
| 1 | $t_d$(CKH-CE) | Delay time, CLKOUT1 high to CE__ valid | | 1.9 | ns |
| 2 | $t_d$(CKH-BE) | Delay time, CLKOUT1 high to BE__ valid | | 2.2 | ns |
| 3 | $t_d$(CKH-A) | Delay time, CLKOUT1 high to A valid | 0 | 1.7 | ns |
| 4 | $t_d$(CKH-D) | Delay time, CLKOUT1 high to D valid | 0 | 2.0 | ns |
| 5 | $t_{su}$(D-CKH) | Setup time, read D before CLKOUT1 high | 1.0 | | ns |
| 6 | $t_h$(CKH-D) | Hold time, read D valid after CLKOUT1 high | 2.0 | | ns |
| 7 | $t_d$(CKH-OE) | Delay time, CLKOUT1 high to ASOE__ valid | | 1.9 | ns |
| 8 | $t_d$(CKH-WE) | Delay time, CLKOUT1 high to ASWE__ valid | | 2.0 | ns |
| 9 | $t_d$(CKH-XREQ) | Delay time, CLKOUT1 high to XREQ__ valid | | 1.3 | ns |
| 10 | $t_{su}$(XRDY-CKH) | Setup time, read XRDY valid before CLKOUT1 high | 0.5 | | ns |
| 11 | $t_h$(CKH-XRDY) | Hold time, read XRDY valid after CLKOUT1 high | 2.8 | | ns |

Figure 41:
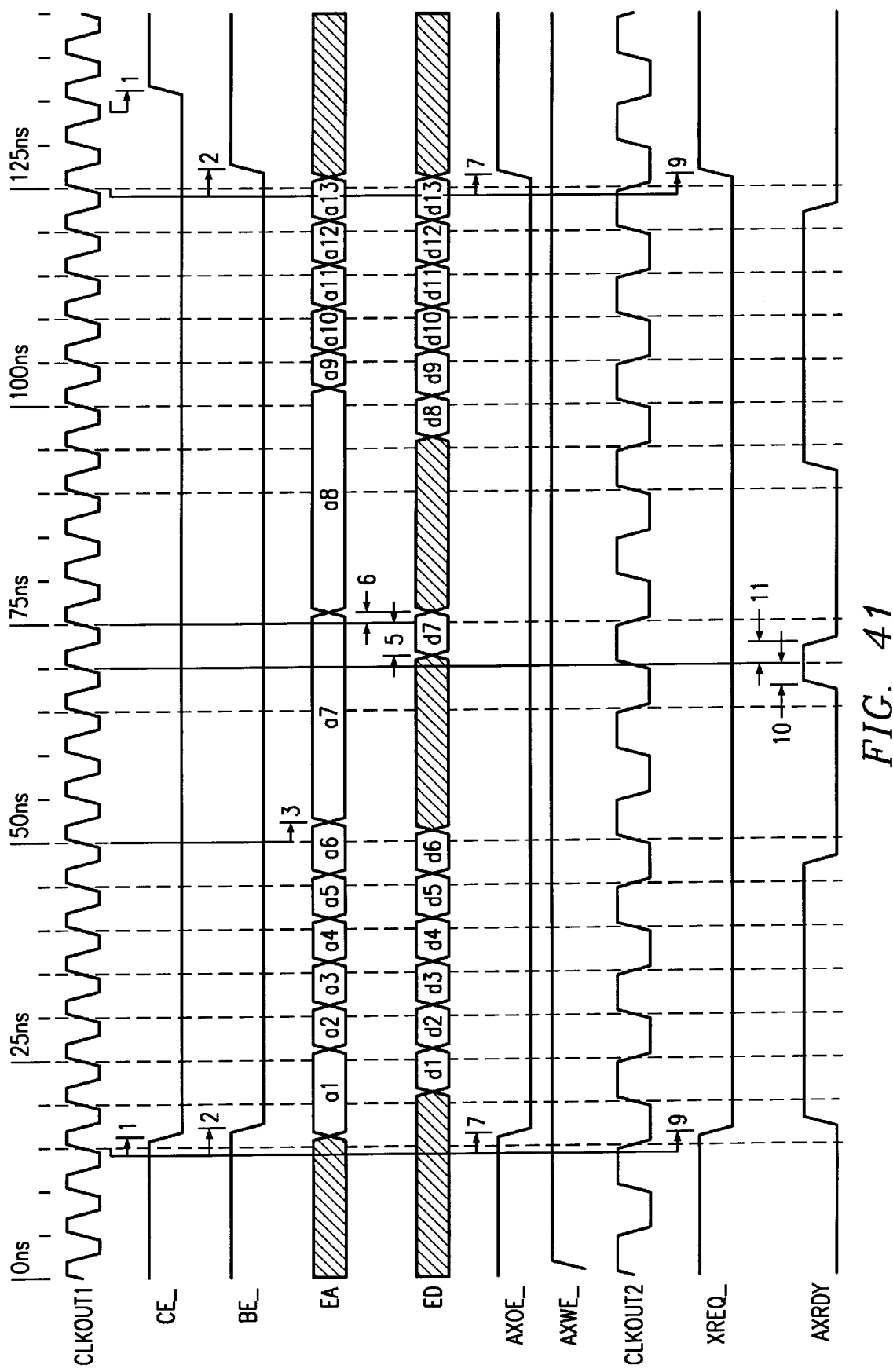
FIG. 41 depicts external controller read cycle timings.
Figure 42:
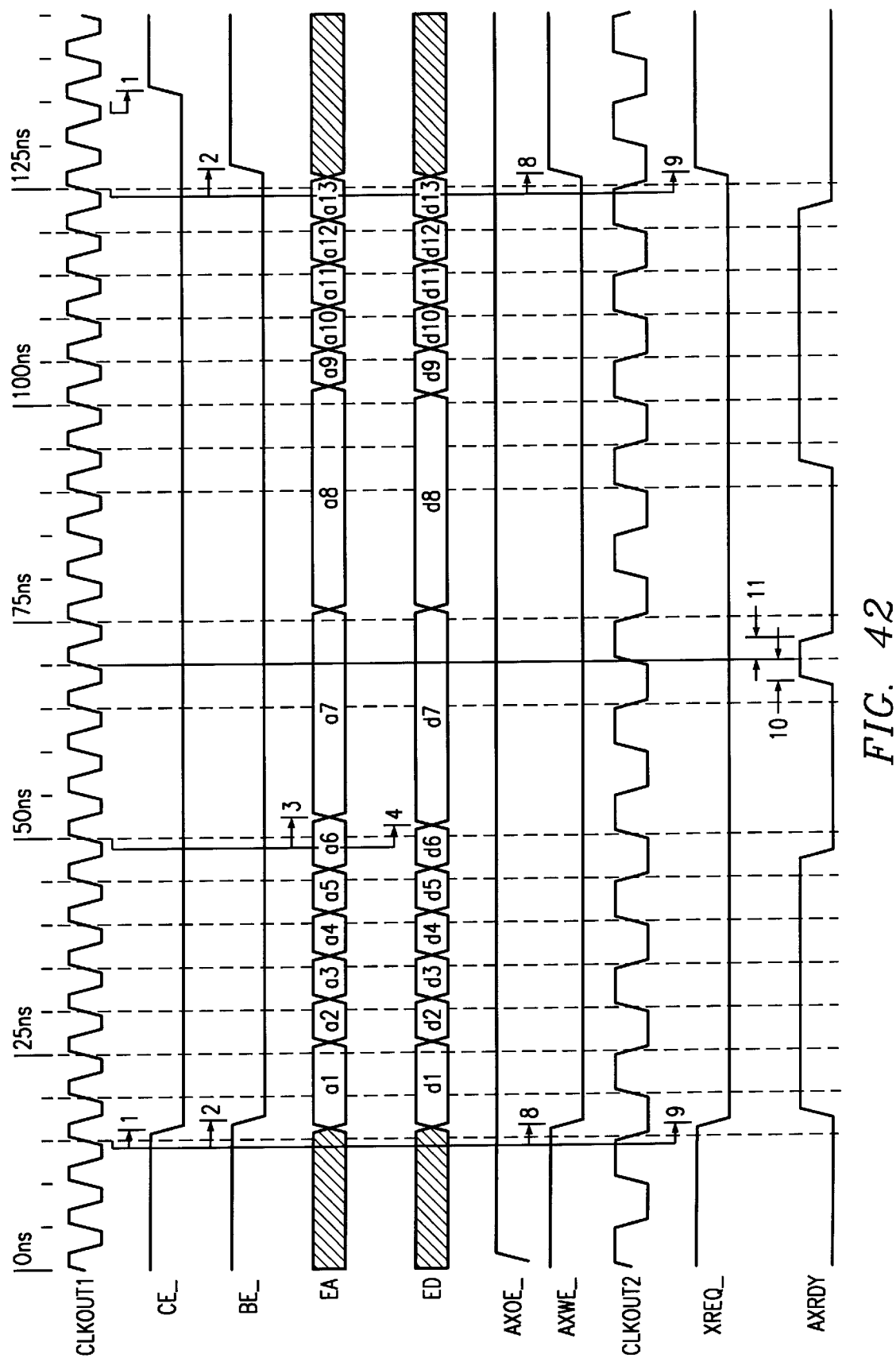
FIG. 42 depicts external controller write cycle timings.

FIG. 41 depicts external controller read cycle timings and FIG. 42 depicts external controller write cycle timings.

Figure 43:
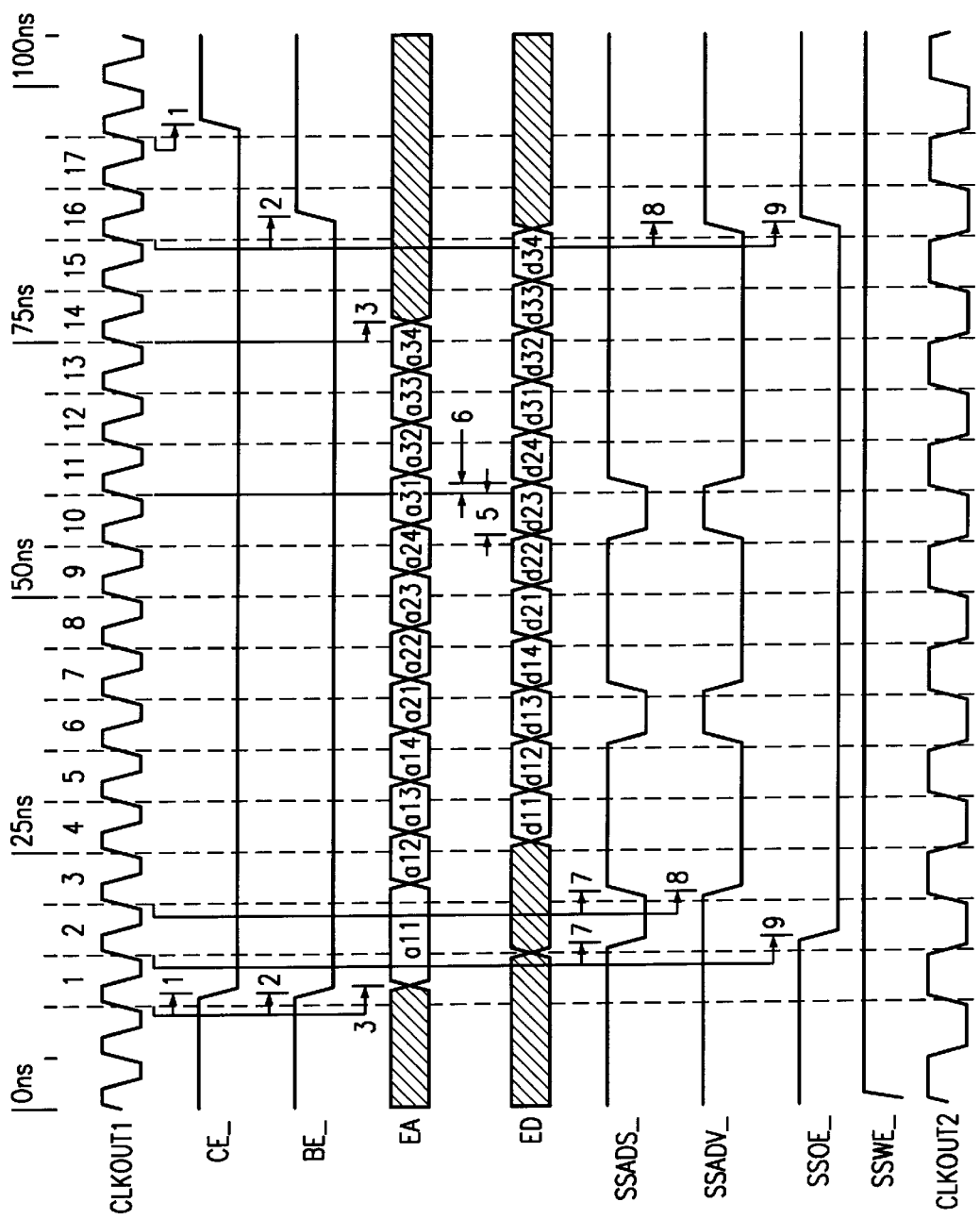
FIG. 43 depicts SBSRAM Read Cycle Timing.
Figure 44:
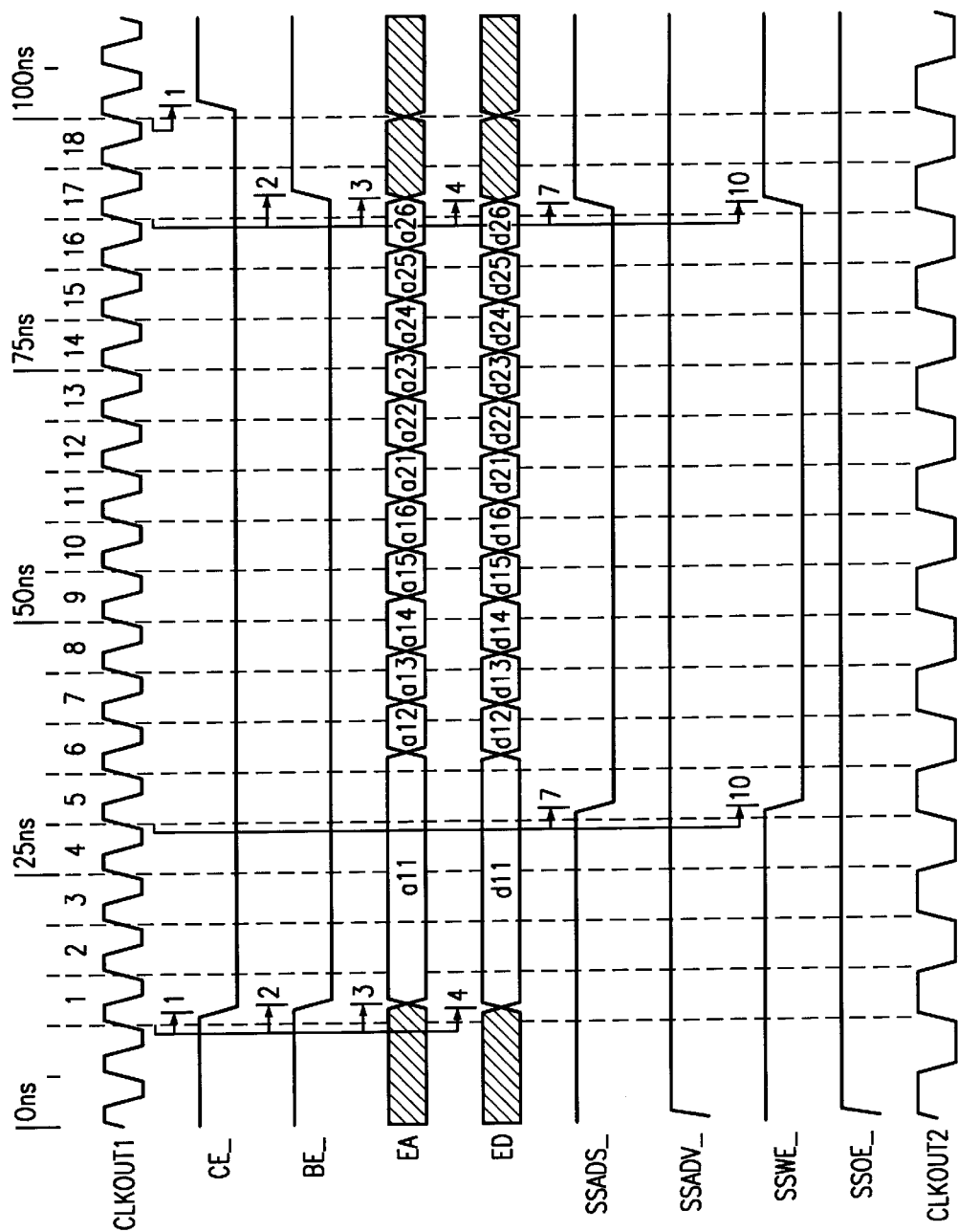
FIG. 44 depicts SBSRAM Write Cycle Timing.

FIGS. 43 and 44 show read and write cycles transferring data between the DSP and SBSRAM. The SBSRAM interface consists of 4 dedicted SBSRAM control signals. The address strobe, SSADS__, is used to latch the first address of the burst transfer into the SBSRAM device. For write cycle it is asserted continuously as long as data is being transferred. Forv read cycles the SSADS__signal is only asserted for the first word of the burst transfer and for each time when the address breaks the sequence. The burst size (1 to 4 reads) is determined by the two lowest order bits of the Tuning Parameters for Synchronous Burst SRAM (SBSRAM) Cycles Output Enables and for the writes they assume the function of Write Masking. (associated with burst operation of SDRAM).

Figure 47:
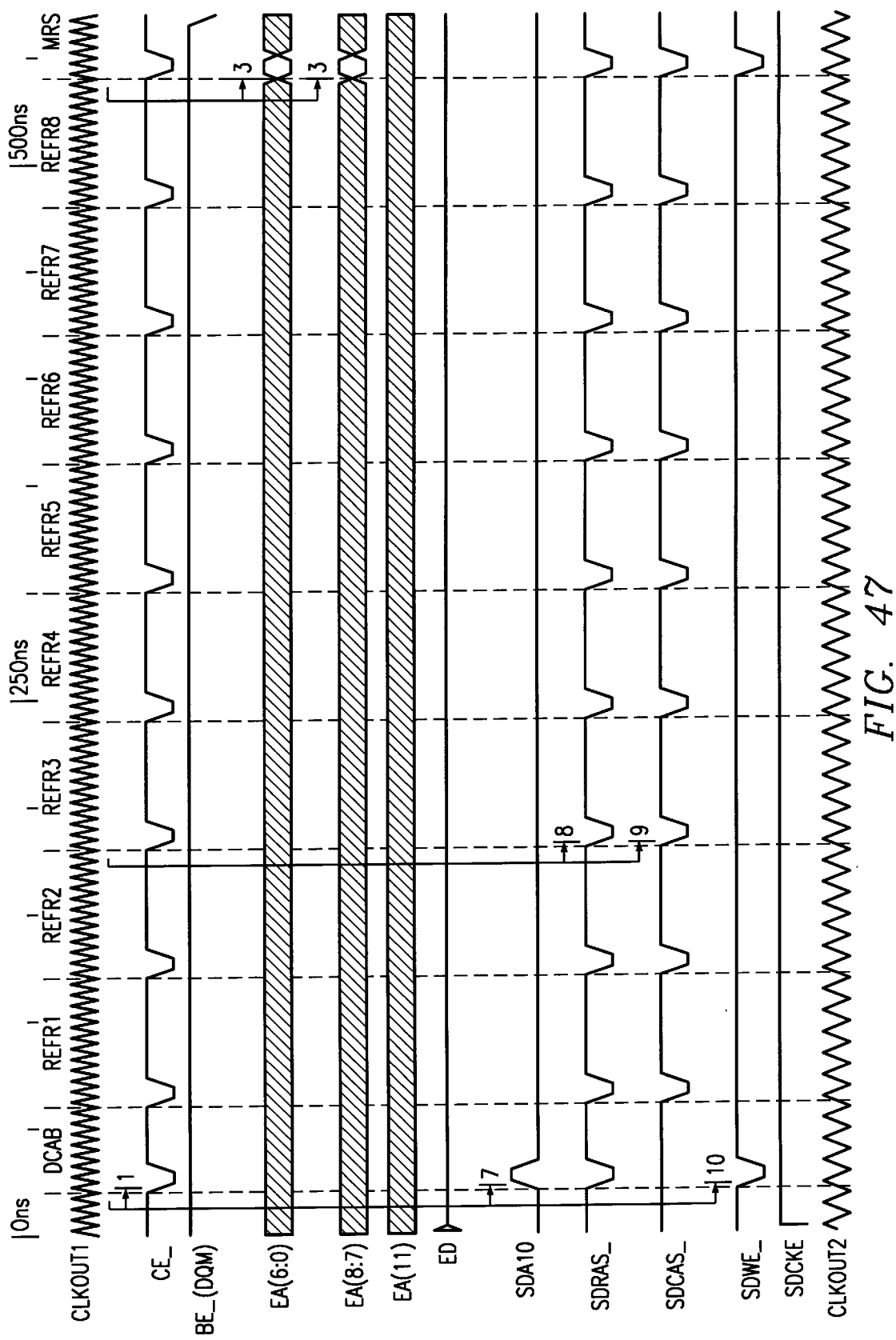
FIG. 47 depicts SDRAM Initialization Cycle Timing.

FIG. 47 shows the initialization commands sent to the SDRAM following Reset. First, both banks of the SDRAM are deactivated with the DCAB command. Next, 8 refresh cycled are issued, followed by the MRS (Mode Register Set) command that initializes control registers inside the SDRAM in accordance with the values stored in the appropriate EMIF registers. During the MRS command the SDRAM initialization data is actually output on the Address Bus instead of Data Bus.

The SDRAM device must be periodically refreshed. Since one of the pins, EA10, is involved in refresh operation, it has been duplicated exclusive use of the SDRAM interface as

| NO | | | min | max | unit |
|---|---|---|---|---|---|
| 1 | $t_d$(CKH-CE) | Delay time, CLKOUT1 high to CE__ valid | | 1.9 | ns |
| 2 | $t_d$(CKH-BE) | Delay time, CLKOUT1 high to BE__ valid | | 2.2 | ns |
| 3 | $t_d$(CKH-A) | Delay time, CLKOUT1 high to A valid | 0 | 1.7 | ns |
| 4 | $t_d$(CKH-D) | Delay time, CLKOUT1 high to D valid | 0 | 2.0 | ns |
| 5 | $t_{su}$(D-CKH) | Setup time, read D before CLKOUT1 high | 0.5 | | ns |
| 6 | $t_h$(CKH-D) | Hold time, read D valid after CLKOUT1 high | 2.0 | | ns |
| 7 | $t_d$(CKH-ADS) | Delay time, CLKOUT1 high to SSADS__ valid | | 1.5 | ns |
| 8 | $t_d$(CKH-ADV) | Delay time, CLKOUT1 high to SSADV__ valid | | 1.8 | ns |
| 9 | $t_d$(CKH-SSOE) | Delay time, CLKOUT1 high to SSOE__ valid | | 2.1 | ns |
| 10 | $t_d$(CKH-SSWE) | Delay time, CLKOUT1 high to SSWE__ valid | | 2.0 | ns |

The SSADS__ signal is pulsed each time the address crosses the modulo 4 boundary (EA0 and EA1 are 0) and during the first access at the beginning of a burst (see FIG. 8).

FIG. 43 depicts SBSRAM Read Cycle Timing and FIG. 44 depicts SBSRAM Write Cycle Timing.

Figure 48:
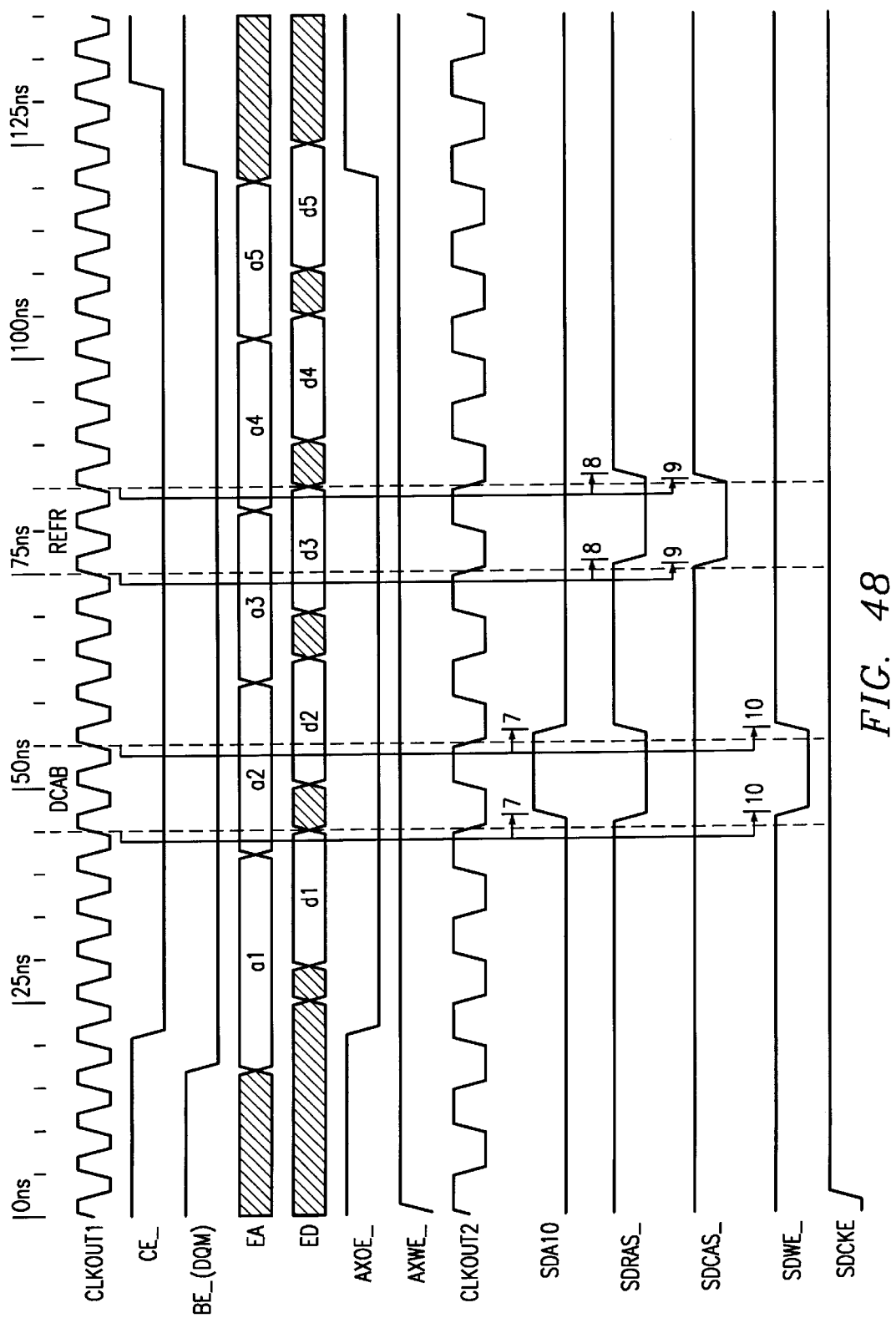
FIG. 48 depicts SDRAM Refresh Cycle Timing.

For the DSP, the SDRAM cycles are limited to non-burst operation. Both read and write cycles consist of 3 commands sent sequentially to the SDRAM device (see FIGS. 45 and 46). Each of the commands is encoded by a different mix of signal levels on CE__, SDA10, SDRAS__, SDCAS__ and SDA10 in order not to interfere with other Memory Cycles that may be active during refresh. FIG. 48 shows a SDRAM refresh cycle in the middle of Asynchronous Memory read sequence. Two commands are issued to the SDRAM during a single refresh cycle. The first one deactivates both SDRAM banks (DCAB), and the second one performs a CAS before RAS refresh. It is evident in the figure that despite the use of Address pin EA10 by the DCAB command, the Asynchronous Memory read cycles are progressing uninterrupted via the duplicate pin SDA10.

Parameters for Synchronous DRAM (SDRAM) Cycles

| NO | | | min | max | unit |
|---|---|---|---|---|---|
| 1 | $t_d$(CKH-CE) | Delay time, CLKOUT1 high to CE_ valid | | 1.9 | ns |
| 3 | $t_d$(CKH-A) | Delay time, CLKOUT1 high to A valid | 0 | 1.7 | ns |
| 4 | $t_d$(CKH-D) | Delay time, CLKOUT1 high to D valid | 0 | 2.0 | ns |
| 5 | $t_{su}$(D-CKH) | Setup time, read D before CLKOUT1 high | 0.5 | | ns |
| 6 | $t_h$(CKH-D) | Hold time, read D valid after CLKOUT1 high | 2.0 | | ns |
| 7 | $t_d$(CKH-SDA10) | Delay time, CLKOUT1 high to SDA10_ valid | | 1.5 | ns |
| 8 | $t_d$(CKH-SDRAS) | Delay time, CLKOUT1 high to SDRAS_ valid | | 1.1 | ns |
| 9 | $t_d$(CKH-SDCAS) | Delay time, CLKOUT1 high to SDCAS_ valid | | 1.3 | ns |
| 10 | $t_d$(CKH-SDWE) | Delay time, CLKOUT1 high to SDWE_ valid | | 1.1 | ns |
| 11 | $t_d$(CKH-SDCKE) | Delay time, CLKOUT1 high to SDCKE | | 1.3 | ns |

Figure 45:
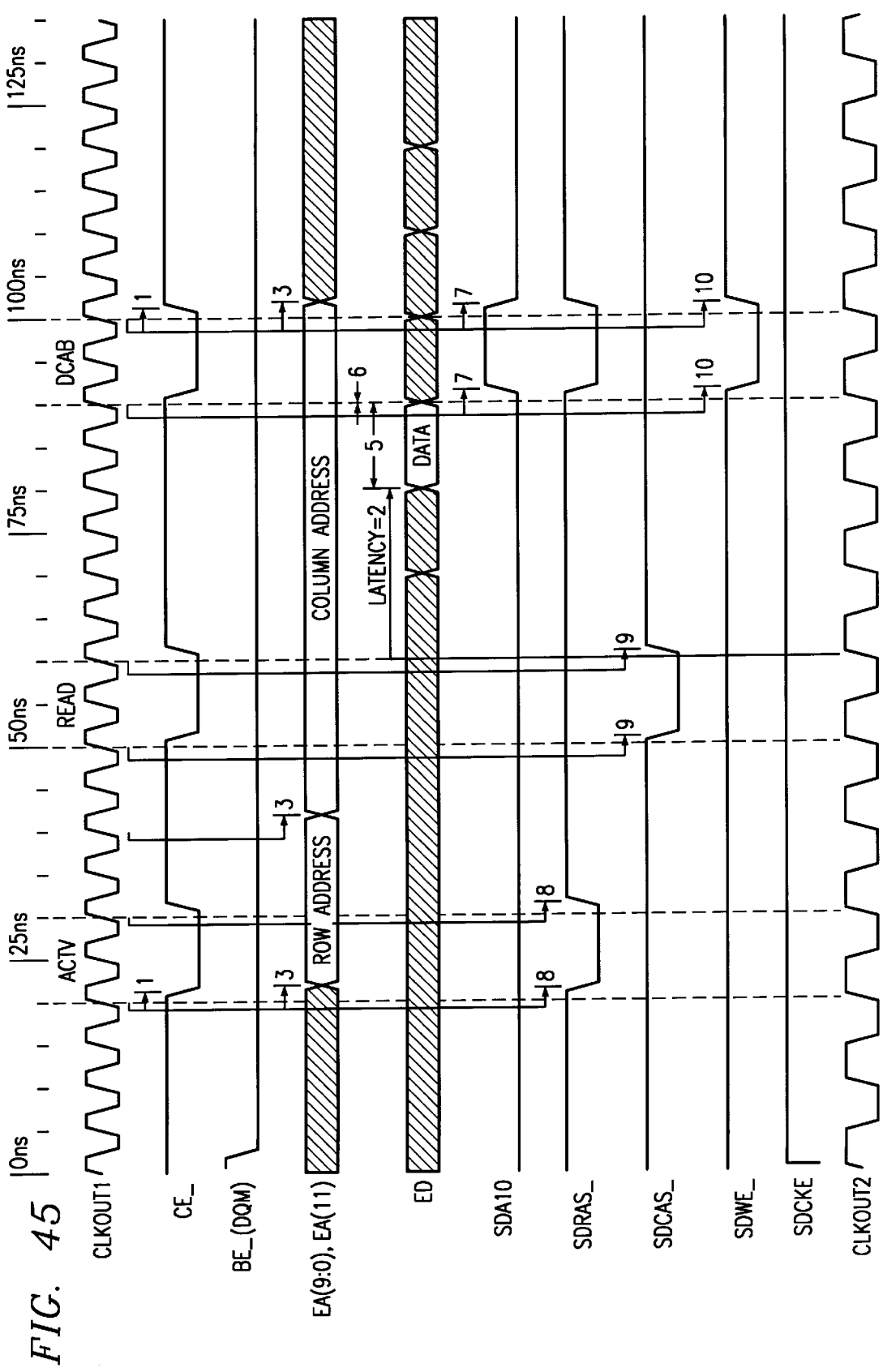
FIG. 45 depicts SDRAM Read Cycle Timing.
Figure 46:
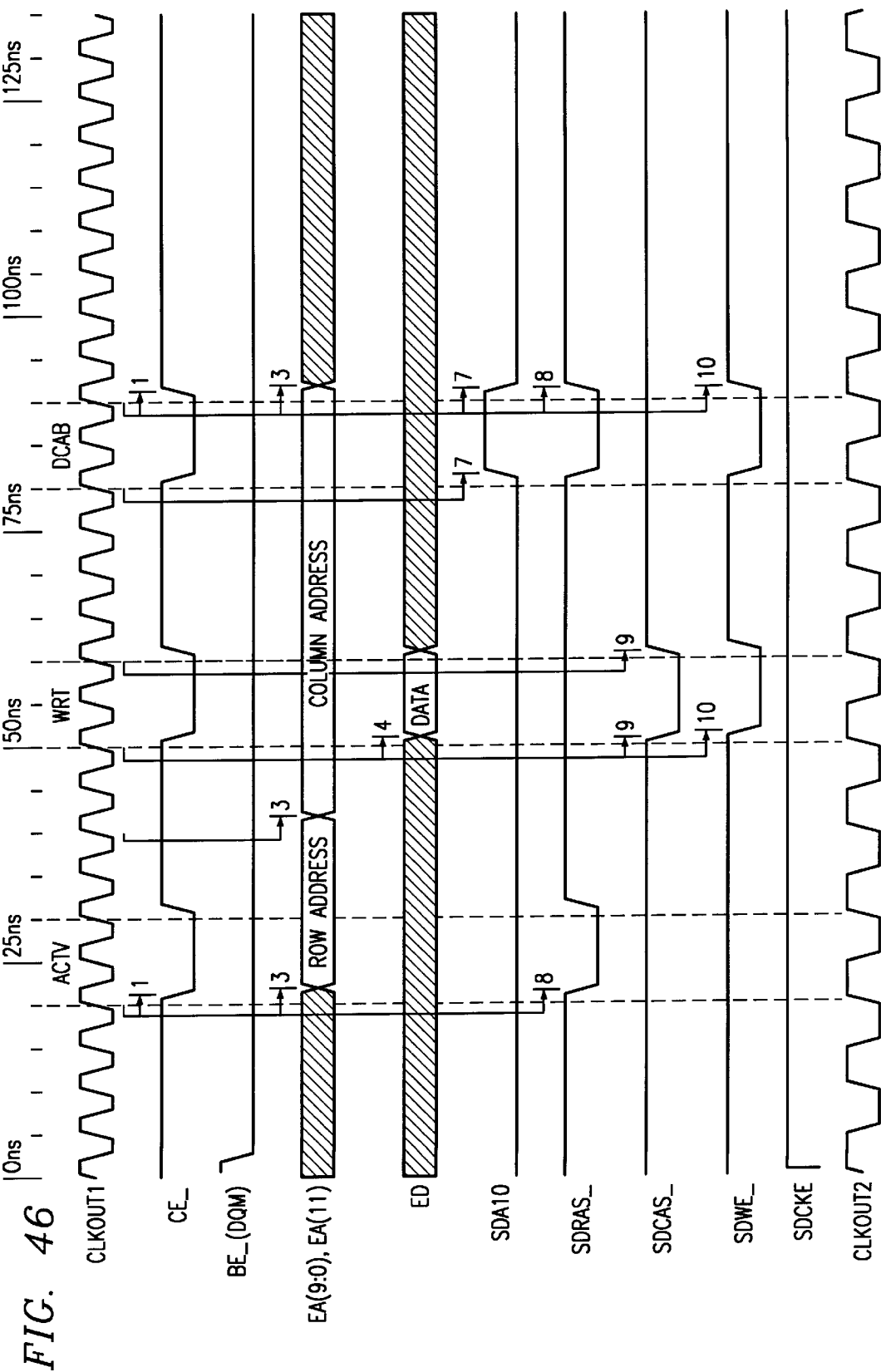
FIG. 46 depicts SDRAM Write Cycle Timing.

FIG. 45 depicts SDRAM Read Cycle Timing; FIG. 46 depicts SDRAM Write Cycle Timing; FIG. 47 depicts SDRAM Initialization Cycle Timing; and FIG. 48 depicts SDRAM Refresh Cycle Timing.

Figure 49:
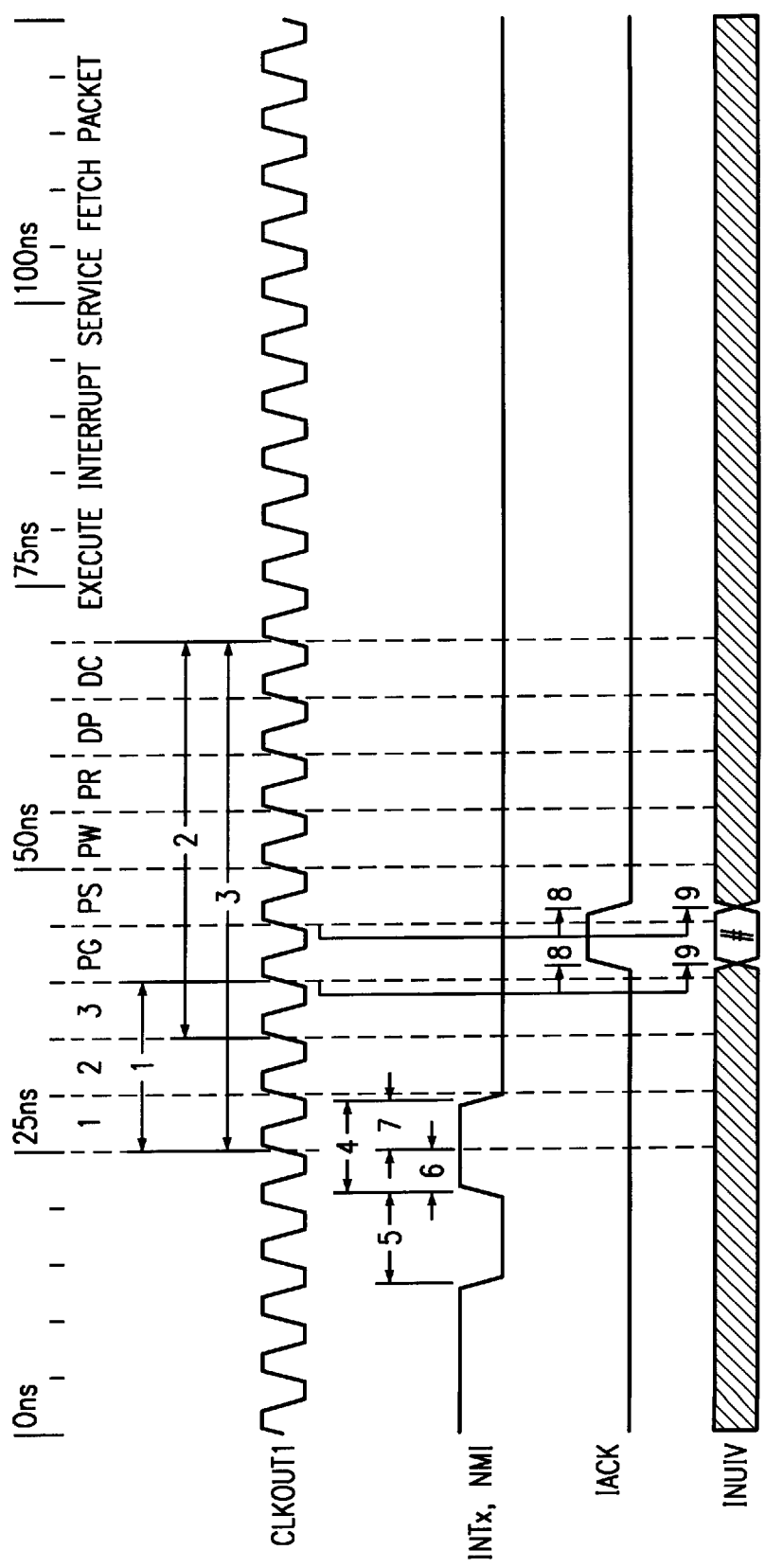
FIG. 49 shows the interrupt service fetch packets start execution.

An external interrupt event is triggered by a high pulse on the INTx signal. If on one rising edge of the CLKOUT1 the INTx is recognized as low, and on the next CLKOUT1 rising edge the INTx is recognized as high, the external interrupt is detected. As early as three cycles later, the IACK signal may pulse for one cycle with the number of the active interrupt encoded on the 4 INUM lines. The IACK and INUM signals indicate the start of any interrupt processing, not just for external interrupts. The INUM identification number reflects the relative bit position of the processed interrupt within the IFR (Interrupt Flag Register). Also, one cycle prior to the IACK pulse, all instructions (except branch delay slots) that have not reached the execution stage are annulled and the address of the annulled instruction closest to execution stage is saved in the appropriate Interrupt Return Pointer (IRP or NRP). The instructions that already have begun executing, will complete the remaining execution stages while the Interrupt Service Fetch Packet is being fetched and decoded. During the 7 fetch/decode cycles the processor will not start processing any new instructions (hence the 7 cycle interrupt overhead). The Interrupt Service Fetch Packet starts executing on the $7^{th}$ cycle following IACK (see FIG. 49).

Timing Parameters for the Interrupt Response Cycle

| NO | | | min | max | unit |
|---|---|---|---|---|---|
| 1 | $t_r$(IACK) | Response time, IACK high after INTx_ high | 3 | | cycles |
| 2 | $t_w$(IDEAD) | Width of the interrupt overhead (no instructions executed) | 7 | 7 | cycles |
| 3 | $t_r$(ISFP) | Response time, Interrupt Service Fetch Packet execution after INTX_ high | 9 | | cycles |
| 4 | $t_w$(INTR) | Width of the interrupt pulse | 1 | | cycles |
| 5 | $t_w$(ILOW) | Width of the low state preceding the interrupt pulse | 1 | | cycles |
| 6 | $t_{su}$(IHIGH-CKH) | Setup time, INTx_ low before CLKOUT1 high | 0.3 | | ns |
| 7 | $t_h$(CKH-ILOW) | Hold time, INTx_ low after CLKOUT1 high | 3.0 | | ns |
| 8 | $t_d$(CKH-IACK) | Delay time, CLKOUT1 high to IACK valid | | 1 | ns |
| 9 | $t_d$(CKH-INUM) | Delay time, CLKOUT1 high to INUM valid | | 1 | ns |

Figure 50:
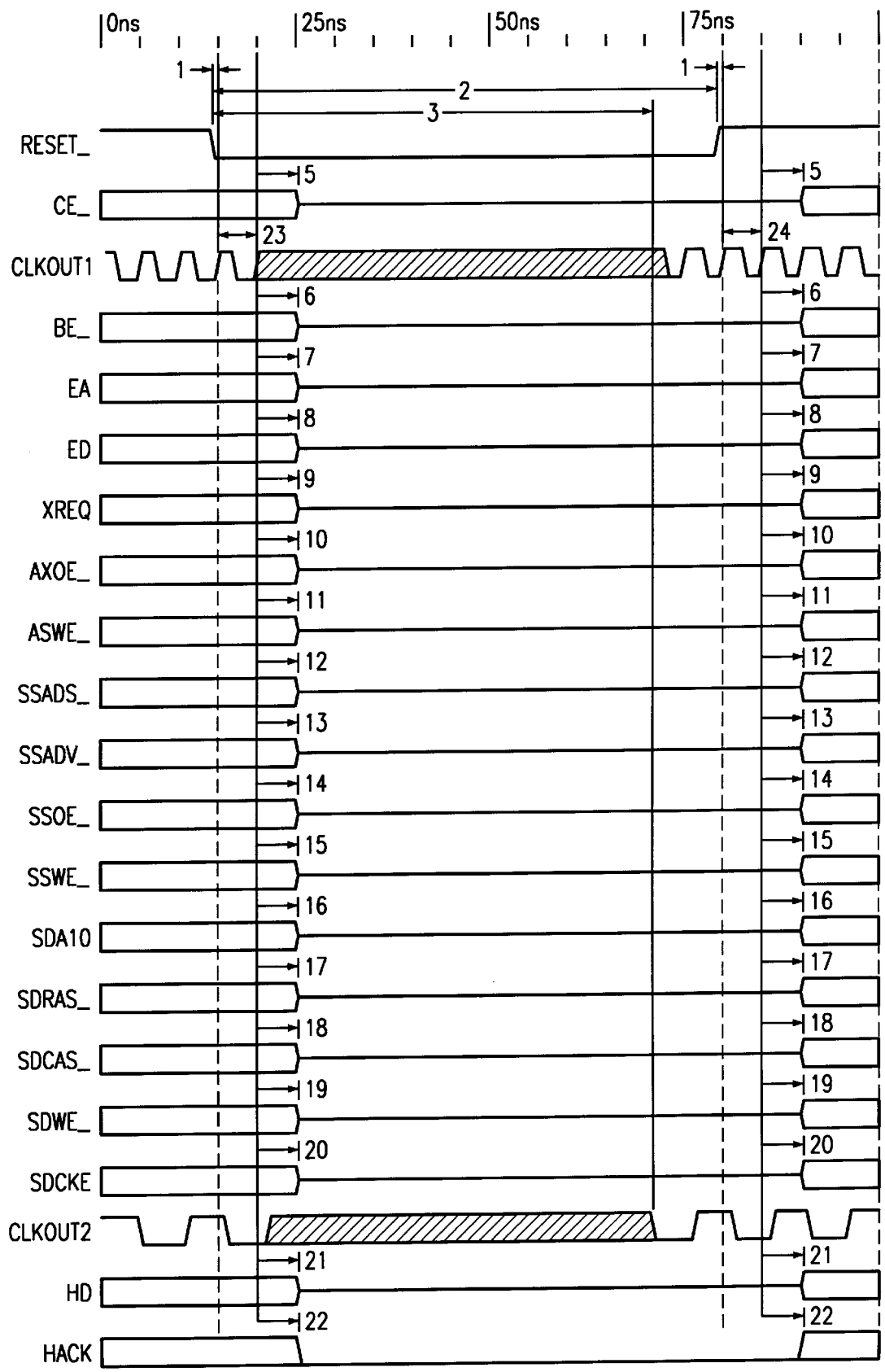
FIG. 50 shows the tr-stated signals driven again by the DSP within 1 clock cycle.

The RESET_signal is sampled on every rising edge of CLKOUT1. If it is detected active (low), all EMIF output signals except HOLDA, as well as all Host Port Interface output signals are tri-stated on the following CLKOUT1 rising edge. After the Reset is deasserted, the tri-stated signals will be driven again by the DSP within 1 clock cycle (see FIG. 50).

Typically, the PLL will lock-up to the specified output frequency within seconds following device power-up. The actual time will depend on the perating mode chosen and the CLKIN/CLKOUT1 frequency range.

Note, that HOLD/HOLDA logic is not affected by the state of the RESET signal.

Timing Parameters for the Reset Cycle

| NO | | | min | max | unit |
|---|---|---|---|---|---|
| 1 | $t_{su}$(CKH-RESET) | Setup time, RESET before CLKOUT1 high | 1 | | ns |
| 2 | $t_2$(RESET) | Width of the RESET pulse (PLL stable) | 10‡ | | cycles |
| 3 | $t_v$(CLKOUT) | Valid time, CLKOUT1/2 after RESET_ low (after power-up) | 10‡ | | cycles |
| 5 | $t_d$(CKH-CE) | Delay time, CLKOUT1 high to CE_ tri-stated/driven | | 5 | ns |
| 6 | $t_d$(CKH-BE) | Delay time, CLKOUT1 high to BE_ tri-stated/driven | | 5 | ns |
| 7 | $t_d$(CKH-A) | Delay time, CLKOUT1 high to A tri-stated/driven | 0 | 5 | ns |
| 8 | $t_d$(CKH-D) | Delay time, CLKOUT1 high to D tri-stated/driven | 0 | 5.1 | ns |
| 9 | $t_d$(CKH-XREQ) | Delay time, CLKOUT1 high to XREQ_ tri-stated/driven | | 5 | ns |
| 10 | $t_d$(CKH-OE) | Delay time, CLKOUT1 high to ASOE_ tri-stated/driven | | 5 | ns |
| 11 | $t_d$(CKH-WE) | Delay time, CLKOUT1 high to ASWE_ tri-stated/driven | | 5 | ns |
| 12 | $t_d$(CKH-ADS) | Delay time, CLKOUT1 high to SSADS_ tri-stated/driven | | 5 | ns |
| 13 | $t_d$(CKH-ADV) | Delay time, CLKOUT1 high to SSADV_ tri-stated/driven | | 5 | ns |
| 14 | $t_d$(CKH-SSOE) | Deiay time, CLKOUT1 high to SSOE_ tri-stated/driven | | 5 | ns |
| 15 | $t_d$(CKH-SSWE) | Delay time, CLKOUT1 high to SSWE_ tri-stated/driven | | 5 | ns |
| 16 | $t_d$(CKH-SDA10) | Delay time, CLKOUT1 high to SDA10 tri-stated/driven | | 5 | ns |
| 17 | $t_d$(CKH-SDRAS) | Delay time, CLKOUT1 high to SDRAS_ tri-stated/driven | | 5 | ns |
| 18 | $t_d$(CKH-SDCAS) | Delay time, CLKOUT1 high to SDCAS_ tri-stated/driven | | 5 | ns |
| 19 | $t_d$(CKH-SDWE) | Delay time, CLKOUT1 high to SDWE_ tri-stated/driven | | 5 | ns |
| 20 | $t_d$(CKH-SDCKE) | Delay time, CLKOUT1 high to SDA10 tri-stated/driven | | 5 | ns |
| 21 | $t_d$(CKH-SHD) | Delay time, CLKOUT1 high to HD tri-stated/driven | 0 | 5 | ns |
| 22 | $t_d$(CKH-HACK) | Delay time, CLKOUT1 high to HACK low/driven | | 5 | ns |
| 23 | $t_d$(RESET-TRI) | Delay time, RESET low to signals tri-stated (or driven low - HACK) | | 2 | cycles |
| 24 | $t_d$(RESET-DRV) | Delay time, RESET high to signals driven | 2 | | cycles |

‡ The RESET_ signal is not internally connected to the clock PLL circuit. The PLL, however, may need up to 250 us to stabilize following device power-up or after PLL configuration has been changed. During that time RESET_ has to be asserted to assure proper device operation. See the PLL section of the Data Sheet for PLL lock times.

Figure 51:
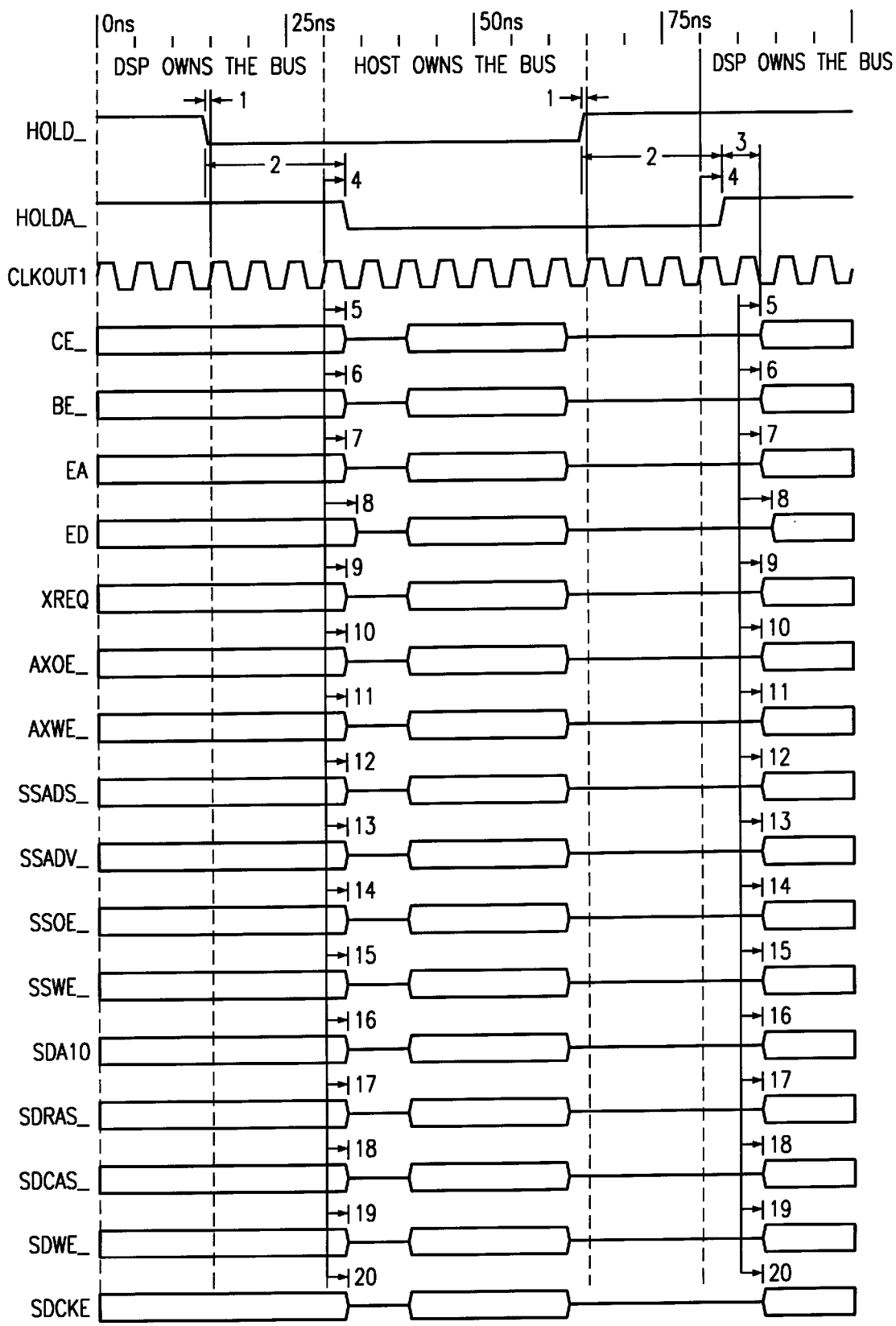
FIG. 51 shows HOLD/HOLDA cycles tri-state all output signals on the EMIF (except HOLDA) and the HPI.

HOLD/HOLDA cycles are used by the host to electrically disconnect the DSP from the system in order for the host processor to directly access system resources. As shown on FIG. 51., HOLD/HOLDA cycles tri-state all output signals on the EMIF (except HOLDA) and the HPI. To request the bus, the host processor drives the HOLD signal high. When the DSP is ready, it will respond by tri-stating the EMIF and HPI busses and asserting the HOLDA signal to announce to the Host that the buses are no longer driven. The host has the permission to use the buses as long as both HOLD and HOLDA control signals are high. Once the HOLD signal is de-asserted, the DSP responds by bringing the HOLDA signal low at which point it resumes driving the EMIF and HPI outputs.

Note, that HOLD/HOLDA logic is not affected by the state of the RESET_signal.

Parameters for the Hold/Hold Acknowledge Cycle

| NO | | | min | max | unit |
|---|---|---|---|---|---|
| 1 | $t_{su}$(CKH-HOLD) | Setup time, HOLD valid before CLKOUT1 high | 1.5 | | ns |
| 2 | $t_r$(HOLDA) | Response time, HOLD high to HOLDA high | 3 | | cycles |
| 3 | $t_d$(BUS) | Delay time, HOLDA low to EMIF bus driven | | 1.5 | cycles |
| 4 | $t_d$(HOLDA) | Delay time, CLKOUT1 high to HOLDA valid | | 3.1 | ns |
| 5 | $t_d$(CKH-CE) | Delay time, CLKOUT1 high to CE_ tri-stated/driven | | 3.1 | ns |
| 6 | $t_d$(CKH-BE) | Delay time, CLKOUT1 high to BE_ tri-stated/driven | | 3.1 | ns |
| 7 | $t_d$(CKH-A) | Delay time, CLKOUT1 high to A tri-stated/driven | 0 | 3.1 | ns |
| 8 | $t_d$(CKH-D) | Delay time, CLKOUT1 high to D tri-stated/driven | 0 | 4.5 | ns |
| 9 | $t_d$(CKH-XREQ) | Delay time, CLKOUT1 high to XREQ_ tri-stated/driven | | 3.1 | ns |
| 10 | $t_d$(CKH-OE) | Delay time, CLKOUT1 high to ASOE_ tri-stated/driven | | 3.1 | ns |

-continued

| NO | | | min | max | unit |
|---|---|---|---|---|---|
| 11 | $t_d$(CKH-WE) | Delay time, CLKOUT1 high to ASWE_ tri-stated/driven | | 3.1 | ns |
| 12 | $t_d$(CKH-ADS) | Delay time, CLKOUT1 high to SSADS_ tri-stated/driven | | 3.1 | ns |
| 13 | $t_d$(CKH-ADV) | Delay time, CLKOUT1 high to SSADV_ tri-stated/driven | | 3.1 | ns |
| 14 | $t_d$(CKH-SSOE) | Delay time, CLKOUT1 high to SSOE_ tri-stated/driven | | 3.1 | ns |
| 15 | $t_d$(CKH-SSWE) | Delay time, CLKOUT1 high to SSWE_ tri-stated/driven | | 3.1 | ns |
| 16 | $t_d$(CKH-SDA10) | Delay time, CLKOUT1 high to SDA10 tri-stated/driven | | 3.1 | ns |
| 17 | $t_d$(CKH-SDRAS) | Delay time, CLKOUT1 high to SDRAS_ tri-stated/driven | | 3.1 | ns |
| 18 | $t_d$(CKH-SDCAS) | Delay time, CLKOUT1 high to SDCAS_ tri-stated/driven | | 3.1 | ns |
| 19 | $t_d$(CKH-SDWE) | Delay time, CLKOUT1 high to SDWE_ tri-stated/driven | | 3.1 | ns |
| 20 | $t_d$(CKH-SDCKE) | Delay time, CLKOUT1 high to SDA10 tri-stated/driven | | 3.1 | ns |

Figure 52:
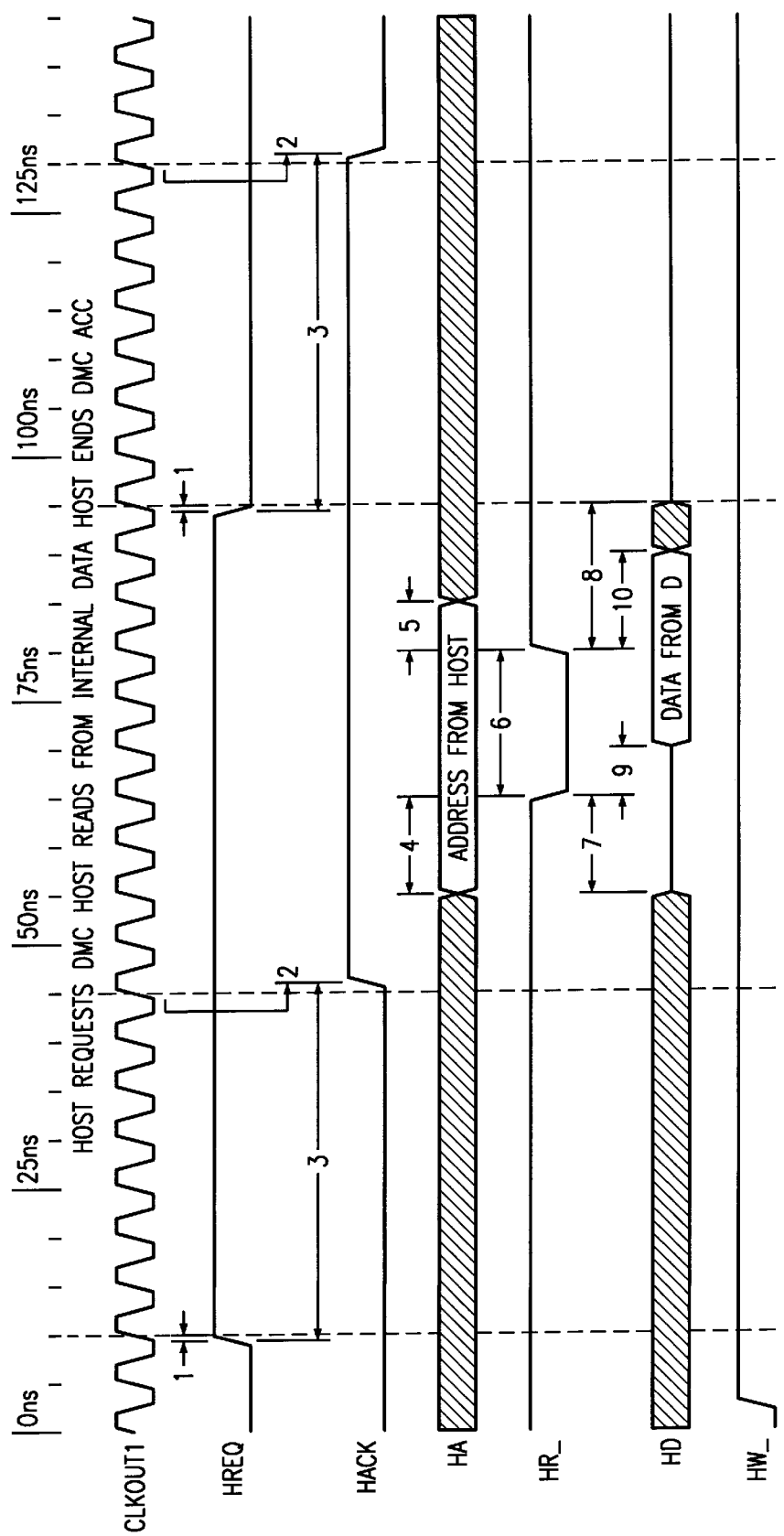
FIGS. 52 and 53 show read and write cycles via the 16-bit Host Port.
Figure 53:
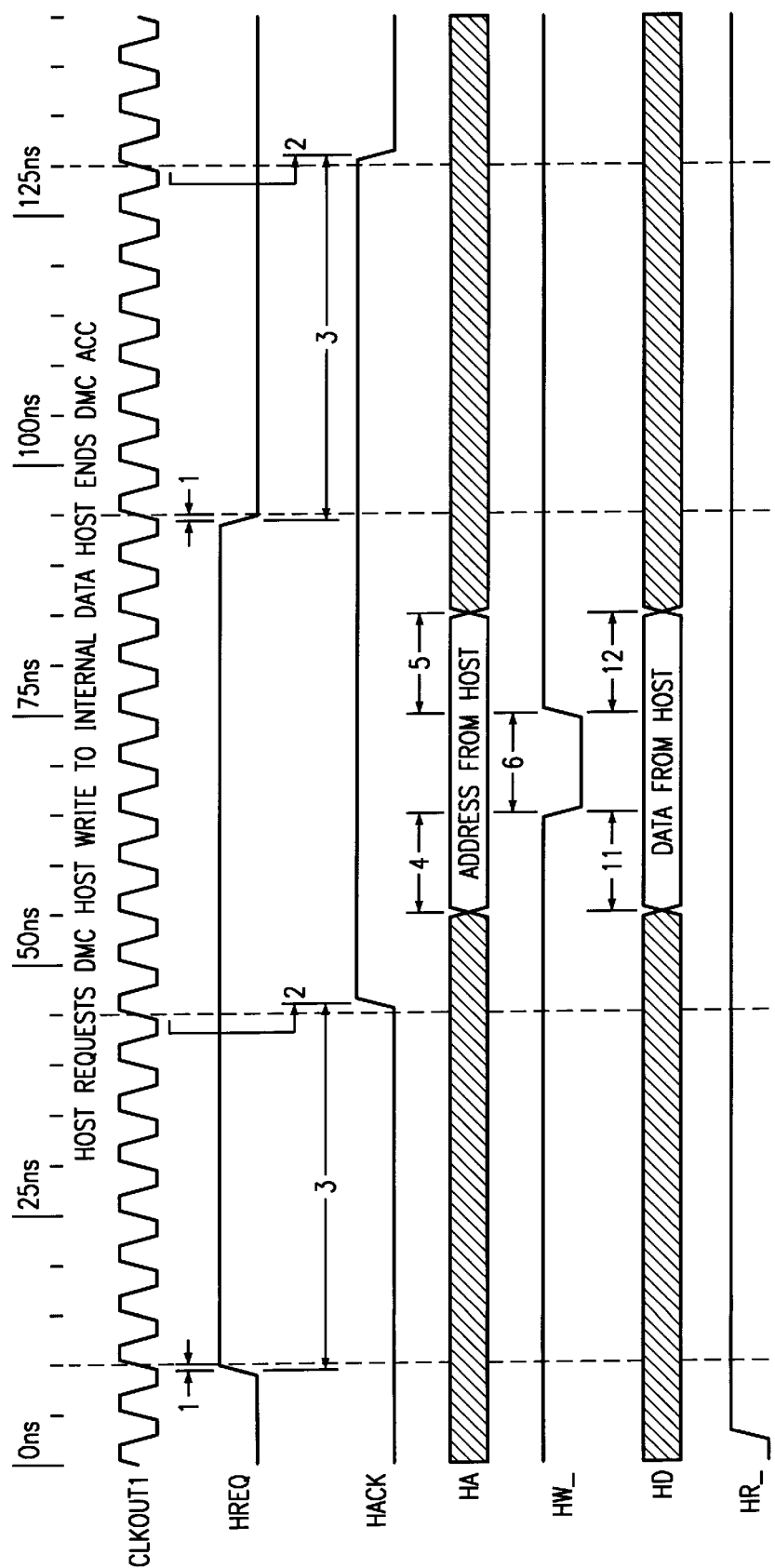

FIGS. 52 and 53 show read and write cycles via the 16-bit Host Port depicted in FIG. 54. The DSP rev A HPI provides host access to the internal Data Memory. Before the data transfer can proceed, the host has to obtain permission from the Data Memory Controller which may take some time to respond, depending on the similar requests for access from the CPU or the DMA. In order to request access to Data Memory, the host asserts the HREQ control signal. When the DMC is ready to grant access to the host, it drives the HACK signal high. At that point the host has ownership of the DSP internal Data Memory. When data transfer has completed, the host deasserts the HREQ signal. After the DSP senses change in the state of the HREQ signal, it returns the HACK signal to the low state and regains control of the internal Data Memory. Note that, while the timing of the handshaking signals HREQ and HACK is specified relative to the rising edge of CLKOUT1, the rest of the Host Port timing parameters are specified in CLKOUT1 clock cycles.

Parameters for the Host Port Cycles

| NO | | | min | max | unit |
|---|---|---|---|---|---|
| 1 | $t_{su}$(HREQ-CKH) | Setup time, HREQ valid before CLKOUT1 high | 1 | | ns |
| 2 | $t_d$(CKH-HACK) | Delay time, CLKOUT1 high to HACK valid | | 1 | ns |
| 3 | $t_r$(HACK) | Response time, HREQ high to HACK high | 7 | | cycles |
| 4 | $t_{su}$(HA-HRW) | Setup time, HA valid before HR/HW low | 2 | | cycles |
| 5 | $t_h$(HA-HRW) | Hold time, HA valid after HR/HW high | 0 | | cycles |
| 6 | $t_w$(HRW) | Width of HR and HW pulse | 8 | | cycles |
| 7 | $t_{su}$(HDHIZ-HR) | Setup time, HD high impedance (not driven by C6X) before HR low | 0 | | cycles |
| 8 | $t_d$(HR-HDHIZ) | Delay time, HD high impedance after HR high | 1 | 2 | cycles |
| 9 | $t_d$(HRL-HD) | Delay time, HR low to HD valid | | 6 | cycles |
| 10 | $t_v$(HRH-HD) | Valid time, HD after HR high | 1 | 2 | cycles |
| 11 | $t_{su}$(HD-HW) | Setup time, HD valid before HW low | 2 | | cycles |
| 12 | $t_h$(HD-HW) | Hold time, HD valid after HW high | 0 | | cycles |
| 13 | $t_n$(HRW) | Period between Consecutive Read and Write Cycles | 12 | | cycles |

The data memory system is shown in FIG. 55. The data memory system includes a 64K byte memory, split up into four banks, and a data memory controller. The CPU can access data memory in 8-bit byte, 16-bit halfword, and 32-bit word-lengths. The data memory system supports two memory accesses in a cycle. These accesses can be any combination of loads and stores from the CPU's LD1 or LD2 and ST1 or ST2 data paths. Similarly, a simultaneous internal and external memory access is supported by the data memory system. The data memory system also supports DMA and external host accesses. The operation of the DMA and host port are described in other chapters in this book.

The data memory is organized into four banks of 16-bit wide memory. This interleaved memory organization provides a method for two simultaneous memory accesses. Occurring in one cycle, two simultaneous accesses to two different internal memory banks will provide the fastest access speed. Two simultaneous accesses to the same internal memory bank will stall the CPU for one cycle, providing two accesses in two cycles. For a simultaneous load and store to the same internal memory bank, the load will be serviced before the store.

A memory bank conflict will occur when two simultaneous accesses are made to the same memory bank. The data memory controller must stall the CPU, serialize the accesses, and perform each access separately when a bank conflict occurs. Whether two simultaneous accesses will conflict depends on the size of each of the accesses, and the address of each access. FIG. 56 shows the different combinations of conflicting accesses if both CPU data paths (LD1/ST1 and LD2/ST2) attempt to access internal data memory in the same cycle. If only one data path makes an access, then no bank conflict will occur. If two simultaneous accesses occur, one to internal data memory and one to external memory a bank conflict will not occur, but the data memory controller will stall the CPU until the external access has completed.

Data Endianness

Two standards for data ordering in byte-addressable microprocessors exist:

Little Endian

Big Endian

Byte ordering within word and half-word data resident in memory is identical for little endian and big endian data.

Little Endian

Little endian byte order puts the byte whose address is "xxxx xx00" at the least significant position in the word (the little end).

Little endian data is addressed by the byte address of the least significant byte.

Big Endian

Big endian byte order puts the byte whose address is "xxxx xx00" at the most significant position in the word (the big end).

Big endian data is addressed by the byte address of the most significant byte.

The DSP can access either big endian or little endian data to have compatible shared data spaces with other processors. The EN bit in the Control Status Register (CSR) determines the data endianness of the DSP. The EN bit in the Control Status Register latches the value on the signal which sets the data endianness at CPU reset. The EN bit is read only and only affects data which is loaded or stored external to the CPU. The CPU places data on the appropriate data lines, and activates the proper byte strobe signals for either big endian or little endian data accesses external to the CPU as specified by the EN bit.

Table 32 shows which bits of a data word in memory are loaded into which bits of a destination register for all possible data loads from big or little endian data. The data in memory is assumed to be the same data that is in the register results from the LDW instruction in the first row.

TABLE 32

Register Contents After
Little Endian or Big Endian Data Loads

| Instruction | Address Bits (1:0) | Big Endian Register Result | Little Endian Register Result |
|---|---|---|---|
| LDW | 00 | BA987654h | BA987654h |
| LDH | 00 | FFFFBA98h | 00007654h |
| LDHU | 00 | 0600BA98h | 00007654h |
| LDH | 10 | 00007654h | FFFFBA98h |
| LDHU | 10 | 00007654h | 0000BA98h |
| LDB | 00 | FFFFFFBAh | 00000054h |
| LDBU | 00 | 000000BAh | 00000054h |
| LDB | 01 | FFFFFF98h | 00000076h |
| LDBU | 01 | 00000098h | 00000076h |
| LDB | 10 | 00000076h | FFFFFF98h |

TABLE 32-continued

Register Contents After
Little Endian or Big Endian Data Loads

| Instruction | Address Bits (1:0) | Big Endian Register Result | Little Endian Register Result |
|---|---|---|---|
| LDBU | 10 | 00000076h | 00000098h |
| LDB | 11 | 00000054h | FFFFFFBAh |
| LDBU | 11 | 00000054h | 000000BAh |

Note: The contents of the word in data memory at location "xxxx xx00" is BA987654h.

Table 33 shows which bits of a register are stored in which bits of a destination memory word for all possible data stores from big and little endian data. The data in the source register is assumed to be the same data that is in the memory results from the STW instruction in the first row.

TABLE 33

Memory Contents After
Little Endian or Big Endian Data Stores

| Instruction | Address Bits (1:0) | Big Endian Memory Result | Little Endian Memory Result |
|---|---|---|---|
| STW | 00 | BA987654h | BA987654h |
| STH | 00 | 76541970h | 01127654h |
| STH | 10 | 01127654h | 76541970h |
| STB | 00 | 54121970h | 01121954h |
| STB | 01 | 01541970h | 01125470h |
| STB | 10 | 01125470h | 01541970h |
| STB | 11 | 01121954h | 54121970h |

Note: The contents of the word in data memory at location "xxxx xx00" before the ST instruction executes is 01121970h. The contents of the source register is BA987654h.

Peripheral Bus

The DSP also controls a peripheral bus which transfers data to and from the memory-mapped peripherals on the device. These peripherals include the DMA, external memory interface, and host port. The addresses accessed through the peripheral bus are used to configure these peripherals. Peripheral bus accesses can only be word wide and must be executed on Data Path B of the CPU.

The DSP program memory system includes 64K bytes of memory and a memory/cache controller. The program memory can operate as either a 64K byte internal program memory or as a direct mapped program cache. There are four modes under which the program memory system operates: program memory mode; cache enable mode; cache freeze mode; and cache bypass mode.

Figure 57:
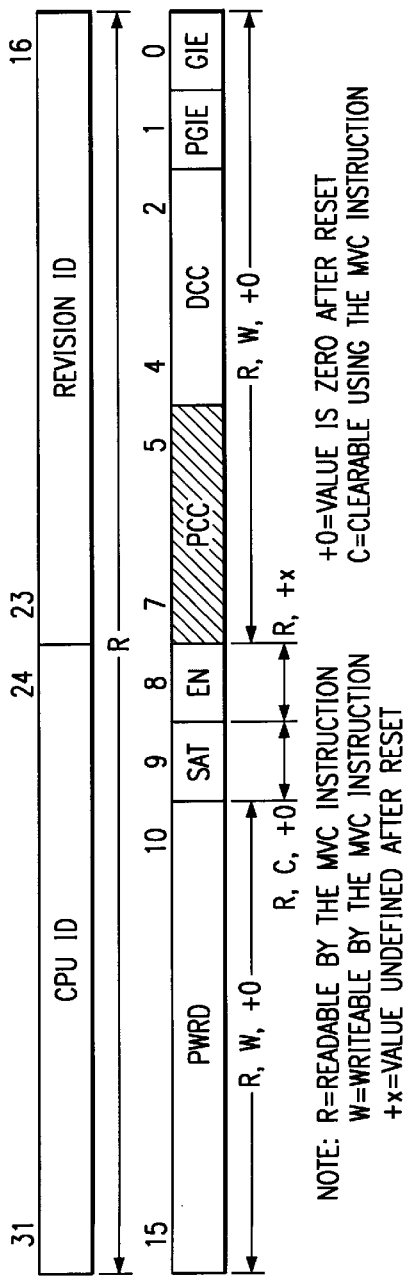
FIG. 57 shows the control status register (CSR) for the CPU.

FIG. 57 shows the control status register (CSR) for the CPU. The mode under which the program memory operates is determined by the program cache control (PCC) field (bits 5–7) in the CSR.

Table 34 shows which PCC values are supported by the TMS320C6201 program memory system.

TABLE 34

Program Memory System Control Encoding

| PCC Value | Program Mode | Description |
|---|---|---|
| 000 | Program Memory | Memory is mapped as program memory space. Cache modes disabled. (value at reset) |
| 001 | Reserved | Not supported on TM5320C6201. |
| 010 | Cache Enable | Cache accessed and updated on reads. |

TABLE 34-continued

Program Memory System Control Encoding

| PCC Value | Program Mode | Description |
|---|---|---|
| 011 | Cache Freeze | Cache accessed but not updated on reads. |
| 100 | Cache Bypass | Cache not accessed or updated on reads. |
| 101 | Reserved | Not supported on TMS320C6201. |
| 110 | Reserved | Not supported on TMS320C6201. |
| 111 | Reserved | Not supported on TMS320C6201. |

When the PCC field of the CSR contains the value 000b, the program memory is mapped as valid program memory space. The addresses that make up the program memory map depend on the value on the MAP_BOOT pin on the device. Table 35 shows the memory address space for the on-chip program memory in program memory mode according to the map mode value.

TABLE 35

Program Memory Address Map

| MAP_BOOT Value | Program RAM Byte Addresses |
|---|---|
| 0 | 1400000h–140FFFFh |
| 1 | 0000000h–000FFFFh |

Note: Only a MAP_BOOT value of 1 can be used for bootloading.

The DMA can write data into an addressed space of program memory. The DMA cannot read from the internal program memory in program memory mode.

At reset, the program memory system is in program memory mode. This allows the DMA to bootload code into the internal program memory. See the DMA chapter for more information on bootloading code.

A program store, accomplished by executing a STP instruction, in program memory mode will store the appropriate value to the addressed memory location.

When the PCC field of the CSR contains a cache mode value, the program memory is used to cache external program data. The memory is no longer in valid memory space and cannot be directly addressed, therefore the DMA cannot write or read the internal program memory in any cache mode. The caching scheme implemented in the TMS320C6201 program cache is a direct mapping of external program memory addresses to cache memory addresses. This means that any external address will map to only one cache location, and addresses which are 64K bytes apart will map to the same cache location. The program cache is organized into 256-bit frames. Thus, each frame holds one fetch packet. The cache stores 2048 fetch packets.

A program store to external memory in any cache mode will first flush the data in the cache frame that is direct mapped to the target address. This is done to ensure data coherency in the cache. The data is then written to the external memory at the addressed location. When that address is again accessed a cache miss occurs causing the stored data to be loaded from external memory.

When the PCC field of the CSR contains the value 010b, the program memory is enabled as a cache. On the change from program memory mode to cache enabled mode, the program cache is flushed. The only method supported by the DSP for flushing the cache is a change from program memory mode to cache enabled mode. In cache enabled mode, any initial program fetch of an address will cause a cache miss to occur. In a cache miss, data is loaded from external program memory, stored in the internal cache memory, and then executed by the CPU. Any subsequent read from a cached address will cause a cache hit and that data will be loaded from the internal cache memory.

When the PCC field of the CSR contains the value 011b, the program cache is frozen. During a cache freeze, the cache retains it's current state. A program read to a frozen cache is identical to a read to an enabled cache with the exception that on a cache miss the data read from the external memory interface is not stored in the cache. A subsequent read of the same address will also cause a cache miss and the data will again be fetched from external memory. Cache freeze mode is useful to ensure that critical program data is not overwritten in the cache, but can cause less than optimal code performance.

When the PCC field of the CSR contains the value 101b, the program cache is bypassed. When the cache is bypassed, any program read will fetch data from external memory. The data is not stored in the cache memory. Like cache freeze, in cache bypass the cache retains it's state. This mode is useful to ensure that external program data is being fetched. Performance will be sub-optimal as all program fetches will occur from external memory, regardless of whether they cause a cache hit.

The external memory interface (EMIF) makes it possible to interface the DSP to multiple types of external memory: synchronous devices—this interface is programmable to adapt to a variety of setup, hold, and strobe widths; synchronous burst SRAM (SBSRAM)—SBSRAM supports zero-wait state external access once bursts have begun; synchronous DRAM (SDRAM); and 8-bit and 16-bit wide memory read capability to support low-cost boot ROM memories (FLASH, EEPROM, EPROM, and PROM).

Additional features of the EMIF include: bus request feature for shared control of external memory; and an externally controlled I/O timing for I/O devices and external memory controllers.

In all of these types of access, the EMIF supports 8-bit, 16-bit, and 32-bit addressability for writes. All reads are performed as 32-bit transfers.

The EMIF can receive three types of requests for access. The three types are prioritized for in the order below.
1) CPU Data Accesses
2) CPU Program Fetches
3) DMA Data Accesses When available to service another access, the EMIF services the request type of highest priority. For example, DMA requests will not be serviced until the CPU ceases requesting external data and program fetches.

Figure 58:
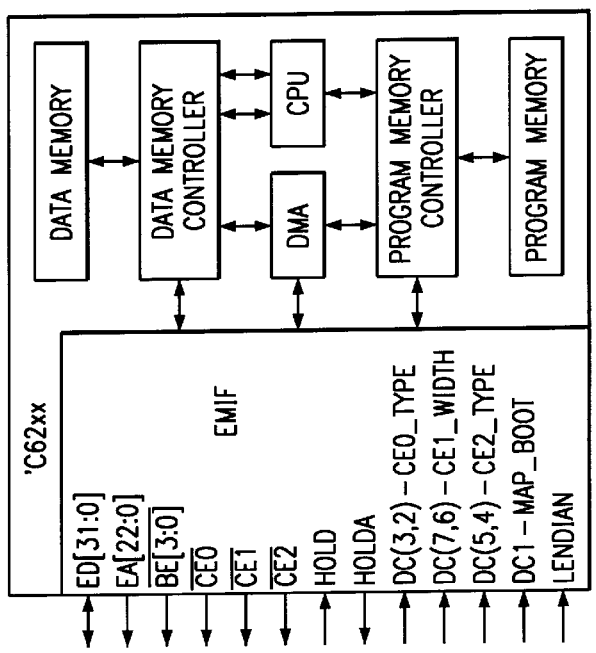
FIG. 58 depicts an external memory interface (EMIF) block diagram.

FIG. 58 shows a diagram of the external memory signals that are common to all interfaces. Table 37 describes each of the depicted signals. Table 36 shows the interfaces supported by each of the three external memory spaces (0–2). Spaces 0 and 2 are intended for a variety of interfaces. Space 1 is intended for asynchronous memories including low-cost ROM storage.

FIG. 58 depicts an external memory interface (EMIF) block diagram.

TABLE 36

Interfaces Supported by the External Spaces

| Space | Enable Signal | Data Bus Width Supported | | | Memory Types and Interface Features Supported | | | | | Size Configuration Signals | Type Configuration Signals |
|---|---|---|---|---|---|---|---|---|---|---|---|
| | | 32-bit | 16-bit | 8-bit | Async. | SBSRAM | SDRAM | I/O | Hold | | |
| 0 | CE0 | 4? | | | 4 | 4 | 4 | 4 | 4 | none | CE0_TYPE[1:0] |
| 1 | CE1 | 4 | 4 | 4 | 4 | | | | 4 | CE1_WIDTH[[1:0] | none |
| 2 | CE2 | 4 | | | 4 | 4 | 4 | 4 | 4 | none | CE2_TYPE[1:0] |

4 indicates supported.

TABLE 37

External Memory Interface Signal

| Signal Name | Bits | I/O/Z? | Description |
|---|---|---|---|
| ED[31:0] | 32 | I/O/Z | External data. Receives data from and transmits data to EMIF. |
| EA[22:0] | 23 | O/Z | External word address. Selects location for read or write |
| BE[3:0] | 4 | O/Z | External interface byte enables for write access. Read accesses are always 32-bit wide. Active-low. |
| CE0/1/2 | 1 | O/Z | External space 0/1/2 chip enable. Asserted when memory access address is in Space 0/1/2, respectively. Active-low. |
| HOLD | 1 | I | External hold bus request. Asserted by external device to allow control of the other devices connected to the EMIF. Requesting device must wait for an asserted HOLDA before it assumes control. Active-high. |
| HOLDA | 1 | 0 | External hold acknowledge. Signals external device asserting HOLD that EMIF signals are no longer driven by DSP. Active-high |
| CE0_TYPE CE2_TYPE | 2 | I | External memory space 0/2 type configuration. Selects type of memory used by accesses to addresses in Space 0/2.<br>00 - Asynchronous memory.<br>01 - SBSRAM.<br>10 - Reserved.<br>11 - SDRAM. |
| CE1_WIDTH | 2 | I | External space 1 width configuration. Selects width of devices in Space 1. Read accesses to this space are assembled from multiple accesses if dictated by the width. External Space 1 is always configured to access asynchronous memory (including ROM).<br>00 - 8-bit wide. Valid data only on ED[7:0]<br>01 - 16 bit wide. Valid data only on ED[15:0]<br>10 - 32-bit wide. Valid data only on ED[31:0]<br>11 - reserved. |
| MAP_BOOT | 1 | I | Memory map configuration and boot DMA source address. Note address 0 is the starting point of program execution at reset.<br>MAP=0 configures external memory at address 0 and boot DMA source address at 100000h.<br>MAP=1 configures internal program memory at address 0 and boot DMA source address at 1400000h. |
| LENDIAN | 1 | I | Endianness bit for external memory interface and internal data memory. LENDIAN=1 selects little-endian. LENDIAN=0 selects big-endian. |

I = input
O = output
Z = high-impedence state

The DSP is a bi-endian machine. The LENDIAN input pin selects little-endian if high and big endian if low. LENDIAN effects both the endianness of the internal data memory and external interface. Internal program memory accesses are always greater than 32-bits in width, so the endianness has no effect. Also, all external read accesses are 32-bit accesses, so the endianness does not affect read accesses. Instead, the CPU or DMA simply selects the portion of the 32-bits it needs depending on the address, access type, and the endianness. In contrast, for writes, the endianness does effect which BE signals are active-low and what values in which bit positions of external data (ED). FIG. 59 and FIG. 60 show the effect of address and endianness on BE and external data (ED).

Table 38 lists the external memory interface (EMIF) control registers. These registers are 32-bits wide and are expected to be accessed by 32-bit accesses from the CPU.

TABLE 38

EMIF Control Registers
Control Registers (32-bit wide, 4 8-bit addresses)

EMIF Global Control Register
EMIF Space CE1 Control Register
EMIF Space CE0 Control Register TABLE 38-continued EMIF Control Registers
Control Registers (32-bit wide, 4 8-bit addresses)

Figure 61:
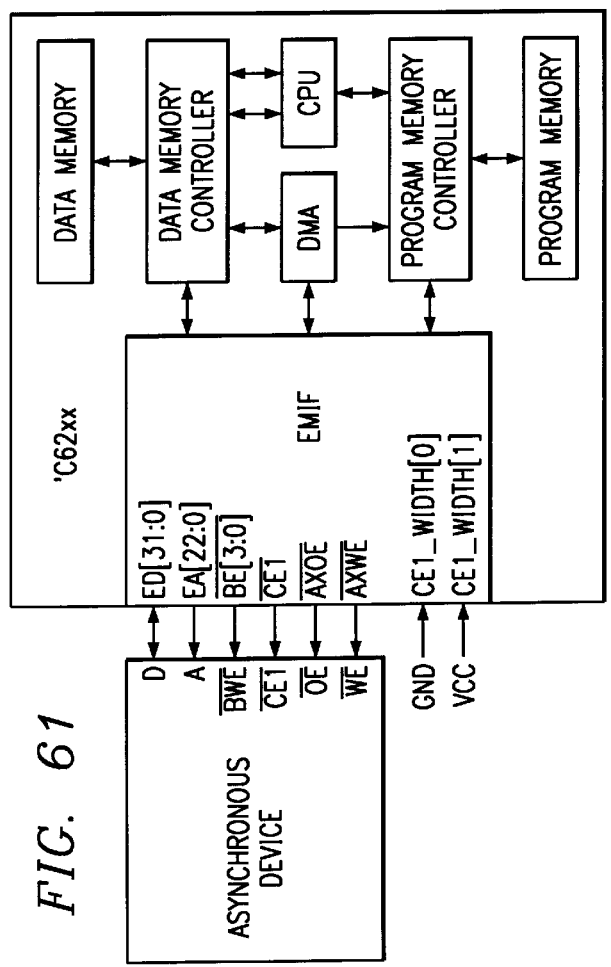
FIG. 61 shows the EMIF attached to an asynchronous device.

EMIF Space CE2 Control Register
EMIF SDRAM Control Register
EMIF SDRAM Refresh Period Register FIG. 61 shows the EMIF attached to an asynchronous device such as a SRAM (asynchronous) or a flash EEPROM. Table 39 describes EMIF signals specific to the asynchronous interface. Other ROM interfaces work similarly except that there is no connection for the AXWE signal. The interface is shown as connected to space CE1 which only operates with asynchronous memory types. If either space 0 or 2 were used, the CE0_TYPE and CE2_TYPE signals would be set to 00b indicating asynchronous memory. CE1_WIDTH=10b at reset, indicating a 32-bit wide device.

TABLE 39

Asynchronous Interface Signal Description

| Signal Name | Bits | O/Z | Description |
| --- | --- | --- | --- |
| AXWE | 1 | O/Z | Asynchronous device write enable. Active-low. |
| AXOE | 1 | O/Z | Asynchronous device output enable. Active-low. |

O = output
Z = high-impedence state

Figure 62:
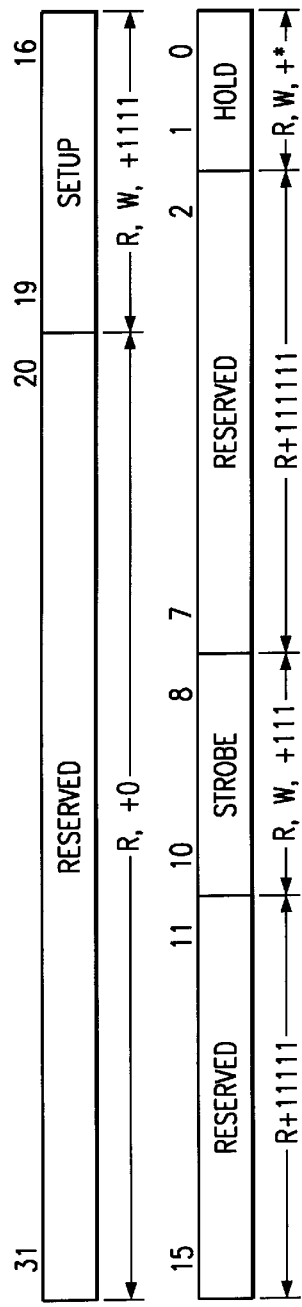
FIG. 62 shows the signal setup, hold and strobe width times.

Each memory space register sets configuration parameters specific to each of the external memory spaces. Specifically the bitfields in this register as shown in Table 40 and FIG. 62 set the signal setup, hold, and strobe width times for each of the various external rages.

The reset value for space 0 and 2 control registers is 00 for no hold time. Asynchronous SRAMS do not generally have any setup time. The reset value is 11 for space 1 Control register to provide maximum hold times for ROM memories. space 1 is used by the DMA to automatically load bootload code from.

TABLE 40

Space Register Bitfield

| Bitfield | Description |
| --- | --- |
| SETUP | SETUP+1 is the framing signal setup time in CLKOUT1 clocks before the falling edge of the active strobe |

TABLE 40-continued

Space Register Bitfield

| Bitfield | Description |
| --- | --- |
| STROBE | STROBE+1 is the active strobe width in CLKOUT1 clocks. Also, applies to the width of valid address on consecutive reads. |
| HOLD | HOLD+1 is the framing signal hold time in CLKOUT1 clocks after the rising edge of the active strobe. |

The setup and hold times apply to framing signals which are:

Valid ED for a write.

High impedance ED for a read.

EA

CE0/1/2

BE[3:0]

The inactive strobe. The inactive strobe is AXWE for a read and AXOE for a write.

The strobe time applies to the active strobe and the address width on consecutive read cycles. The active strobe is AXOE for a read and AXWE for a write.

Figure 63:
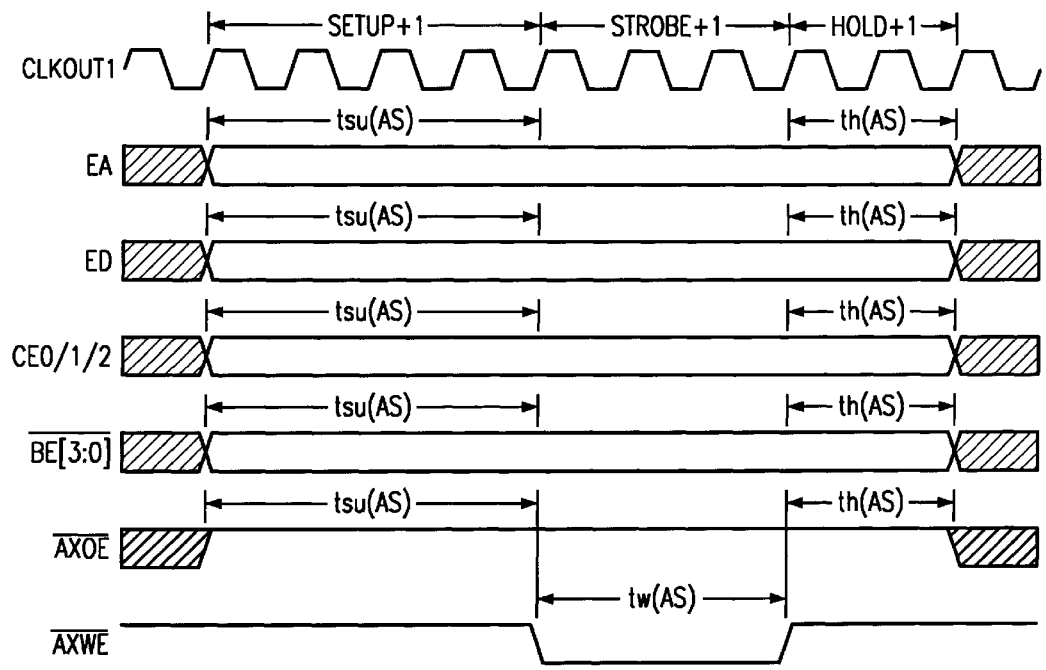
FIG. 63 shows the bus timing of an asynchronous writes.

FIG. 63 shows the bus timing of an asynchronous writes. Table 41 describes the depicted parameters. The SETUP, STROBE, and HOLD fields are assumed to be 0011b, 010b, and 01b, respectively. These values lead to setup, strobe, and hold widths of 4, 3, and 2 CLKOUT1 cycles, respectively. FIG. 63 is shown for a single write. Multiple writes would appear as repeated versions of the diagram with a hold time followed by a setup time between consecutive strobe periods.

TABLE 41

Asynchronous Interface Signal Parameters

| Parameter | Value? | Description |
| --- | --- | --- |
| tsu(AS) | c x (SETUP+1) | Setup time for framing signals before the falling edge of the active strobe. |
| th(AS) | c x (HOLD+1) | Hold time for framing signals after the rising edge of the active strobe. |
| tw(AS) | c x (STROBE+1) | Width of the active strobe. Also width XADDR on consecutive read accesses. |
| tsuz(AS) | c x (SETUP+1) | ED out high impedance before the falling edge of AXOE for a read. |
| tdz(AS) | c x (HOLD+1) | ED in high impedance after the rising edge of AXOE on a read. | c = the clock cycle time. The times given are rough in terms of clock cycles.

Figure 64:
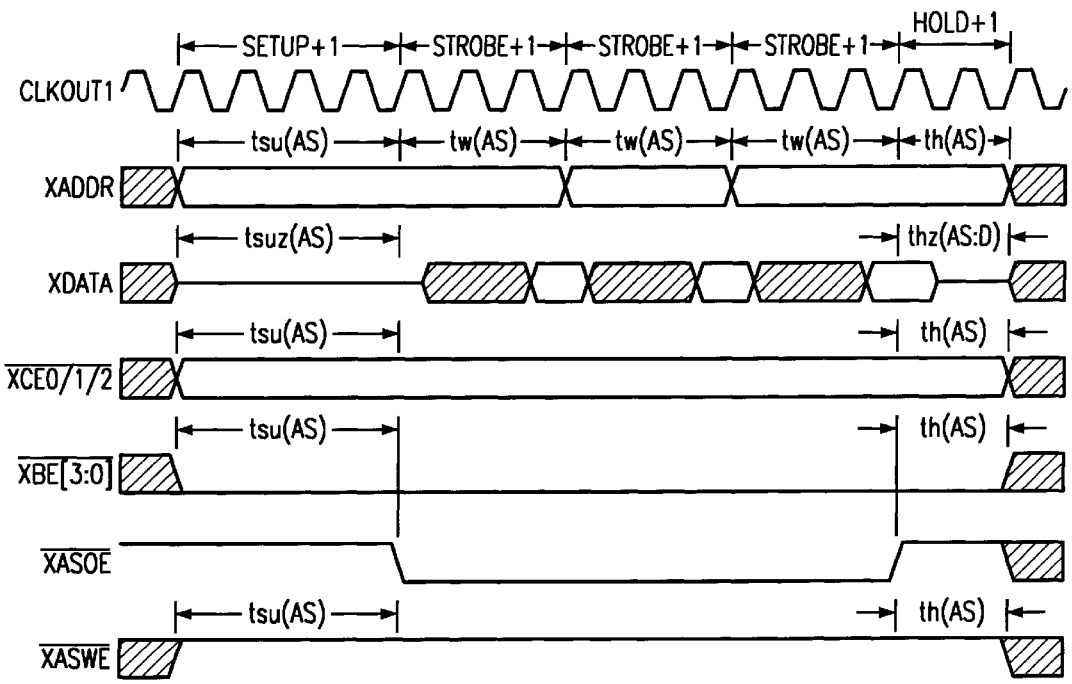
FIG. 64 shows three consecutive reads.

FIG. 64 shows three consecutive reads. Table 41 describes the depicted parameters. Again, the SETUP, STROBE, and HOLD fields are assumed to be 0011b, 010b, and 01b, respectively. In contrast to writes, consecutive asynchronous reads to the same space do not lead to periods of inactive strobe. These values lead to setup, strobe, and hold widths of 4, 3, and 2 CLKOUT1 cycles, respectively. This timing allows faster consecutive read access. However, if accesses transition across space boundaries, an intervening hold and setup time occurs between the consecutive reads, just as in consecutive write cycle.

When using space 1, the width of the external interface is configurable for read access. This feature allows use of inexpensive 8-bit wide memories for permanent storage of static values such as code to be boot loaded to on-chip program memory. Write-accesses are unaffected by this feature and the top 24-bits will not get written to 8-bit wide memories. Nor will any left shifting of EA occur.

Figures 65, 66, 67:
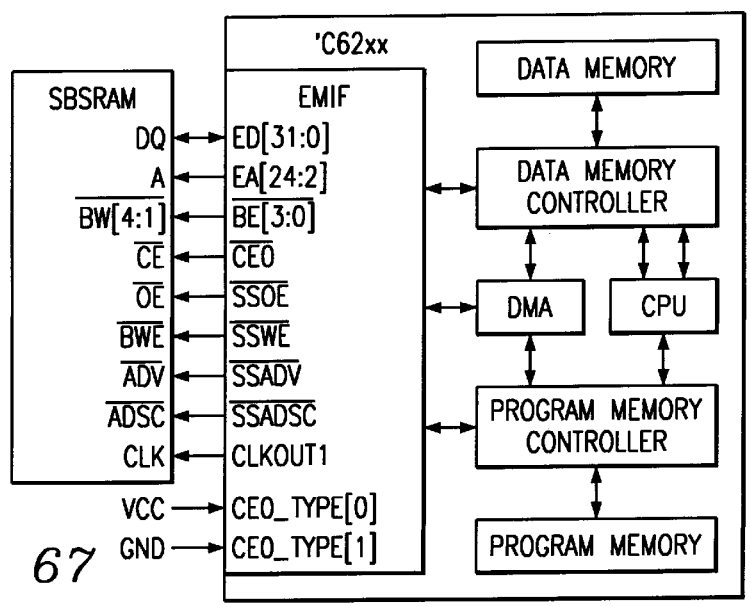
FIG. 65 shows read access for 8-bit wide memory.
FIG. 66 shows read access to 16-bit wide memory.
FIG. 67 shows the EMIF connected to SBSRAM.

FIG. 65 shows read access for 8-bit wide memory. Normally, EA[22:0] contains the 32-bit address. For 8-bit wide memory the logical address is left-shifted by 2 and driven on the EA. Four consecutive read accesses are completed with EA[1:0] incrementing from 00b to 01b to 10b to 11b. The data is then assembled to form a 32-bit value before being presented to the CPU or DMA for further use.

When using space 1, the width of the external interface is configurable for read access. This feature allows use of inexpensive 16-bit wide memories for permanent storage of static values such as code to be boot loaded to on-chip program memory. Write-accesses are unaffected by this feature and the top 16-bits will not get written to 16-bit wide memories. Neither will any left shifting of EA occur.

FIG. 66 shows read access to 16-bit wide memory. The logical address is left-shifted by 1 and driven on EA. Two consecutive accesses are completed with EA[0] incrementing from 0 to 1. The data is assembled to form a 32-bit word before being presented to the CPU or DMA for further use.

FIG. 67 shows the EMIF connected to SBSRAM. Table 42 describes the EMIF signals specific to the SBSRAM interface. The SBSRAM is shown interfaced to space 0. Thus, TYPE0=10b at reset. The SBSRAM interface is designed to work with SBSRAMs produced by Micron (MT58LC32K32) and NEC (µPD431232L). Other manufacturer's devices may work with this interface as well. Data sheets from these manufactures will provide additional timing information.

After an initial startup time, accesses to SBSRAM will be single-cycle, zero wait state. For the first access, for encountering an address discontinuity, or for switching between memory read and write cycles the initial startup penalty will produce wait-states for the CPU in the case of a CPU access.

TABLE 42

SBSRAM Interface Signal

| Signal Name | Bits | O/Z[?] | Description |
|---|---|---|---|
| CLKOUT1 | 1 | O | Clock output at CPU clock frequency. Rising edge used to clock SBSRAM. |
| SSOE | 1 | O/Z | SBSRAM burst output enable. Enables SBSRAM read cycles. Active-low. |
| SSWE | 1 | O/Z | SBSRAM burst write enable. Enables SBSRAM write cycles. Active-low. |
| SSADV | 1 | O/Z | SBSRAM address burst advance. Signals SBSRAM to increment internal address. Active-low. |

TABLE 42-continued

SBSRAM Interface Signal

| Signal Name | Bits | O/Z[?] | Description |
|---|---|---|---|
| SSADS | 1 | O/Z | SBSRAM address strobe. Signals SBSRAM to latch a new address. Active-low. |

[?]O = output
Z = high-impedance state

Figure 68:
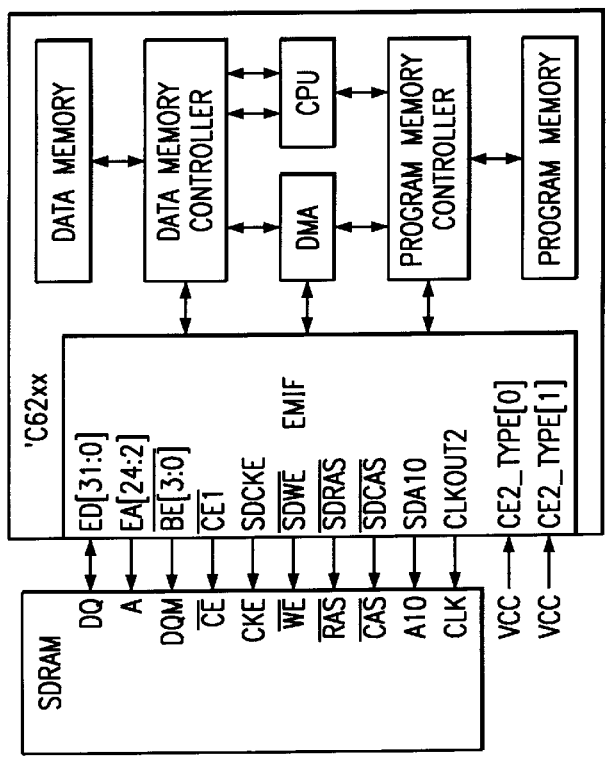
FIG. 68 shows the EMIF connected to SDRAM.

FIG. 68 shows the EMIF connected to SDRAM. Table 43 describes the EMIF signals specific to the SDRAM interface. The SDRAM is shown as being interfaced to space 2. Thus, TYPE2=11b. This interface is designed to work with TI SDRAMs including the TMS626xxx, TMSC627xxx, and TMS664xxx (Data Sheet Numbers SMOS182C, SMOS688, and SMOS685). This interface may be enhanced to incorporate the burst and other features of the SDRAM. In its current form, the SDRAM interface has a 16-cycle CPU stall for each CPU access.

TABLE 43

SDRAM Interface Signal

| Signal Name | Bits | O/Z[?] | Description |
|---|---|---|---|
| SDCAS | 1 | O/Z | SDRAM column address strobe. Active-low. |
| SDRAS | 1 | O/Z | SDRAM row address strobe. Active-low. |
| SDWE | 1 | O/Z | SDRAM write enable. Active-low. |
| SDCKE | 1 | O/Z | SDRAM clock enable. Active-low. |
| SDA10 | 1 | O/Z | SDRAM address 10. This signal is distinct from EA10 because it is needed during refresh when EA10 may be involved in an access to another type of memory. |
| CLKOUT2 | 1 | O | Clock output at ½ CPU clock frequency. Rising edge used by SDRAM to latch inputs. |

[?]O = output
Z = high-impedance state

Figure 69:
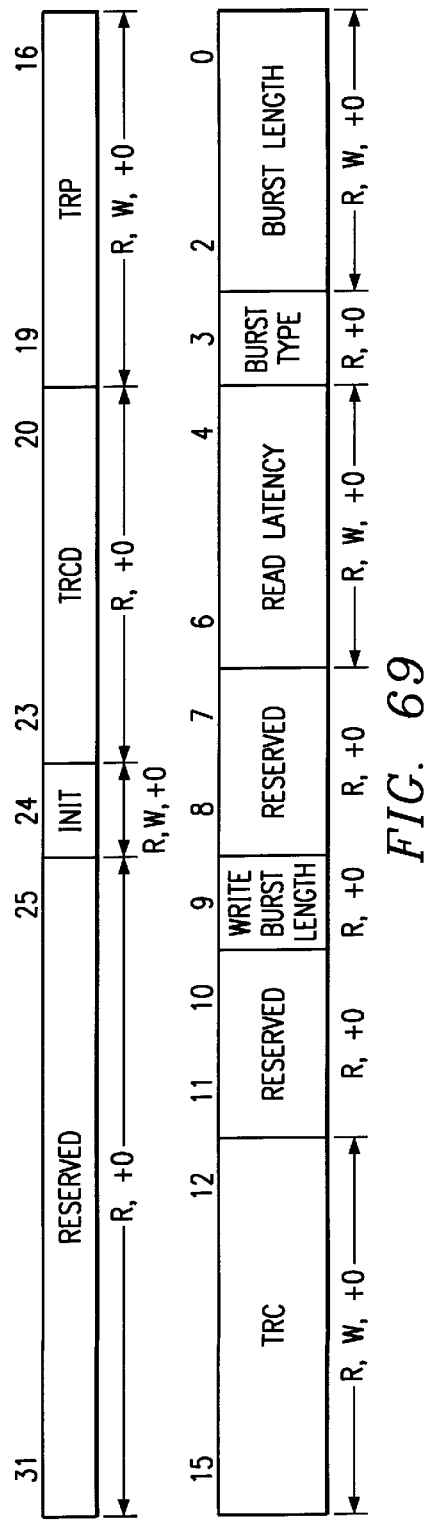
FIG. 69 shows the fields in the SDRAM Control Register.

Two EMIF control registers affect SDRAM interfacing:
The EMIF SDRAM Control Register
The EMIF SDRAM Refresh Period Register FIG. 69 shows and Table 44 describes the fields in the SDRAM Control Register. Bits 11:0 correspond to the equivalent bits in the mode register internal to the SDRAM device. Bits 19:12 set timing parameters that relate CLKOUT2 the speed of the SDRAM. Note the reserved named fields and values will provide additional functionality in future revisions of this interface.

TABLE 44

EMIF Register Bitfield Definitions

| Bitfield | Description | Value | Effect |
|---|---|---|---|
| BURST LENGTH | Sets the SDRAM Burst Length | 000 | Burst length of 1 |
|  |  | Other | Reserved |
| BURST TYPE | Reserved |  |  |
| READ LATENCY | Sets the SDRAM Read Latency | 001 | Read Latency of 1 |
|  |  | 010 | Read Latency of 2 |
|  |  | 011 | Read Latency of 3 |
|  |  | other | Reserved |
| WRITE BURST LENGTH | Reserved |  |  |
| TRC | Value of $t_{RC}$ SDRAM parameter in terms of CLKOUT2 cycles. |  |  |
| TRP | Value of $t_{RP}$ SDRAM parameter in terms of CLKOUT2 cycles. |  |  |
| TRCD | Value of $t_{RCD}$ SDRAM parameter in terms of CLKOUT2 cycles. |  |  |
| INIT | Initialize SDRAM. Writes bits 10:0 of SDRAM Control Register to SDRAM's internal mode register. Always read as 0. |  |  |

Figure 70:
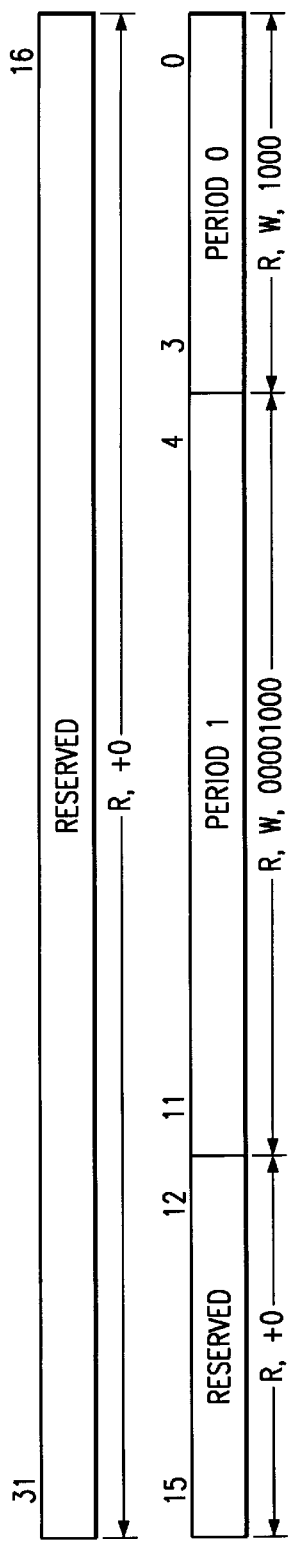
FIG. 70 shows fields in the EMIF SDRAM refresh period register.

The fields in the EMIF SDRAM refresh period register, shown in FIG. 70, drive a two-stage 12-bit refresh counter. Upon writing to the SDRAM Period Register, the SDRAM Refresh Counter gets loaded with the values written to PERIOD 1 and 0. The counter begins decrementing at a rate of CLKOUT2. When the 4-LSBs of the counter reach zero the counter decrements the value in the 8 MSBs. The low counter is simultaneously reloaded with PERIOD 0. Once the 8-MSBs of the refresh counter reach 0, they are reloaded with PERIOD 1. If the SDRAM interface has been initialized, when the counter gets reloaded indicates when the refresh cycles should occur. Whether or not initialization has occurred, the reloading of the MSBs generates the XSDINT signal to the CPU (which is mapped to INT10). Thus, this counter is reusable as a general purpose timer with period of (PERIOD1+1)×(PERIOD0+1) CLKOUT2 cycles.

Figure 71:
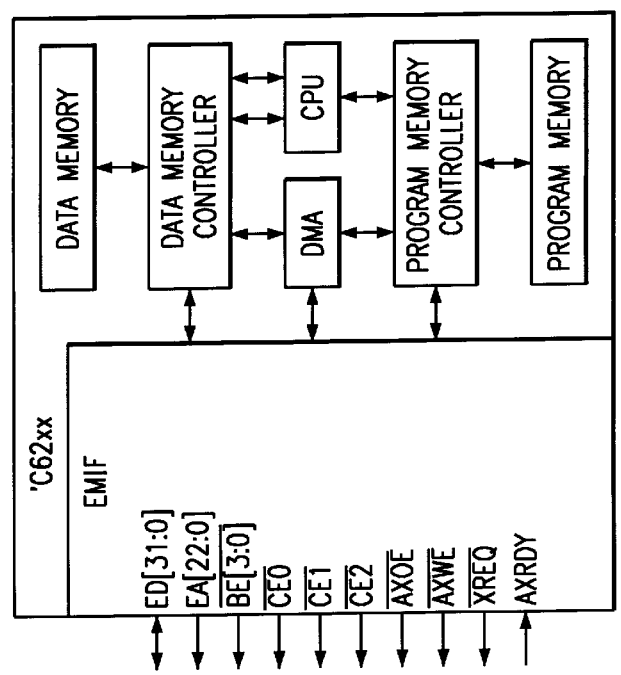
FIG. 71 shows a block diagram of the external control interface.

FIG. 71 shows a block diagram of the external control interface. Table 45 describes the signals specific to that interface. Check your data sheet for the external control read and write timing diagrams.

TABLE 45

External Control Interface Signal Description

| Signal Name | Bits | O/Z? | Description |
|---|---|---|---|
| XREQ | 1 | O/Z | External request for access. Signals external logic of access request from DSP. Active-low. |
| AXRDY | 1 | I | External request ready input. Signal from external logic that external request is complete. Active-high. |

?O = output
Z = high-impedance state

External Memory Interface (EMIF) Global Control Register

FIG. 72 shows and Table 46 describes the usage of fields in the EMIF control register. This external I/O interface is used for spaces 0 and 2, when the XCE0 an XCE2 fields in the EMIF Global Control Register are set, respectively.

TABLE 46

EMIF Global Control Register Bitfield Definitions

| Bitfield | Description |
|---|---|
| RESET | Initialize EMIF. Returns EMIF to its reset state when written with a 1. A write of 0 has no effect. Always read as 0. |
| XCE0 XCE2 | Use XCE0 Interface timing. When set these bits force external Space 0 and 2 respectively to use the XCE2 timing rather than the memory type for which they were initially configured. |
| SDRAM INIT | Indicates that the SDRAM interface is initializing. |
| DMA/DATA/PROG ACK | Indicates that the DMA, CPU Data Memory Controller, or CPU Program Memory Controller is the access being serviced by the EMIF. |
| DMA/DATA/PROG SEL | Indicates that the DMA, CPU Data Memory Controller, or the CPU Program Memory Controller is selected as the highest priority pending access. |
| HOLDA | Inverted value of HOLDA output. Active-high. |
| HOLD | Inverted value of HOLD input. Active-high. |
| AXRDY | Value of AXRDY input. Active-high. |

Hold Operation

The HOLD and HOLDA signals provide a handshake for an external device to drive values on the EMIF signals. After the external device asserts HOLD active-high it must wait for the DSP to assert the HOLDA signal active high. This signal indicates that all the EMIF signals with the exception of CLKOUT1 and CLKOUT2 have been tri-stated. The EMIF must provide the remaining signals on the EMIF (or these signals must be pulled-up) to prevent floating control inputs to other devices interfaced to the bus. Once the external devices relinquishes its request be de-asserting HOLD inactive-low, it must wait for the DSP to de-assert HOLDA inactive-low before.

The host port is a 16-bit wide access port through which a host (external) processor can read from, and write to, the internal data memory. The host port operates as an asynchronous interface and uses handshaking signals to synchronize data transfers.

FIG. 73 shows the interface of the Host Port to a host and to the internal data memory. Table 47 describes the external signals for the host port.

TABLE 47

Host Port External Signal Description

| Name | Size in Bits | I/O/Z? | Description |
|---|---|---|---|
| HREQ | 1 | I | Host internal data memory request. Host asserts active high to gain control of the internal data memory. Active-high. |
| HACK | 1 | O | Host internal data memory request acknowledge. Host Port asserts active-high to indicate GPU is halted and that host has control of internal memory. Active-high. |
| HDATA [15:0] | 16 | I/O/Z | Host data. |
| HADDR [16:1] | 16 | I | Host address (or device configuration during RESET low.) |
| HWRITE | 1 | I | Host write strobe. Active-low. |
| HREAD | 1 | I | Host read strobe. Active-low. |

?I = input
O = output
Z = high-impedence state

Host Access to Internal Data Memory

A host processor's access to the internal data memory through the Host Port consists of two operations.

1) The host must gain control over the Host Port by performing the request/acknowledge handshake through the HREQ/HACK signals.
2) Once access has been granted, the host may perform read and write operations to the internal data memory.

The mapping of host port address to the internal memory address is described earlier herein.

Host Request/Acknowledge Handshake

FIG. 74 shows the handshake operation for a host to gain access to the host port. Table 48 shows the related timing parameters

TABLE 48

Host Request/Acknowledge Signal Parameters

| Parameter | Type | Min | Max | Description |
|---|---|---|---|---|
| $t_d$(HREQH-HACKH) | DSP Value | 7 c | | Delay from HREQ high to HACK high. |
| $t_d$(HREQL-HACKL) | DSP Value | 7 c | 8 c | Delay from HREQ low to HACK low. |
| $t_{access}$ | | | | Allowable period for host data access. |

Note: c = 1 CLKOUT1 period. 'C6xx value refers to values produced by the DSP. Values given are approximate figures when measurable in terms of clock cycles.

Cycles 3 to 10—Host Asserting Request: The host requests access by asserting the HREQ (host request) input. The request will be recognized by the host port controller on cycle 4 or 5.

Host Receive Acknowledge: Assuming that the neither the DMA nor the CPU is performing any accesses to internal data memory, the host port controller will signal that the host has access to the host port by asserting the HACK signal 7 cycles later ($t_d$(REQH-HACKH)). If either the CPU or DMA is accessing the internal memory, then the HACK will be delayed until all pending accesses are complete and no new accesses are arriving. Because of the pipelined interface to internal memory, this means that neither the DMA or CPU may perform any accesses for three consecutive CPU cycles.

Cycles 11 to i+2—Host Access: From the time it receives acknowledge to the time it relinquishes its request, the host may perform read and write cycles to the internal data RAM ($t_{access}$). There is no upper limit on this period of time. Also, during this time the operation of the CPU is frozen. The DMA will also be frozen if it begins trying to access internal data memory.

Cycles i+3 to i+9—Host Relinquishes Request: During cycle i+2 the host relinquishes its request by deasserting HREQ. The host port controller recognizes the event on cycle i+3 or i+4.

Host Received Deasserted Acknowledge: Seven cycles later ($t_d$(HREQL-HACKL)), the acknowledge is deasserted by the host port controller.

Because of the delays from changes in HREQ to changes in HACK, the minimum period between consecutive requests (asserted HREQ) is 7 cycles.

Host Data Access

Figure 75:
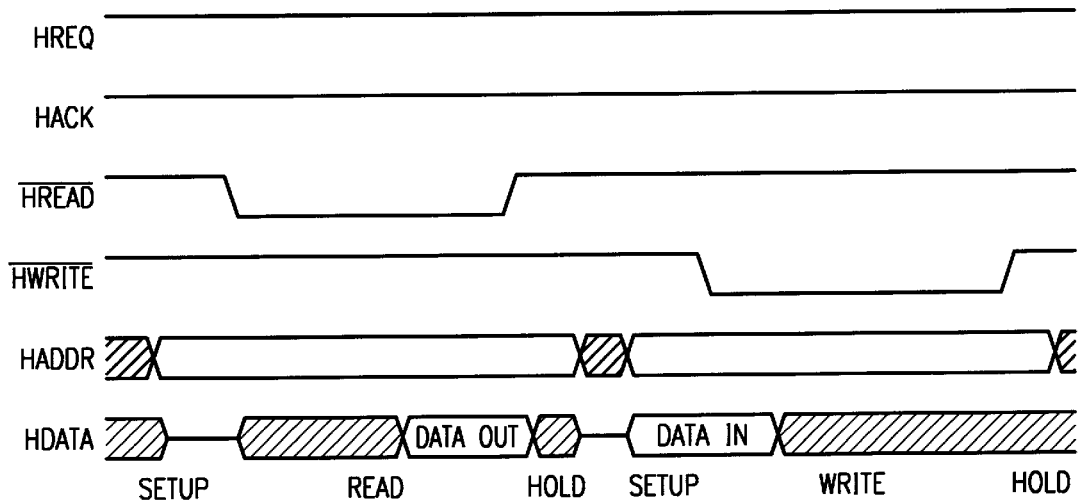
FIG. 75 shows the host port signal diagram for read and write operation.

FIG. 75 shows the host port signal diagram for read and write operation. The figure depicts a host port read followed by a host port write. The following constraints exists for both read and write operation:

The HREAD and HWRITE strobes must be active-low for a minimum of 8 clock cycles.

There must be at least 4 clock cycles between HREAD or HWRITE strobe rising to the subsequent HREAD or HWRITE falling.

HADDR must frame the HREAD and HWRITE strobes by 2 clock cycles for read and write access respectively.

There must be at least 12 clock cycles between the start of two consecutive HWRITE or HWRITE strobes falling. Thus, the maximum rate of accesses is one every 12 clock cycles.

The Host Port returns the bus to a high impedance no more than two cycles after the rising edge of HREAD. The host must setup the value to be written on HDATA 2 cycles prior to HWRITE falling.

The host begins a write by asserting HWRITE active-low.

The host must hold the value on HDATA until HWRITE rises.

Reset Considerations

Once a reset occurs the host port controller is reset. Thus, after reset the request/acknowledge handshake must re-occur before any transfers can begin.

DMA Overview

Figure 76:
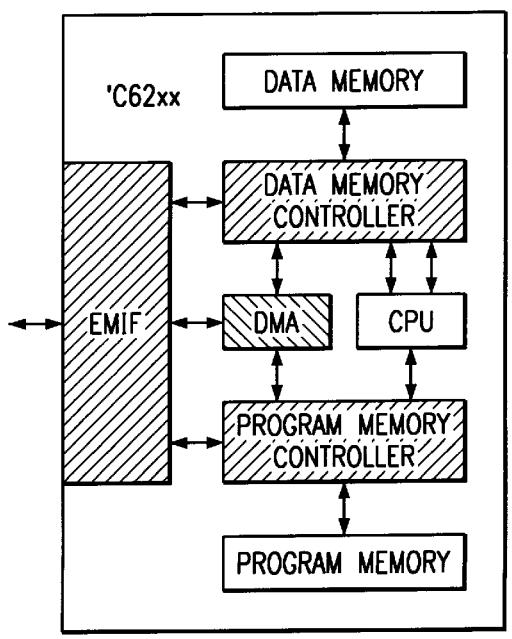
FIG. 76 shows a DMA operation consisting of a 32-bit word transfer to or from any of the three DSP modules.

The two channels of the on-chip Direct Memory Access (DMA) controller can read from or write to any location in the memory map without interfering with the operation of the CPU. This allows interfacing to slow external memories and peripherals without reducing the throughput to the CPU. The DMA controller contains its own address generators, source and destination registers, and transfer counter. The DMA has its own bus for addresses and data. This keeps the data transfers between memory and peripherals from conflicting with the CPU. A DMA operation consists of a 32-bit word transfer to or from any of the three DSP modules (see FIG. 76):

Internal Data Memory.

Internal Program Memory that is not configured as cache as a destination of a transfer (only writes to program memory are supported).

EMIF.

This revision of the DMA Controller can access all internal program memory, all internal data memory, and all devices mapped to the EMIF. An exception is the DMA cannot use the program memory as the source of a transfer. Also, it cannot access memories configured as cache or memory-mapped on-chip peripheral registers.

The DMA controller has the following features:

Two independent channels.

Source and destination addresses may be within the same or different modules. These addresses are independently programmable, and may either remain constant, increment, or decrement on each transfer.

The transfer count is programmable. Once the transfer count has completed, the DMA may be enabled to send an interrupt to the CPU.

Operation of the DMA

The DMA has lowest priority to all modules it accesses. To internal data memory and internal program memory it must wait until no transfers are being initiated to the memory it intends to access. DMA accesses to internal memory perform cycle stealing. Thus, no subsequent CPU accesses of internal memory are hampered by a DMA access. However, if the CPU accesses the EMIF while a multi-cycle DMA access is in progress, it will wait until that access completes.

The DMA Control Registers should be properly programmed to control the operation of the DMA. Each DMA channel has a independent set of registers as shown in Table 49.

These registers are 2-bits wide and are expected to be accessed via 32-bit accesses from the CPU. If using C, this implies that pointers to these registers must be cast to type int. For software compatibility with future revisions of this DMA you must write reset values when writing to the reserved fields.

TABLE 49

DMA Memory Mapped Control Registers
Control Registers (word wide, 4 byte addresses)

Figure 77:
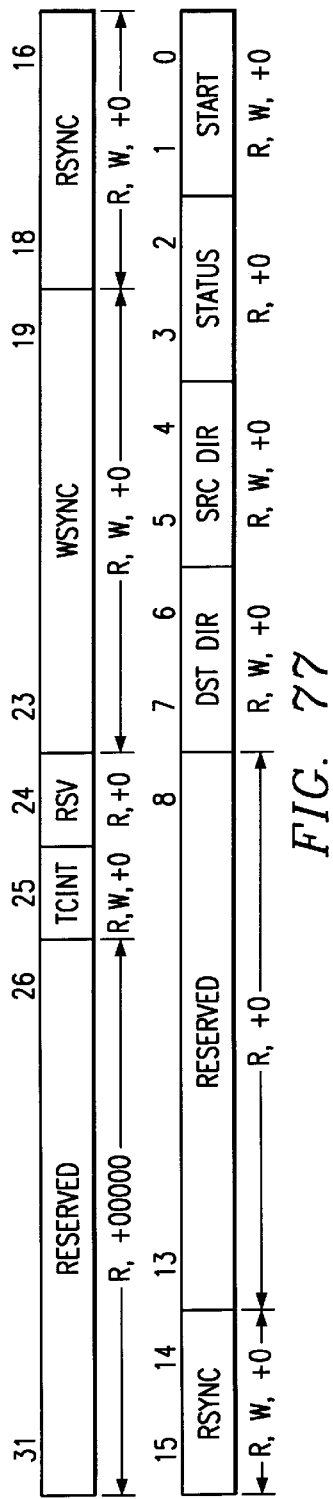
FIG. 77 shows the bitfields in that register.

DMA Channel 0 Control
DMA Channel 0 Source Address
DMA Channel 0 Destination Address
DMA Channel 0 Transfer Counter
DMA Channel 1 Control
DMA Channel 1 Source Address
DMA Channel 1 Destination Address
DMA Channel 1 Transfer Counter Stopping, Programming, and Starting the DMA The DMA Channel Control Register configures the DMA operation for the associated channel. FIG. 77 shows and Table 50 describes the bitfields in that register. To configure the DMA, the DMA channel must be stopped. One can force this condition by setting START=00b. Alternatively, this condition may be ascertained by waiting for STAT=00b. Once stopped, one programs the DMA Channel Source Address, Destination Address, and Transfer Counter to their desired values. Then, one writes the DMA Channel Control Register with the appropriate values including START=11b to start operation.

Transferring Data With the DMA Channels

The DMA only performs word transfers. Any non-zero bits written to the two LSBs of the DMA Source and Destination Registers are automatically set to 0. Also, as only 32-bit transfers are enabled, the DMA is unaffected by the endianness as set by the LENDIAN input signal.

Figure 78:
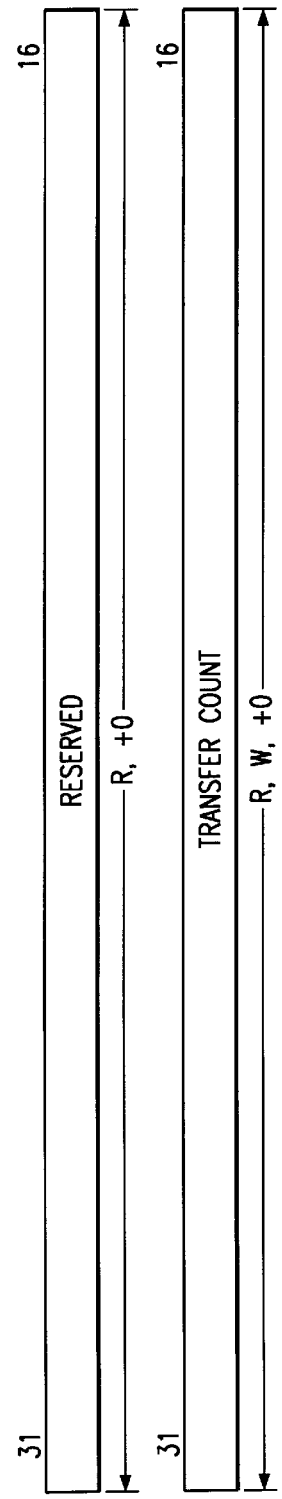
FIG. 78 depicts in sets the number of data transfers for the DMA channel to complete.

The DMA Channel Transfer Counter depicted in FIG. 78 sets the number of data transfers for the DMA channel to complete. Upon the completion of the write portion of each transfer the counter is automatically decremented.

TABLE 50

DMA Control Register Bitfield Definitions

| Bitfield | Description |
|---|---|
| START | Controls DMA Operation:<br>START = 00b, Stop, Abort. Stops DMA after any read or write operation in progress. All DMA Channel control registers associated with that channel are reloaded with their reset values after a write of 00b occurs. However, registers may be re-written afterwards.<br>START = 01b, reserved<br>START = 10b, Pause. Stops after DMA after both read and write of any operation in progress complete. DMA may be restarted after paused.<br>START = 11b, Start. Allows DMA operation to begin or restart after pause. Although set to 0 at reset, after bootload operation field will contain 11. |
| STATUS | Status of DMA Operation:<br>STAT = 00b, DMA Channel stopped.<br>STAT = 01b, reserved.<br>STAT = 10b, reserved.<br>STAT = 11b, DMA Channel started. |
| SRC DIR DST DIR | Source/Destination Address Direction. DMA Source/Destination Address is incremented or decremented as indicated after the read/write portion of the transfer completes<br>SRC/DST DIR = 00b, do NOT increment or decrement.<br>SRC/DST DIR = 01b, increment.<br>SRC/DST DIR = 10b, decrement.<br>SRC/DST DIR = 11b, reserved. |
| RSYNC<br>WSYNC | Synchronization of Read or Write Transfer. The read/write portion of the each transfer for the DMA Channel does not begin until the appropriate synchronization signal is received. Synchronization occurs on the rising edge of the synchronization signal.<br>R/WSYNC = 00000b, no synchronization, complete read/write as soon as possible.<br>R/WSYNC = 00100b, synchronize on INT4 input pin.<br>R/WSYNC = 00101b, synchronize on INT5 input pin.<br>R/WSYNC = 00110b, synchronize on INT6 input pin.<br>R/WSYNC = 00111b, synchronize on INT7 input pin.<br>R/WSYNC = other, reserved. |
| TCINT | Generates interrupt on DMA Interrupt when transfer count reaches 0. |

Setting the Source and Destination from Which the DMA Reads and Writes Data

Figure 79:
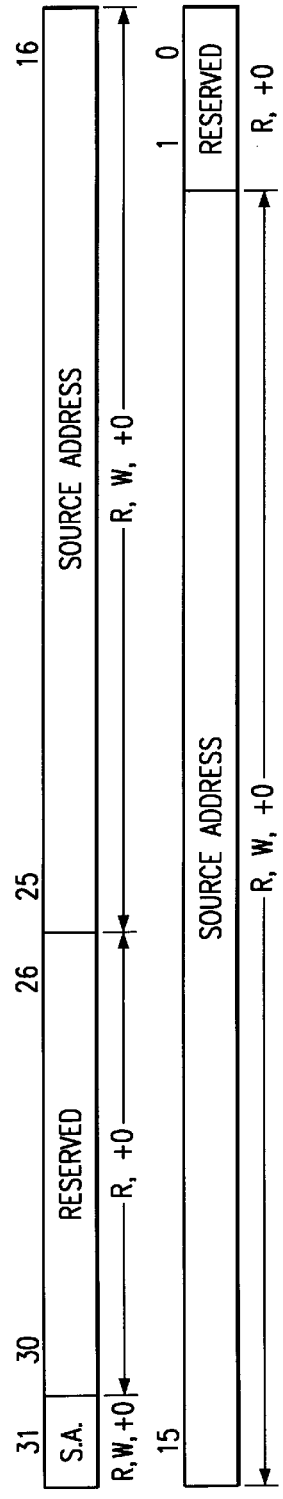
FIG. 79 shows the DMA Channel Source Address Register.
Figure 80:
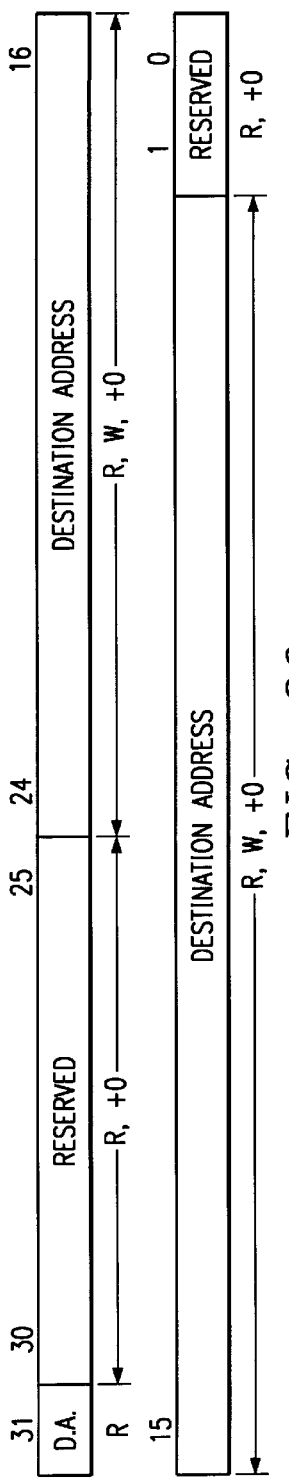
FIG. 80 shows the Destination Address Register.

The DMA Channel Source Address Register (FIG. 79) and Destination Address Register (FIG. 80) determine the source from which the DMA reads data and the destination to which the DMA writes data, respectively. One must program these registers to their desired values before starting the DMA. You may select whether these addresses increment, decrement, or be maintained by setting the SRC DIR and DST DIR fields in the DMA Channel Control Register.

Notice the following about the registers:

The bits 1:0 are 0, implying word-aligned data.

Bits 30:26 are 0, to cover a 26-bit EMIF byte address space as well as internal program memory.

Bit 31 can be set to 1 to select internal data memory or set to 0 to select external memory or on-chip program memory. Note that if bits 25:2 increment or decrement past a 26-bit boundary no carry will ripple to bit 31.

For software compatibility with future revisions of the DMA, you must only write 0 to reserved fields as well as assure the address does not increment or decrement past a 26-bit boundary.

DMA Interrupts

If the TCINT bit in the DMA Channel Control Register is enabled, an interrupt is generated to the CPU when the counter reaches zero after the write portion of the last transfer has completed. The DMA interrupts DMAINT0 and DMINT1 for channels 0 and 1 are mapped to CPU interrupts INT8 and INT9, respectively.

Bootload Operation

The DMA boot operation allows the internal program memory to be loaded with program stored in 8-, 16-, or 32-bit memory mapped in space 1. The CPU is internally held in reset while the transfer occurs. After the transfer completes, the CPU is released and begins running at address 0.

By setting the MAP_BOOT, BOOT_SRC, and BOOT_CNT input pins to the appropriate values at reset, you may enable the DMA to automatically bootload the internal program memory. The CE1_WIDTH pins select the width of the memory mapped at space 1. These pins are shared with the HA pins of the host port. You must be drive these pins to the appropriate values during reset.

Configuring the DMA to Bootload the Internal Memory

You may configure the DMA to bootload the internal program memory through DMA Channel 0 by:

Setting the input pin MAP_BOOT=1, mapping internal program memory to address 0. See the data sheet for your specific device for a full explanation of DSP memory maps.

Setting the input pin BOOT_SRC[2:0]=001b as shown in Table 51. Enables DMA bootload operation. If BOOT_SRC[2:0]=000b the DMA is disabled from bootloading, and the CPU begins running from address 0. All other values of BOOT_SRC[2:0] are invalid.

TABLE 51

BOOT_SRC and Enabling of Bootload

| BOOT_CNT | Words Transferred |
|---|---|
| 000b | No DMA Boot |
| 001b | DMA Boot from External Space 1 |
| other | Reserved |

Selecting the Number of Words to Bootload

The number of words to bootload is set by the boot transfer count (BOOT_CNT[2:0]) input pins. The number of words to bootload is:

2(BOOT_CNT+8) as shown in Table 52.

TABLE 52

BOOT_CNT and Word Transfer Count

| BOOT_CNT | Words Transferred |
|---|---|
| 000b | 256 |
| 001b | 512 |
| 010b | 1024 |
| 011b | 2048 |
| 100b | 4096 |
| 101b | 8192 |

TABLE 52-continued

BOOT_CNT and Word Transfer Count

| BOOT_CNT | Words Transferred |
|---|---|
| 110b | 16384 |
| 111b | 32768 |

Selecting the Asynchronous Memory Width

The source of boot memory is always configured to be in external CE1 space. CE1 space is expected to contain asynchronous memory of 8-, 16, or 32-bits in width. The width is selected via the CE1_WIDTH[1:0] input pins (Table 53).

TABLE 53

CE1_WIDTH and Boot Memory Width

| CE1_WIDTH[1:0] | Width of Memory in Space 1 |
|---|---|
| 00b | 8-bits |
| 01b | 16-bits |
| 10b | 32-bits |
| 11b | reserved |

Power-Down Control

Figure 81:
FIG. 81 depicts initiating the three power down modes and using the three lower bits of the PWRD field in the Control Status Register (CSR)

The DSP supports three power-down modes: Idle1; Idle2; and Idle3. To initiate the three power down modes, use the three lower bits of the PWRD field in the Control Status Register (CSR), as depicted in FIG. 81. Setting one of these bits initiates the power down mode that the bit corresponds to. If more than one of these PWRD bits are set, the power-down mode selected by the most significant bit is enabled.

When in a power-down mode, the DSP can be reactivated by a RESET, an enabled interrupt, or any interrupt. Bits three and four of the PWRD field in the Control Status Register set the wake up condition. If bits three and four are set, the device can be awakened from a power-down state by an enabled interrupt.

The power-down mode bit (zero, one, or two) and wake-up bit (three or four) must be set by the same MVC instruction to ensure proper power-own operation.

Power-Down Modes

For any of the three power-down modes, the contents of the CPU are maintained. This allows operation to continue when the power-down mode is terminated. If the power-down state is terminated by an enable interrupt, the DSP will enter the interrupt service routine on wake-up and then return to the instruction after the power-down instruction. If the power-down state is terminated by a disabled interrupt, the DSP will begin operation (upon wake-up) at the instruction after the power-down instruction.

Idle1 Mode

Writing a one to bit zero of the PWRD field in the CSR places the DSP in the Idle1 mode. In this mode, all CPU activity is halted. The system clock and peripherals continue to operate and the CLKOUT pin remains active. Thus, peripherals can take the CPU out of its power-down state by generating an interrupt.

Idle2 Mode

Writing a one to bit one of the PWRD field in the CSR places the DSP in the Idle2 mode. In Idle2 mode, the CPU and on-chip peripherals are halted. Because the on-chip peripherals are stopped, you cannot use the peripherals to generate the interrupt to wake up the DSP. Only an external interrupt or RESET can take the DSP out of Idle2 mode.

Idle3 Mode

Writing a one to bit two of the PWRD field in the CSR places the DSP in the Idle3 mode. In Idle3 mode, the CPU, on-chip peripherals, and PLL are inactive. Idle3 is used for complete shutdown of the DSP. To come out of the Idle3 mode, you must reset the device.

Table 54 lists some typical applications for the DSPs of the present invention. These DSPs offer adaptable approaches to traditional signal-processing problems. They also support complex applications that often require multiple operations to be performed simultaneously.

TABLE 54

Typical Applications for DSPs

| Automotive | Consumer | Control |
|---|---|---|
| Adaptive ride control | Digital radios/TVs | Disk drive control |
| Antiskid brakes | Educational toys | Engine control |
| Cellular telephones | Music synthesizers | Laser printer control |
| Digital radios | Pagers | Motor control |
| Engine control | Power tools | Robotics control |
| Global positioning | Radar detectors | Servo control |
| Navigation | Solid-state answering machines | |
| Vibration analysis | | |
| Voice commands | | |
| General Purpose | Graphics/Imaging | Industrial |
| Adaptive filtering | 3-D rotation | Numeric control |
| Convolution | Animation/digital maps | Power-line monitoring |
| Correlation | Homomorphic processing | Robotics |
| Digital filtering | Image compression/transmission | Security access |
| Fast Fourier transforms | Image enhancement | |
| Hilbert transforms | Pattern recognition | |
| Waveform generation | Robot vision | |
| Windowing | Workstations | |
| Instrumentation | Medical | Military |
| Digital filtering | Diagnostic equipment | Image processing |
| Function generation | Fetal monitoring | Missile guidance |
| Pattern matching | Hearing aids | Navigation |

TABLE 54-continued

Typical Applications for DSPs

| | | |
|---|---|---|
| Phase-locked loops | Patient monitoring | Radar processing |
| Seismic processing | Prosthetics | Radio frequency modems |
| Spectrum analysis | Ultrasound equipment | Secure communications |
| Transient analysis | | Sonar processing |

| Telecommunications | | Voice/Speech |
|---|---|---|
| 1200- to 56?600-bps modems | Faxing | Speaker verification |
| Adaptive equalizers | Future terminals | Speech enhancement |
| ADPCM transcoders | Line repeaters | Speech recognition |
| Base stations | Personal communications | Speech synthesis |
| Cellular telephones | systems (PCS) | Speech vocoding |
| Channel multiplexing | Personal digital assistants (PDA) | Text-to-speech |
| Data encryption | Speaker phones | Voice mail |
| Digital PBXs | Spread spectrum communications | |
| Digital speech interpolation (DSI) | Digital subscriber loop (xDSL) | |
| DTMF encoding/decoding | Video conferencing | |
| Echo cancellation | X.25 packet switching | |

With a performance of up to 1600 million instructions per second (MIPS) and an ultra-efficient C compiler, the digital signal processors (DSPs) of the present invention give system architects unlimited possibilities to differentiate their products. High performance, ease-of-use, and affordable pricing make the DSP the optimum solution for multichannel, multifunction applications:

Pooled modems

Wireless base stations

Remote access servers (RAS)

Digital subscriber loop (DSL) systems

Cable modems

Multichannel telephony systems

The is also the optimum solution for exciting new applications like:
Personalized home security with face and hand/fingerprint recognition
Ultimate cruise control with GPS navigation and accident avoidance
Remote medical diagnostics The devices are fixed-point DSPs. These devices feature the first DSPs in the industry to adopt an advanced VLIW architecture. The architecture makes it the first off-the-shelf DSP to use advanced VLIW to achieve high performance through increased instruction-level parallelism. A traditional VLIW architecture consists of multiple execution units running in parallel, performing multiple instructions during a single clock cycle. Parallelism is the key to extremely high performance, taking these next-generation DSPs well beyond the performance capabilities of traditional superscalar designs. This DSP is a highly deterministic architecture, having few restrictions on how or when instructions are fetched, executed, or stored. It is this architectural flexibility that is key to the breakthrough efficiency levels of the its compiler. Advanced features include:

Instruction packing

Conditional branching

Variable-width instructions

Prefetched branching

All of these features eliminate the problems traditionally associated with historical implementations of VLIW machines.

At 200 MHz, the devices operate at a 5-ns cycle time, executing up to eight 32-bit instructions every cycle. The device's core CPU consists of 32 general purpose registers of 32-bit word length and eight functional units:

Two multipliers

Six ALUs

Features of the DSP include:
Advanced VLIW CPU with eight functional units including two multipliers and six arithmetic units
Executes up to eight instructions per cycle for up to ten times the performance of typical DSPs
Allows designers to develop highly effective RISC-like code for fast development time Instruction packing Gives code size equivalence for eight instructions executed serially or in parallel
Reduces code size, program fetches, and power consumption.

100% conditional instructions

Reduce costly branching

Increase parallelism for higher sustained performance
Code executes as programmed on highly independent functional units
Industry's most efficient C compiler on DSP benchmark suite
Industry's first assembly optimizer for fast development time
8/16/32-bit data support, providing efficient memory support for a variety of applications
40-bit arithmetic options add extra precision for vocoders and other computationally intensive applications
Saturation and normalization provide support for key arithmetic operations
Bit-field manipulation and instruction extract, set, clear, and bit counting support common operation found in control and data manipulation applications A variety of memory and peripheral options are available:
Large on-chip RAM for fast algorithm execution
32-bit external memory interface supports SDRAM, SBSRAM, SRAM for a broad range of external memory requirements and maximum system performance
16-bit host port for host-to-access on-chip memory
Two direct memory access (DMA) channels with boot-loading capability for efficient access to external memory/peripherals with minimized CPU interrupts Two enhanced buffered serial ports (EBSPs) for simplified interface to telecommunications trunks and/or efficient interprocessor communication Two 32-bit timers that allow easy algorithm implementation Inventive systems including processing arrangements and component circuitry made possible by improvements to the processor 11 are discussed next. For general purpose digital signal processing applications, these systems advantageously perform convolution, correlation, Hilbert transforms, Fast Fourier Transforms, adaptive filtering, windowing, and waveform generation. Further applications involving in some cases the general algorithms just listed are voice mail, speech vocoding, speech recognition, speaker verification, speech enhancement, speech synthesis and text-to-speech systems.

Instrumentation according to the invention provides improved spectrum analyzers, function generators, pattern matching systems, seismic processing systems, transient analysis systems, digital filters and phase lock loops for applications in which the invention is suitably utilized.

Automotive controls and systems according to the invention suitably provide engine control, vibration analysis, anti-skid braking control, adaptive ride control, voice commands, and automotive transmission control.

In the naval, aviation and military field, inventive systems are provided and improved according to the invention to provide global positioning systems, processor supported navigation systems, radar tracking systems, platform stabilizing systems, missile guidance systems, secure communications systems, radar processing and other processing systems.

Further systems according to the invention include computer disk drive motor controllers, printers, plotters, optical disk controllers, servomechanical control systems, robot control systems, laser printer controls and motor controls generally. Some of these control systems are applicable in the industrial environment as robotics controllers, auto assembly apparatus and inspection equipment, industrial drives, numeric controllers, computerized power tools, security access systems and power line monitors.

Telecommunications inventions contemplated according to the teachings and principles herein disclosed include echo cancellers, ADPCM transcoders, digital PBXs, line repeaters, channel multiplexers, modems, adaptive equalizers, DTMF encoders and DTMF decoders, data encryption apparatus, digital radio, cellular telephones, cellular telephone base stations, fax machines, loudspeaker telephones, digital speech interpolation (DSI) systems, packet switching systems, video conferencing systems and spread-spectrum communication systems.

In the graphic imaging area, further inventions based on the principles and devices and systems disclosed herein include optical character recognition apparatus, 3-D rotation apparatus, robot vision systems, image transmission and compression apparatus, pattern recognition systems, image enhancement equipment, homomorphic processing systems, workstations and animation systems and digital mapping systems.

Medical inventions further contemplated according to the present invention include hearing aids, patient monitoring apparatus, ultrasound equipment, diagnostic tools, automated prosthetics and fetal monitors, for example. Consumer products according to the invention include high definition television systems such as high definition television receivers and transmission equipment used at studios and television stations. Further consumer inventions include music synthesizers, solid state answering machines, radar detectors, power tools and toys and games.

It is emphasized that the system aspects of the invention contemplated herein provide advantages of improved system architecture, system performance, system reliability and economy.

Figure 82:
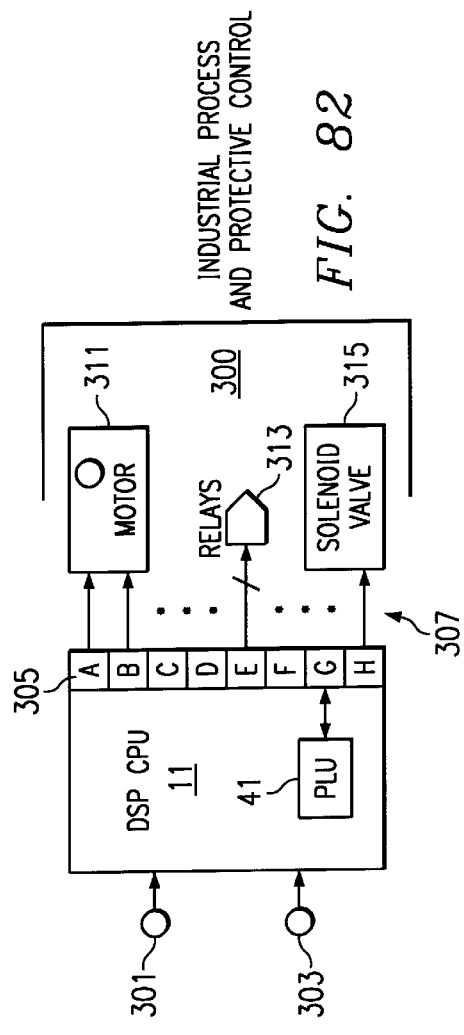
FIG. 82 is a block diagram of an improved industrial process and protective control system.

For example, in FIG. 82, an inventive industrial process and protective control system 300 according to the invention includes industrial sensors 301 and 303 for sensing physical variables pertinent to a particular industrial environment. Signals from the sensors 301 and 303 are provided to a signal processor device 11 of FIG. 1. An interface 305 includes register locations A, B, C, D, E, F, G and H and drivers (not shown). The register locations are connected via the drivers and respective lines 307 to an industrial process device driven by a motor 311, relay operated apparatus controlled by relays 313 and various valves including a solenoid valve 315.

In the industrial process and protective control environment, various engineering and economic considerations operate at cross purposes. If the speed or throughput of the industrial process is to be high, heavy burdens are placed on the processing capacity of device 11 to interpret the significance of relatively rapid changes occurring in real time as sensed by sensors 301 and 303. On the other hand, the control functions required to respond to the real-world conditions sensed by sensors 301 and 303 must also be accomplished swiftly. Advantageously, the addition of multiple functional units resolves conflicting demands on device 11, with negligible additional costs when device 11 is fabricated as a single semiconductor chip. In this way, the industrial processing rate, the swiftness of protective control and the precision of control are considerably enhanced.

Figure 83:
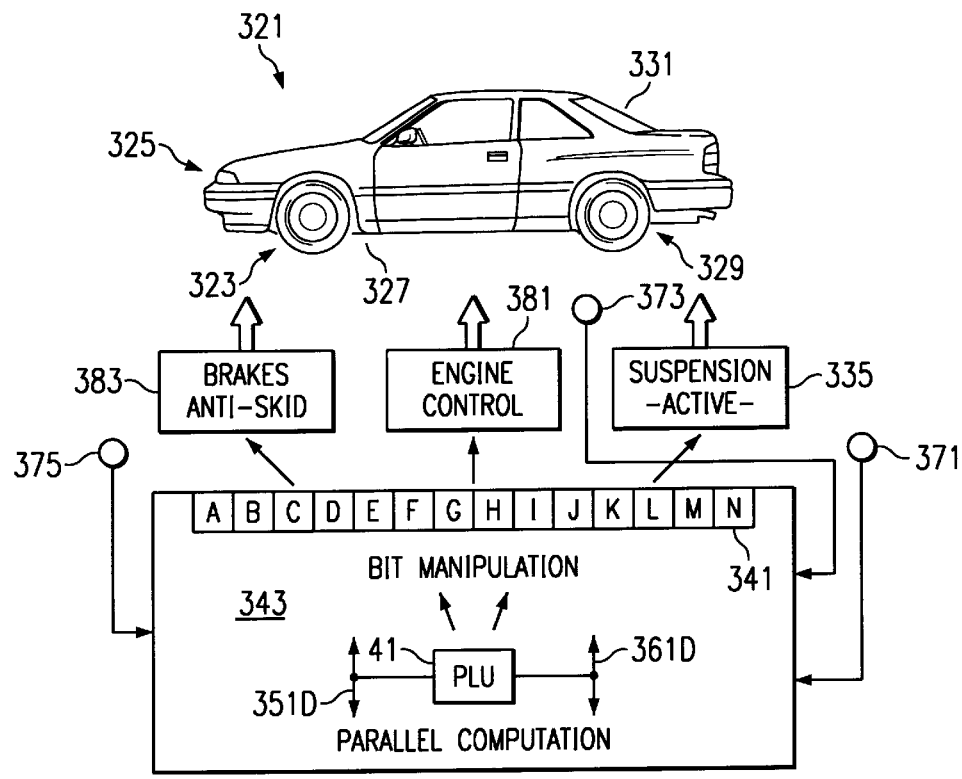
FIG. 83 is a partially pictorial, partially block electrical diagram of an improved automotive vehicle system.

In FIG. 83, an inventive automotive vehicle 321 includes a chassis 323 on which is mounted wheels and axles, an engine 325, suspension 327, and brakes 329. An automotive body 331 defines a passenger compartment which is advantageously provided with suspension relative to chassis 323.

An active suspension 335 augments spring and absorber suspension technique and is. controlled via an interface 341 having locations for bits A, B, C, D, E, F, G, H, I, J, K, L, M and N. A processor 343 utilizes computation units of the type disclosed in FIG. 1 and includes at least one ALU connected to data bus 351D and program data bus 361D. Numerous sensors include sensors 371, 373 and 375 which monitor the function of suspension 335, engine operation, and anti-skid braking respectively.

An engine control system 381 is connected to several of the locations of interface 341. Also an anti-skid braking control system 383 is connected to further bits of interface 341. Numerous considerations of automotive reliability, safety, passenger comfort, and economy place heavy demands on prior automotive vehicle systems.

In the invention of FIG. 83, automotive vehicle 321 is improved in any or all of these areas by virtue of the extremely flexible parallelism and control advantages of the invention.

The devices such as device 11 which are utilized in the systems of FIGS. 2 and 3 and further systems described herein not only address issues of increased device performance, but also solve industrial system problems which determine the user's overall system performance and cost.

A preferred embodiment device 11 executes an instruction in 5 nanoseconds and further improvements in semiconductor manufacture make possible even higher instruction rates. The on-chip program memory is RAM based and facilitates boot loading of a program from inexpensive external memory. Other versions are suitably ROM based for further cost reduction.

Figure 84:
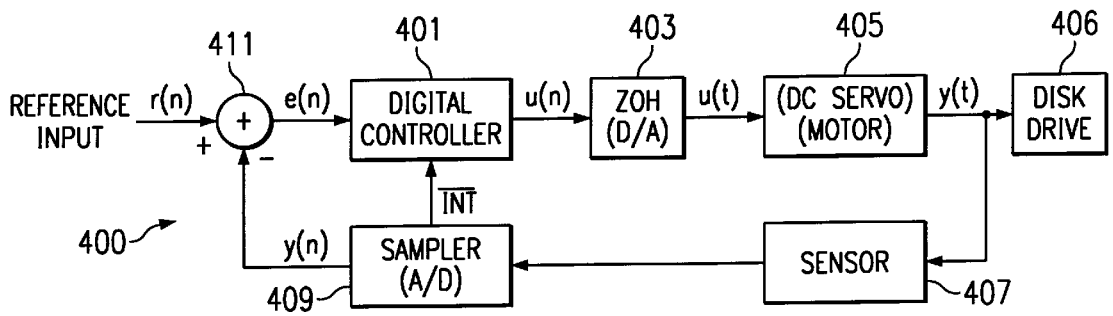
FIG. 84 is an electrical block diagram of an improved motor control system.

An inventive digitally controlled motor system 400 of FIG. 84 includes a digital controller 401 having a device 11 of FIG. 1. Digital controller 401 supplies an output u(n) to a zero order hold circuit ZOH 403. ZOH 403 supplies control output u(t) to a DC servomotor 405 in industrial machinery, home appliances, military equipment or other application systems environment. Connection of motor 405 to a disk drive 406 is shown in FIG. 84.

The operational response of servomotor 405 to the input u(t) is designated y(t). A sensor 407 is a transducer for the motor output y(t) and feeds a sampler 409 which in its turn supplies a sampled digitized output y(n) to a subtracter 411. Sampler 409 also signals digital controller 401 via an interrupt line INT-. A reference input r(n) from human or automated supervisory control is externally supplied as a further input to the close the loop. Device 11 endows controller 401 with high loop bandwidth and multiple functionality for processing and control of other elements besides servomotors as in FIG. 82.

Figure 85:
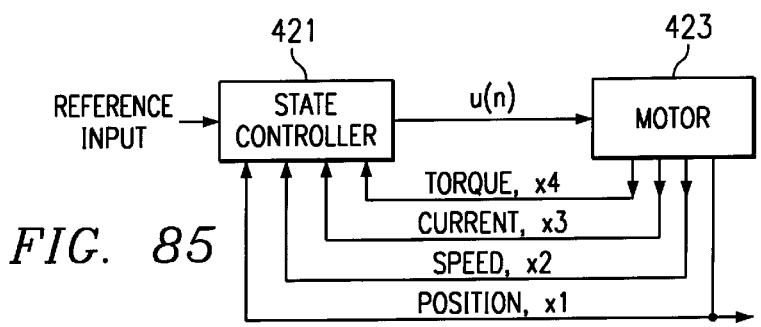
FIG. 85 is an electrical block diagram of another improved motor control system.

In FIG. 85, a multi-variable state controller 421 executes advanced algorithms utilizing the device 11 processor. State controller 421 receives a reference input r(n) and supplies an output u(n) to a motor 423. Multiple electrical variables (position x1, speed x2, current x3 and torque x4) are fed back to the state controller 421. Any one or more of the four variables x1–x4 (in linear combination for example) are suitably controlled for various operational purposes. The system can operate controlled velocity or controlled torque applications, and run stepper motors and reversible motors.

Figure 86:
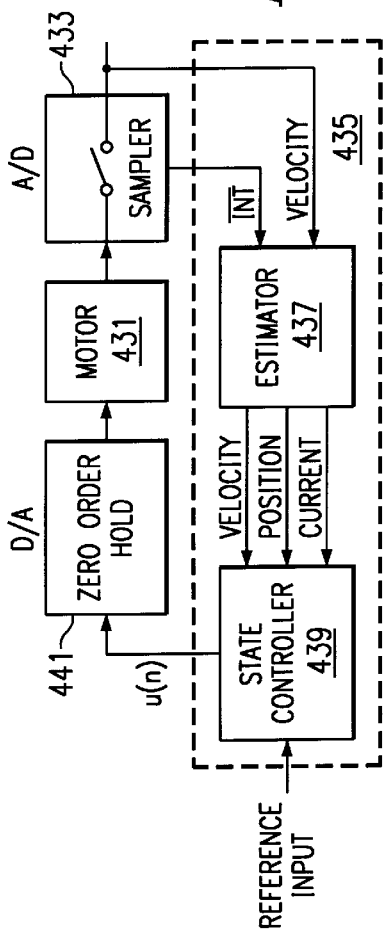
FIG. 86 is an electrical block diagram of yet another improved motor control system.

In FIG. 86, a motor 431 has its operation sensed and sampled by a sampler 433. A processor 435 including device 11 is interrupt driven by sampler 433. Velocity information determined by unit 433 is fed back to processor 435 improved as described in connection with FIG. 1. Software in the program memory of FIG. 1 is executed as estimation algorithm process 437. Process 437 provides velocity, position and current information to state controller process 439 of processor 435. A digital output u(n) is supplied as output from state controller 439 to a zero order hold circuit 441 that in turn drives motor 431.

The motor is suitably a brushless DC motor with solid state electronic switches associated with core, coils and rotor in block 431. The systems of FIGS. 84–86 accommodate shaft encoders, optical and Hall effect rotor position sensing and back emf (counter electromotive force) sensing of position from windings.

Figure 87:
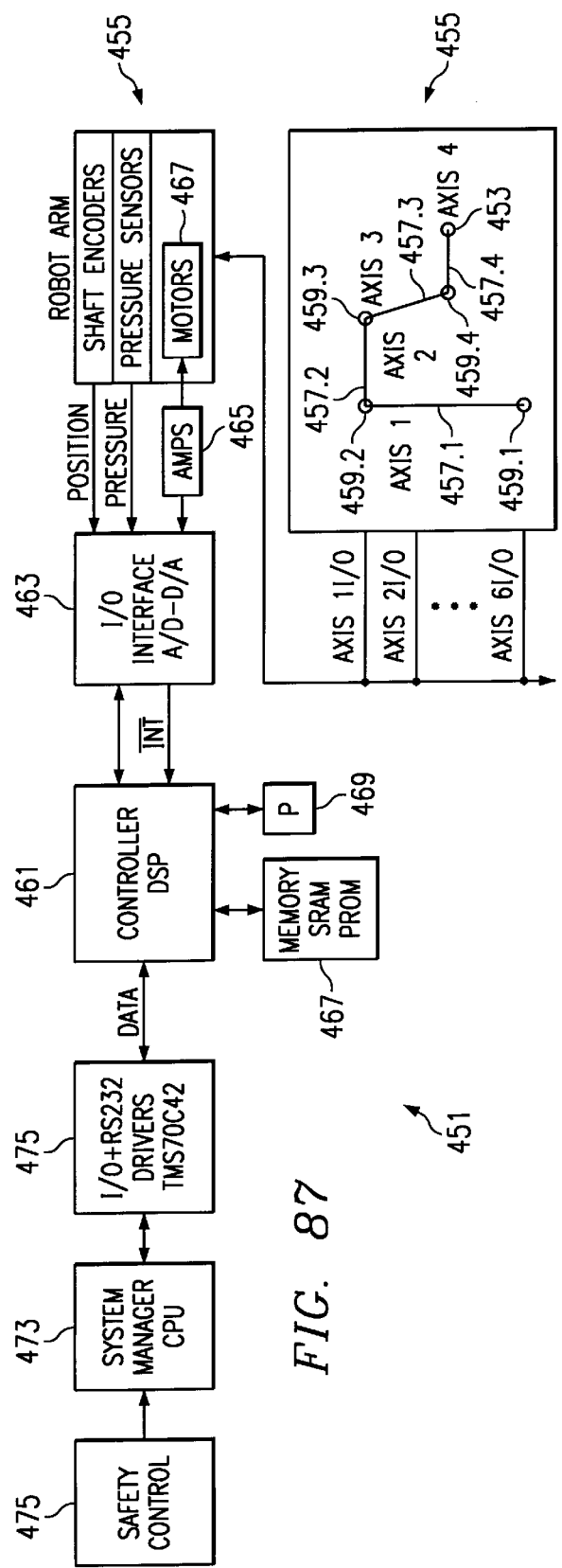
FIG. 87 is an electrical block diagram of an improved robotic control system.

In FIG. 87, robot control system 451 has a motor-driven grasping mechanism 453 at the end of a robot arm 455. Robot arm 455 has a structure with axes of rotation 457.1, 457.2, 457.3 and 457.4. Sensors and high response accurately controllable motors are located on arm 455 at articulation points 459.1, 459.2, 459.3 and 459.4.

Numerous such motors and sensors are desirably provided for accurate positioning and utilization of robot arm mechanism 455. However, the numerous.sensors and motors place conflicting demands on the system as a whole and on a controller 461. Controller 461 resolves these system demands by inclusion of device 11 of FIG. 1 and interrupt-driven architecture of system 451. Controller 461 intercommunicates with an I/O interface 463 which provides analog-to-digital and digital-to-analog conversion as well as bit manipulation by parallel logic unit 41 for the robot arm 455.

The interface 463 receives position and pressure responses from the navigation motors 467 and sensors associated with robot arm 455 and grasping mechanism 453. Interfacer 463 also supplies control commands through servo amplifiers 465 to the respective motors 467 of robot arm 455.

Controller 461 has associated memory 467 with static RAM (SRAM) and programmable read only memory (PROM).

Slower peripherals 469 are associated with controller 471 and they are efficiently accommodated by the page boundary sensitive wait state features of controller 461. The controller 461 is also responsive to higher level commands supplied to it by a system manager CPU 473 which is responsive to safety control apparatus 475. System manager 473 communicates with controller 461 via I/O and RS 232 drivers 475.

The digital control systems according to the invention make possible performance advantages of precision, speed and economy of control not previously available. For another example, disk drives include information storage disks spun at high speed by spindle motor units. Additional controls called actuators align read and write head elements relative to the information storage disks.

The preferred embodiment can even provide a single chip solution for both actuator control and spindle motor control as well as system processing and diagnostic operations. Sophisticated functions are accommodated without excessively burdening controller 461. A digital notch filter can be implemented in controller 461 to cancel mechanical resonances. A state estimator can estimate velocity and current. A Kalman filter reduces sensor noise. Adaptive control compensates for temperature variations and mechanical variations. Device 11 also provides on-chip PWM pulse width modulation outputs for spindle motor speed control. Analogous functions in tape drives, printers, plotters and optical disk systems are readily accommodated. The inventive digital controls provide higher speed, more precise speed control, and faster data access generally in I/O technology at comparable costs, thus advancing the state of the art.

In missile guidance systems, the enhanced operational capabilities of the invention provide more accurate guidance of missile systems, thereby reducing the number of expensive missiles required to achieve operational objectives. Furthermore, equivalent performance can be attained with fewer processor chips, thus reducing weight and allowing augmented features and payload enhancements.

In FIG. 88, a satellite telecommunication system according to the invention has first stations 501 and 503 communicating by a satellite transmission path having a delay of 250 milliseconds. A far end telephone 505 and a near end telephone 507 are respectively connected to earth stations 501 and 503 by hybrids 509 and 511. Hybrids 509 and 511 are delayed eight milliseconds relative to the respective earth stations 501 and 503. Accordingly, echo cancellation is necessary to provide satisfactory telecommunications between far end telephone 505 and near end telephone 507. Moreover, the capability to service numerous telephone conversation circuits at once is necessary. This places an extreme processing burden on telecommunications equipment.

In FIG. 89, a preferred embodiment echo canceller 515 is associated with each hybrid such as 511 to improve the transmission of the communications circuit. Not only does device 11 execute echo canceling algorithms at high speed, but it also economically services more satellite communications circuits per chip.

Another system embodiment is an improved modem. In FIG. 90, a process diagram of operations in device 11 programmed as a modem transmitter includes a scrambling step 525 followed by an encoding step 527 which provides quadrature digital signals I[nT$_b$] and Q[nT$_b$] to interpolation procedures 529 and 531 respectively. Digital modulator computations 533 and 535 multiply the interpolated quadrature signals with proctored constants from memory that provide trigonometric cosine and sine values respectively. The modulated signals are then summed in a summing step 537. A D/A converter connected to device 11 converts the modulated signals from digital to analog form in a step 539. Gain control by a factor G1 is then performed in modem transmission and sent to a DAA.

In FIG. 91, a modem receiver using another device 11 receives analog communications signals from the DAA. An analog-to-digital converter A/D 521 digitizes the information for a digital signal processor employing device 11. High rates of digital conversion place heavy burdens on input processing of prior processors. Advantageously, DSP 11 provides for extremely efficient servicing of interrupts from digitizing elements such as A/D 521 and at the same time has powerful digital signal processing computational facility for executing modem algorithms. The output of device 11 is supplied to a universal synchronous asynchronous receiver transmitter (USART) 523 which supplies an output D[nT].

In FIG. 92, a process diagram of modem reception by the system of FIG. 91 involves automatic gain control by factor G2 upon reception from the DAA supplying a signal s(t) for analog-to-digital conversion at a sampling frequency fs. The digitized signal is s[nTs] and is supplied for digital processing involving first and second bandpass filters implemented by digital filtering steps BPF1 and BPF2 followed by individualized automatic gain control. A demodulation algorithm produces two demodulated signals I'[nTs] and Q'[nTs]. These two signals I' and Q' used for carrier recovery fed back to the demodulation algorithm. Also I' and Q' are supplied to a decision algorithm and operated in response to clock recovery. A decoding process 551 follows the decision algorithm. Decoding 551 is followed by a descrambling algorithm 555 that involves intensive bit manipulation by PLU 41 to recover the input signal d[nt].

As shown in FIG. 92, the numerous steps of the modem reception algorithm are advantageously accomplished by a single digital signal processor device 11 by virtue of the intensive numerical computation capabilities.

In FIG. 93, computing apparatus 561 incorporating device 11 cooperates with a host computer 563 via an interface 565. High capacity outboard memory 567 is interfaced to computer 561 by interface 569. The computer 561 advantageously supports two-way pulse code modulated (PCM) communication via peripheral latches 571 and 573. Latch 571 is coupled to a serial to parallel converter 575 for reception of PCM communications from external apparatus 577. Computer 561 communicates via latch 573 and a parallel to serial unit 579 to supply a serial PCM data stream to the external apparatus 577.

Figure 94:
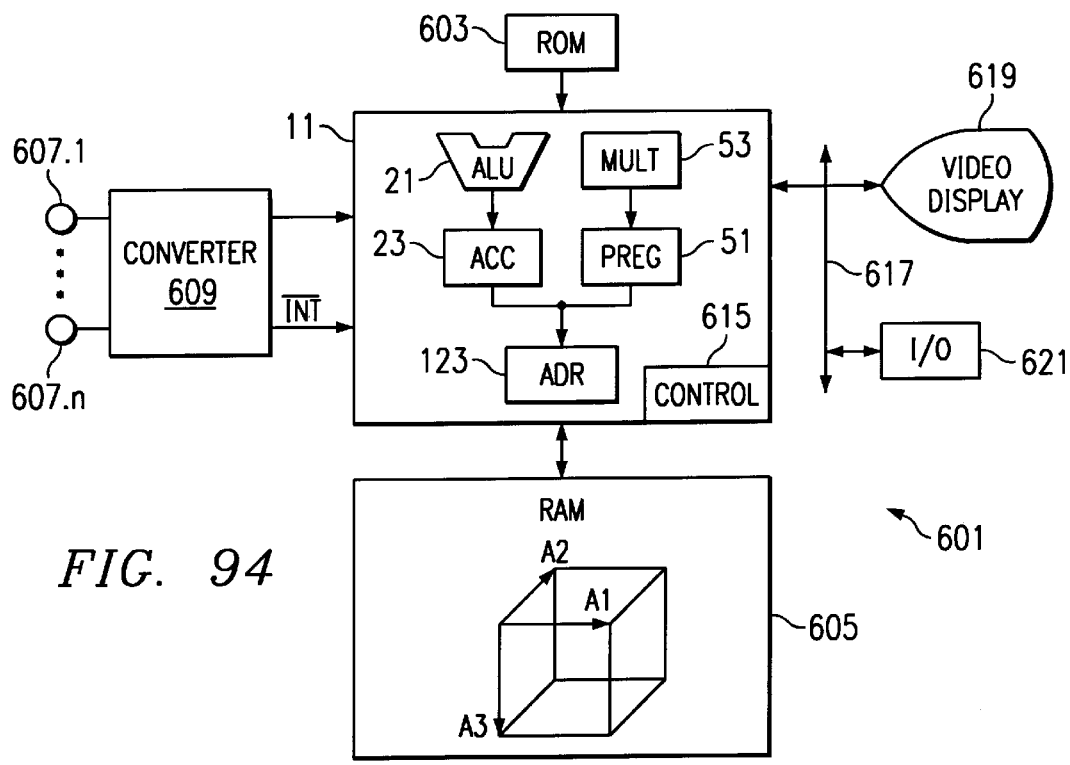
FIG. 94 is an electrical block diagram of an improved video imaging system with multidimensional array processing.

In FIG. 94, a video imaging system 601 includes device 11 supported by ROM 603 and RAM 605. Data gathering sensors 607.1 through 607.n feed inputs to converter 609 which then supplies voluminous digital data to device 11. FIG. 94 highlights an ALU, a register accumulator, multiplier array, a register and has an addressing unit. A control element 615 generally represents a decoder and pipeline controller of FIG. 1. On-chip I/O peripherals (not shown) communicate with a bus 617 supplying extraordinarily high quality output to a video display unit 619. Supervisory input and output I/O 621 is also provided to device 11.

Owing to the advanced addressing capabilities in device 11, control 615 is operable on command for transferring the product from a register directly to the addressing circuit and bypassing any memory locations during the transfer. Because of the memory mapping, any pair of the computational core-registers of FIG. 1 are advantageously accessed to accomplish memory-bypass transfers therebetween via data bus, regardless of arrow directions to registers on those figures. Because the multiplication capabilities of device 11 are utilized in the addressing function, the circuitry establishes an array in the electronic memory 605 wherein the array has entries accessible in the memory with a dimensionality of at least three. The video display 619 displays the output resulting from multi-dimensional array processing by device 11. It is to be understood, of course, that the memory 605 is not in and of itself necessarily multi-dimensional, but that the addressing is rapidly performed by device 11 so that information is accessible on demand as if it were directly accessible by variables respectively representing multiple array dimensions. For example, a three dimensional cubic array having address dimensions A1, A2 and A3 can suitably be addressed according to the equation $N^2 \times A3 + N \times A2 + A1$. In a two dimensional array, simple repeated addition according to an index count from a register of FIG. 1 is sufficient for addressing purposes. However, to accommodate the third and higher dimensions, the process is considerably expedited by introducing the product capabilities of a multiplier.

Figure 95:
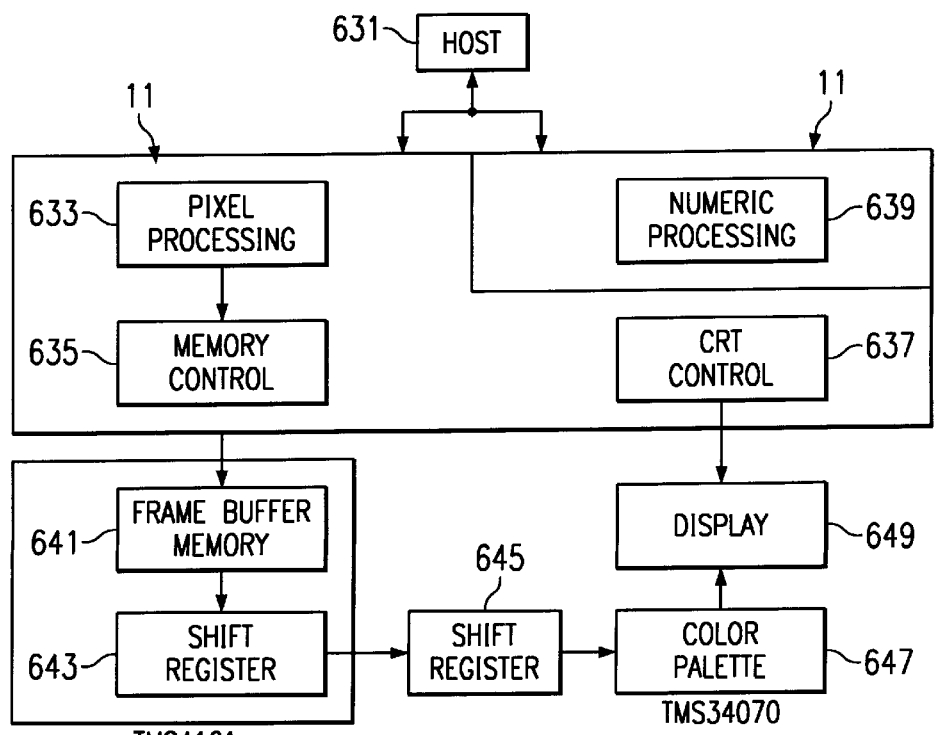
FIG. 95 is an electrical block diagram equally representative of hardware blocks or process blocks for improved graphics, image and video processing.
Figure 96:
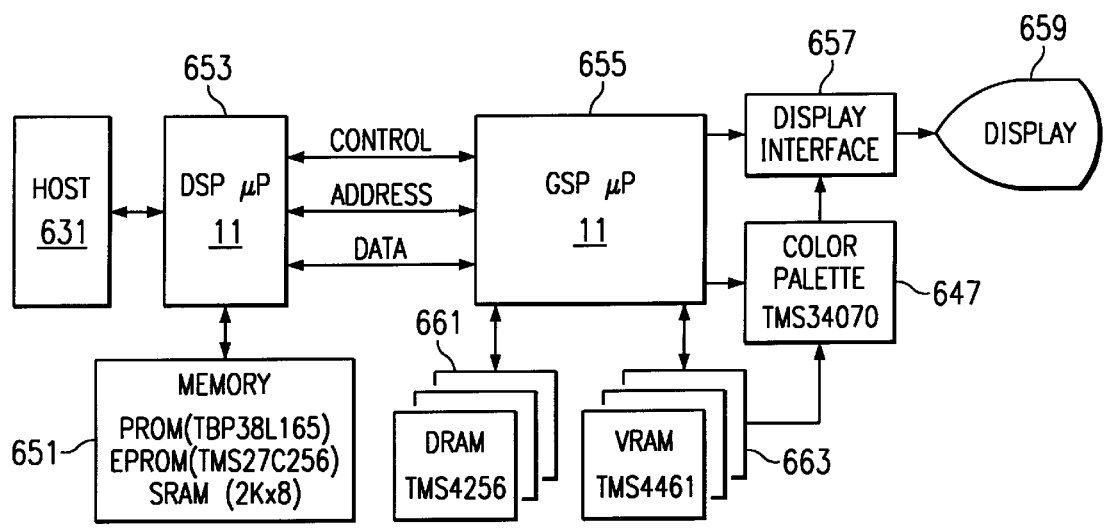
FIG. 96 is an electrical block diagram of a system for improved graphics, image and video processing.

FIGS. 95 and 96 respectively show function-oriented and hardware block-oriented diagrams of video processing systems according to the invention. Applications for these inventive systems provide new workstations, computer interfaces, television products and high definition television (HDTV) products.

In FIG. 95, a host computer 631 provides data input to numeric processing by device 11. Video pixel processing operations 633 are followed by memory control operations 635. CRT control functions 637 for the video display are coordinated with the numeric processing 639, pixel processing 633 and memory control 635. The output from memory control 635 operations supplies frame buffer memory 641 and then a shift register 643. Frame buffer memory and shift register 641 and 643 are suitably implemented by a Texas Instruments device TMS 4161. A further shift register 645 supplies video information from shift register 643 to a color palette 647. Color palette 647 drives a display 649 which is controlled by CRT control 637. The color palette 647 is suitably a TMS 34070.

In FIG. 96, the host 631 supplies signals to a first device 11 operating as a DSP microprocessor 653. DSP 653 is supported by memory 651 including PROM, EPROM and SRAM static memory. Control, address and data information are supplied by two-way communication paths between DSP 653 and a second device 11 operating as a GSP (graphics signal processor) 655. GSP 655 drives both color palette 647 and display interface 657. Interface 657 is further driven by color palette 647. Display CRT 659 is driven by display interface 657. It is to be understood that the devices 11 and the system of FIG. 96 in general is operated at an appropriate clock rate suitable to the functions required. Device 11 is fabricated in sub-micron embodiments to support processing speeds needed for particular applications. It is contemplated that the demands of high definition television apparatus for increased processing power be met not only by use of higher clock rates but also by the structural improvements of the circuitry-disclosed herein.

Figure 97:
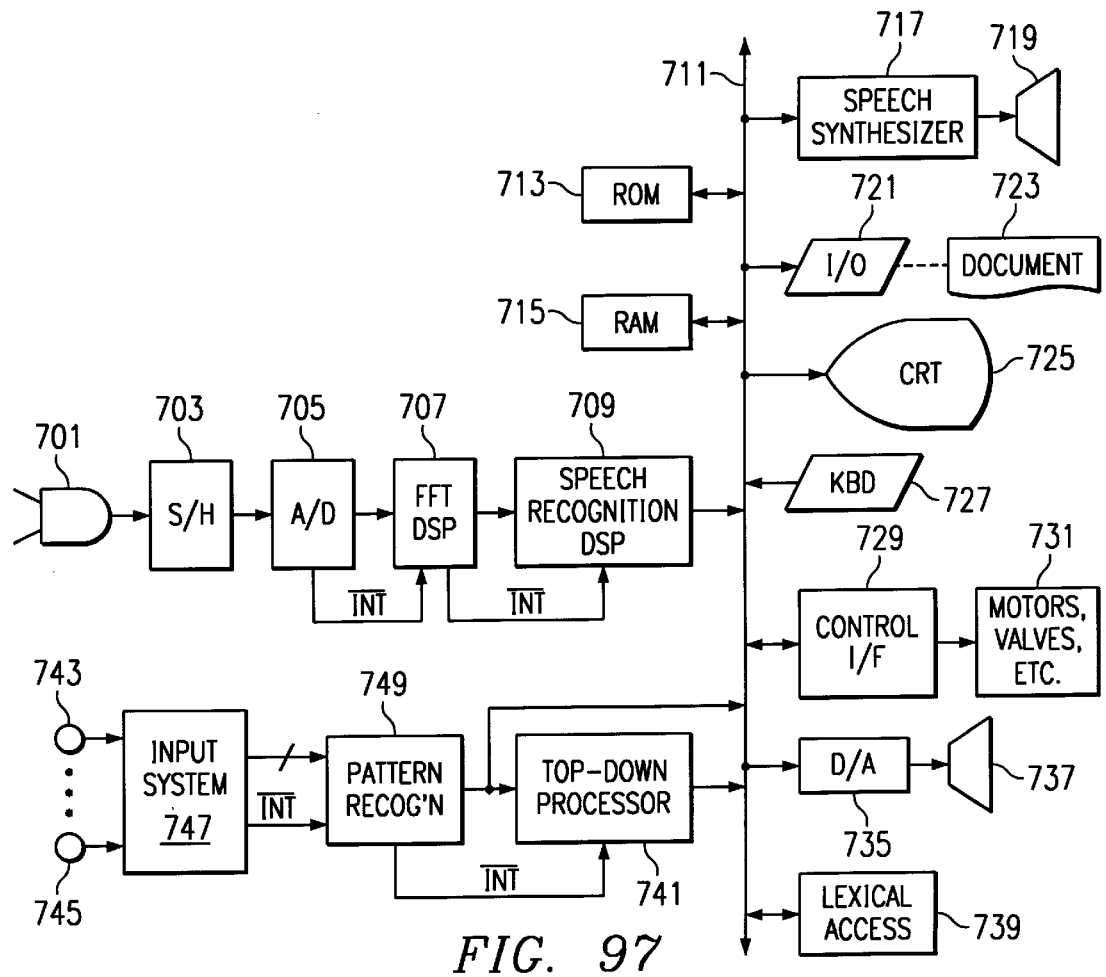
FIG. 97 is an electrical block diagram of an improved automatic speech recognition system.

In FIG. 97, an automatic speech recognition system according to the invention has a microphone 701, the output of which is sampled by a sample-and-hold (S/H) circuit 703 and then digitally converted by A/D circuit 705. An interrupt-driven fast Fourier transform processor 707 utilizes device 11 and converts the sampled time domain input from microphone 701 into a digital output representative of a frequency spectrum of the sound. This processor 707 is very efficient partly due to the zero-overhead interrupt context switching feature, conditional instructions and auxiliary address registers mapped into memory address space as discussed earlier.

Processor 707 provides each spectrum to a speech recognition DSP 709 incorporating a further device 11. Recognition DSP 709 executes any appropriately now known or later developed speech recognition algorithm. For example, in a template matching algorithm, numerous computations involving multiplications, additions and maximum or minimum determinations are executed. The device 11 is ideally suited to rapid execution of such algorithms by virtue of its parallel function architecture. Recognition DSP 709 supplies an output to a system bus 711. ROM 713 and RAM 715 support the system efficiently because of the software wait states on page boundaries provided by recognition DSP 709. Output from a speech synthesizer 717 that is responsive to speech recognition DSP 709 is supplied to a loudspeaker or other appropriate transducer 71g.

System I/O 721 downloads to document production devices 723 such as printers, tapes, hard disks and the like. A video cathode ray tube (CRT) display 725 is fed from bus 711 as described in connection with FIGS. 95 and 96. A keyboard 727 provides occasional human supervisory input to bus 711. In industrial and other process control applications of speech recognition, a control interface 729 with a further device 11 is connected to bus 711 and in turn supplies outputs for motors, valves and other servomechanical elements 731 in accordance with bit manipulation and the principles and description of FIGS. 82–87, hereinabove.

In speech recognition-based digital filter hearing aids, transformed speech from recognition DSP 709 is converted from digital to analog form by a D/A converter 735 and output through a loudspeaker 737. The same chain of blocks 701, 703, 705, 707, 709, 735, 737 is also applicable in telecommunications for speech recognition-based equalization, filtering and bandwidth compression.

In advanced speech processing systems, a lexical access processor 739 performs symbolic manipulations on phonetic element representations derived from the output of speech recognition DSP 709 and formulates syllables, words and sentences according to any suitable lexical access algorithm.

A top-down processor 741 performs a top-down processing algorithm based on the principle that a resolution of ambiguities in speech transcends the information contained in the acoustic input in some cases. Accordingly, non-acoustic sensors, such as an optical sensor 743 and a pressure sensor 745 are fed to an input system 747 which then interrupt-drives pattern recognition processor 749. Processor 749 directly feeds system bus 711 and also accesses top-down processor 741 for enhanced speech recognition, pattern recognition, and artificial intelligence applications.

Device 11 substantially enhances the capabilities of processing at every level of the speech recognition apparatus of FIG. 97, e.g., blocks 707, 709, 717, 721, 725, 729, 739, 741, 747 and 749.

Figure 98:
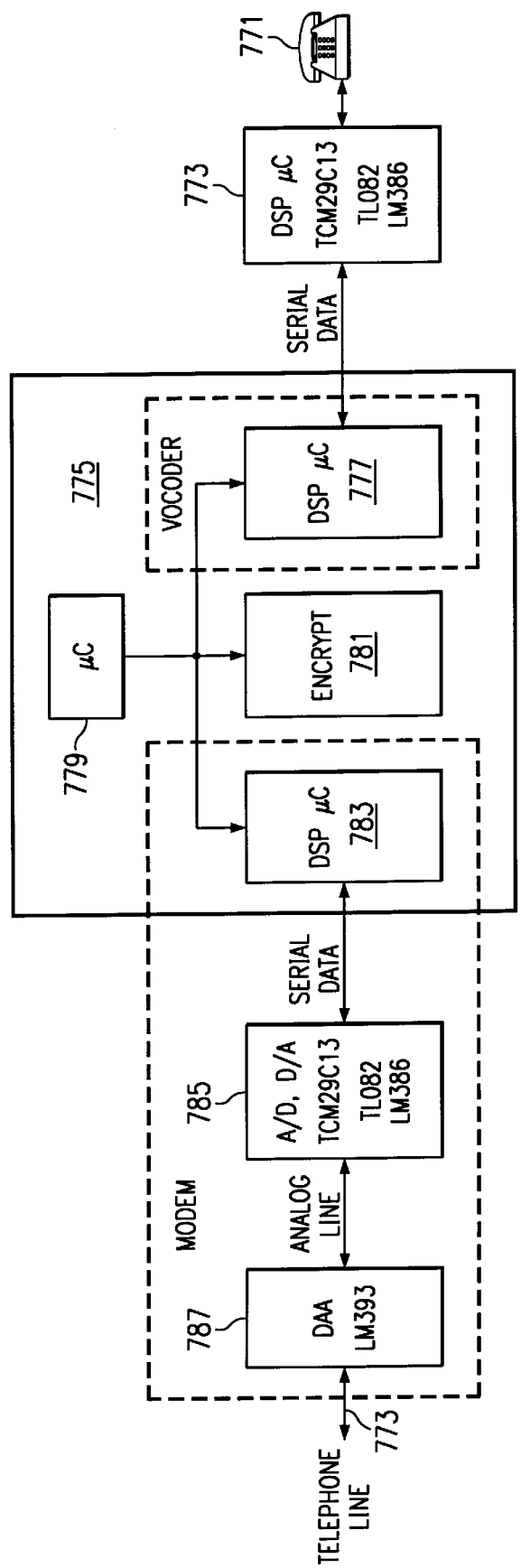
FIG. 98 is an electrical block diagram of an improved vocoder-modem system with encryption.

FIG. 98 shows a vocoder-modem system with encryption for secure communications. A telephone 771 communicates in secure mode over a telephone line 773. A DSP microcomputer 773 is connected to telephone 771 for providing serial data to a block 775. Block 775 performs digitizing vocoder functions in a section 777, and encryption processing in block 781. Modem algorithm processing in blocks 779 and 783 is described hereinabove in connection with FIGS. 80 and 82. Block 783 supplies and receives serial data to and from A/D, D/A unit 785. Unit 785 provides analog communication to DAA 787. The substantially enhanced processing features of device 11 of FIG. 1 makes possible a reduction in the number of chips required in block 775 so a cost reduction is made possible in apparatus according to FIG. 98. In some embodiments, more advanced encryption procedures are readily executed by the remarkable processing power of device 11. Accordingly, in FIG. 98, device 11 is used either to enhance the functionality of each of the functional blocks or to provide comparable functionality with fewer chips and thus less overall product cost.

Three Texas Instruments DSPs are described in the TMS 320C1x User's Guide and TMS 320C2x User's Guide and Third Generation TMS 320 User's Guide, all of which are incorporated herein by reference. Also, coassigned U.S. Pat. Nos. 4,577,282 and 4,713,748 are incorporated herein by reference.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A microprocessor comprising:

fetch circuitry for fetching a sequence of execution packets, wherein each execution packet comprises up to a first number of instructions;

a first set of functional units connected to receive instructions from the fetch circuitry, the first set of functional units operable to execute a first plurality of instruction types;

a second set of functional units connected to receive instructions from the fetch circuitry; wherein the second set of functional units is operable to execute the first plurality of instruction types;

dispatch circuitry connected between the fetch circuitry and the first set of functional units and the second set of functional units, the dispatch circuitry operable to dispatch each instruction of each execution packet to both the first set of functional units and to the second set of functional units, such that all instructions of a given execution packet are executed in parallel; and wherein the dispatch circuitry selectively dispatches each instruction of each execution packet to either the first set of functional units or to the second set of functional units in response to a bit in each instruction.

2. The microprocessor of claim 1, wherein each of said sets of functional units includes a multiplier.

3. The microprocessor of claim 1, wherein each of said sets of functional units includes a logic unit capable of selected logic and arithmetic operations.

4. The microprocessor of claim 1, wherein each of said sets of functional units includes a logic unit capable of selected logic, arithmetic and shift operations.

5. The microprocessor of claim 1, wherein each of said sets of functional units includes a logic unit capable of selected arithmetic and data operations.

6. The microprocessor of claim 1, wherein the dispatch circuitry is further operable to simultaneously dispatch a first instruction of a first type to the first set of functional units, and a second instruction of the first type to the second set of functional units.

7. The microprocessor of claim 6, wherein the first set of functional units comprises a first register file and the second set of functional units comprises a second register file.

8. The microprocessor of claim 7, wherein the first set of functional units is interconnected to access the second register file and the second set of functional units is interconnected to access the first register file.

9. A digital system comprising a microprocessor, wherein the microprocessor comprises:

fetch circuitry for fetching a sequence of execution packets, wherein each execution packet comprises up to a first number of instructions;

a first set of fimctional units connected to receive instructions from the fetch circuitry, the first set of functional units operable to execute a first plurality of instruction types;

a second set of functional units connected to receive instructions from the fetch circuitry; wherein the second set of functional units is operable to execute the first plurality of instruction types;

dispatch circuitry connected between the fetch circuitry and the first set of functional units and the second set of functional units, the dispatch circuitry operable to dispatch each instruction of each execution packet to both the first set of functional units and to the second set of functional units, such that all instructions of a given execution packet are executed in parallel, and wherein the dispatch circuitry selectively dispatches each instruction of each execution packet to either the first set of functional units or to the second set of functional units in response to a bit in each instruction.

10. The system of claim 9, wherein the dispatch circuitry is further operable to simultaneously dispatch a first instruction of a first type to the first set of functional units, and a second instruction of the first type to the second set of functional units.

11. The system of claim 10 being a modem, further comprising an analog-to-digital or digital-to-analog converter interfaced to the microprocessor for connection to a telephone line.

12. The system of claim 10 being an electronic automotive control system responsive to instructions defined by electrical bits, said electronic automotive control system further comprising an interface coupled to said microprocessor for supplying selected bits to cause a change in at least one of a braking system, a suspension system, or an engine of an automobile.

13. The system of claim 10 being a process control system, further comprising:

sensors connected to said microprocessor responsive to a state of a process, process control elements responsive to electronic directions operable to change at least one parameter of said process, and an interface connected to said microprocessor for supplying selected electronic directions to said process control elements.

14. A method of operating a digital system having a microprocessor, the method comprising the steps of:

fetching a sequence of execution packets for execution by the microprocessor, wherein each execution packet contains up to N instructions that are executed in parallel by the microprocessor;

dispatching all instructions of a first execution packet for parallel execution on plural sets of functional units in the microprocessor, wherein the plural sets of finctional units are virtually identical, wherein each instruction of each execution packet is selectively dispatched to either a first set of functional units or to a second set of functional units in response to a bit in each instruction;

executing all instructions of the first execution packet in parallel on the plural sets of functional units; and repeating the steps of dispatching and executing for each execution packet of the sequence of execution packets, such that for each execution packet instructions of the same type can be dispatched to any and all of the plural sets of functional units, such that a first instruction of a first type from a given first execution packet is executed on the first set of the plural sets of finctional units while a second instruction of the first type from the given execution packet is executed in parallel on the second set of the plural sets of functional units.

* * * * *